United States Patent [19]

Lanza et al.

[11] 4,032,895
[45] June 28, 1977

[54] ELECTRONIC DATA PROCESSING COMPUTER

[75] Inventors: Lucio Lanza, Milan; Francesco Giovanni Vecchio, Catania, both of Italy

[73] Assignee: Ing. C. Olivetti & C., S.p.A., Ivrea (Turin), Italy

[22] Filed: Aug. 14, 1975

[21] Appl. No.: 604,575

[30] Foreign Application Priority Data

Aug. 21, 1974 Italy .................. 69573/74

[52] U.S. Cl. .............................................. 364/200
[51] Int. Cl.$^2$ ............... G06F 13/00; G06F 9/16; G06F 9/20; G11C 7/00
[58] Field of Search ................ 340/172.5; 445/1

[56] References Cited

UNITED STATES PATENTS

| | | | |
|---|---|---|---|
| 3,585,605 | 6/1971 | Gardner et al. | 340/172.5 |
| 3,624,611 | 11/1971 | Wirsing | 340/172.5 |
| 3,636,522 | 1/1972 | Buschmann et al. | 340/172.5 |
| 3,735,363 | 5/1973 | Beers et al. | 340/172.5 |
| 3,748,649 | 7/1973 | McEowan et al. | 340/172.5 |
| 3,766,532 | 10/1973 | Liebel | 340/172.5 |
| 3,800,293 | 3/1974 | Enger et al. | 340/172.5 |
| 3,839,705 | 10/1974 | Davis et al. | 340/172.5 |
| 3,875,391 | 4/1975 | Shapiro et al. | 340/172.5 |
| 3,886,523 | 5/1975 | Ferguson et al. | 340/172.5 |
| 3,949,372 | 4/1976 | Brioschi | 340/172.5 |
| 3,953,833 | 4/1976 | Shapiro | 340/172.5 |
| 3,958,221 | 5/1976 | Serra et al. | 340/172.5 |

*Primary Examiner*—Mark E. Nusbaum
*Assistant Examiner*—Jan E. Rhoads
*Attorney, Agent, or Firm*—Schuyler, Birch, Swindler, McKie & Beckett

[57] ABSTRACT

An electronic computer comprising a first memory for recording instructions and data to be processed, a second memory for recording microinstructions and addressable by the instructions to provide a succession of microinstructions which is associated with each of the instructions and a third memory for recording a plurality of words and addressable by the microinstructions to provide at least one word associated with each of the microinstructions. Operation control means and a plurality of registers connectable to the control means and to the memories are provided for processing the data and two groups of signals are included in the words for controlling the operations of the control means and the registers. The control means and the registers are directly supplied with the signals of the first group for selecting the operations to be performed according to the signals of the first group. Means are provided for transmitting in succession the signals of the second group for timing in succession the operations selected by the first group of signals.

19 Claims, 48 Drawing Figures

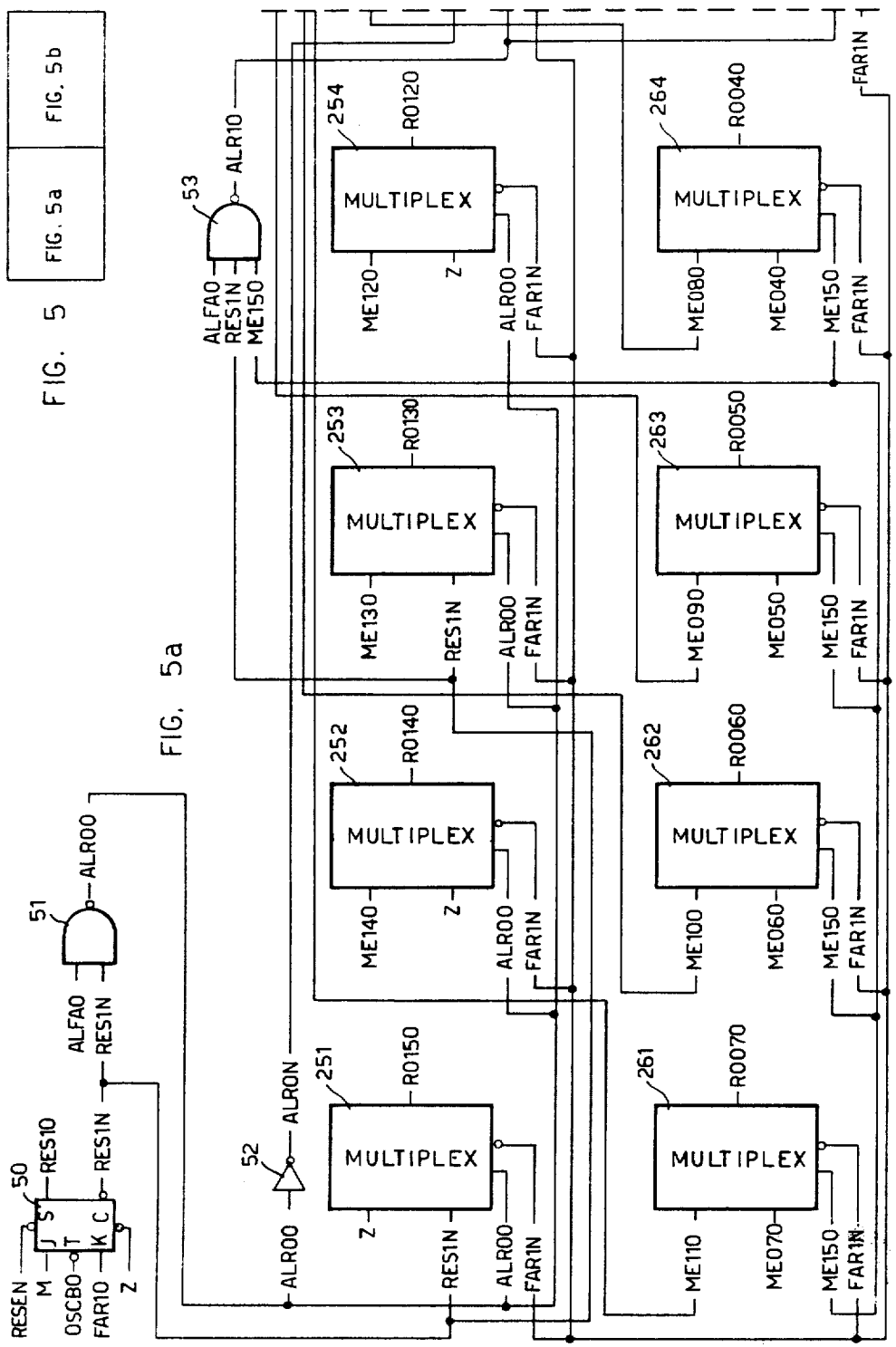

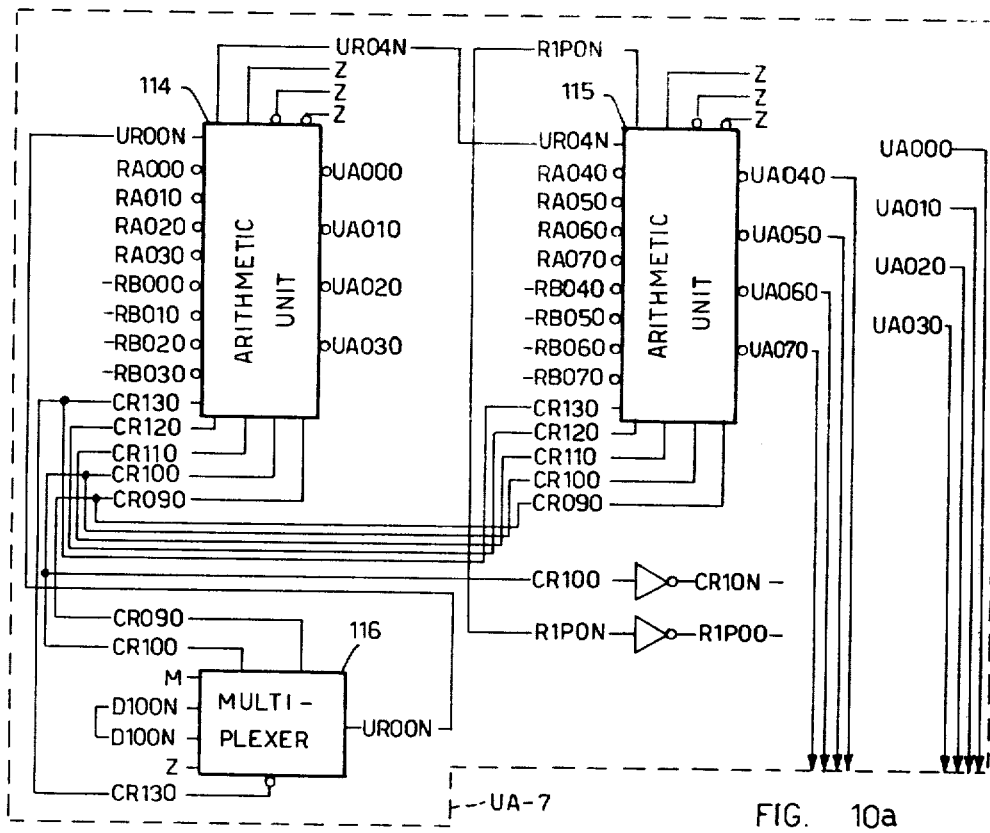
FIG. 10a
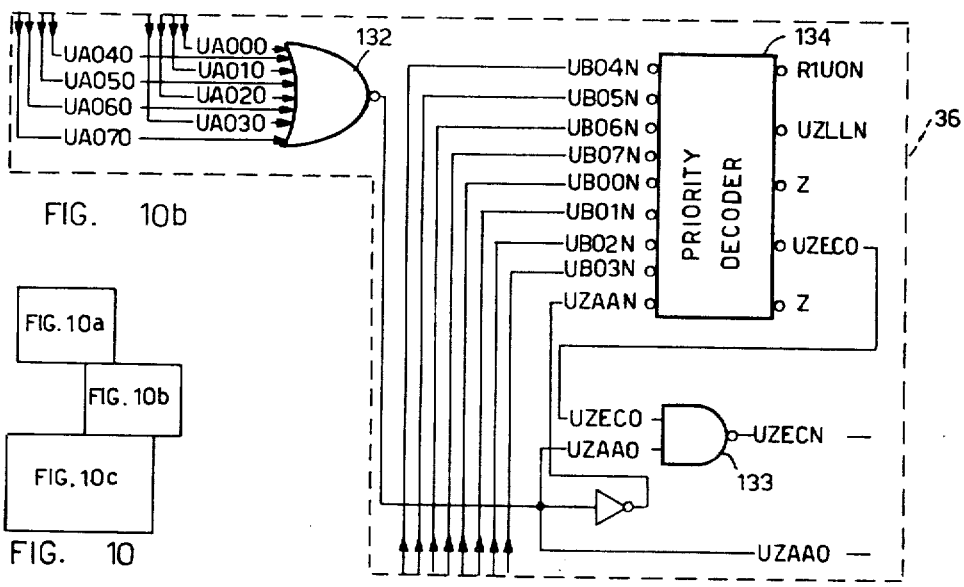
FIG. 10b
FIG. 10a
FIG. 10b
FIG. 10c
FIG. 10

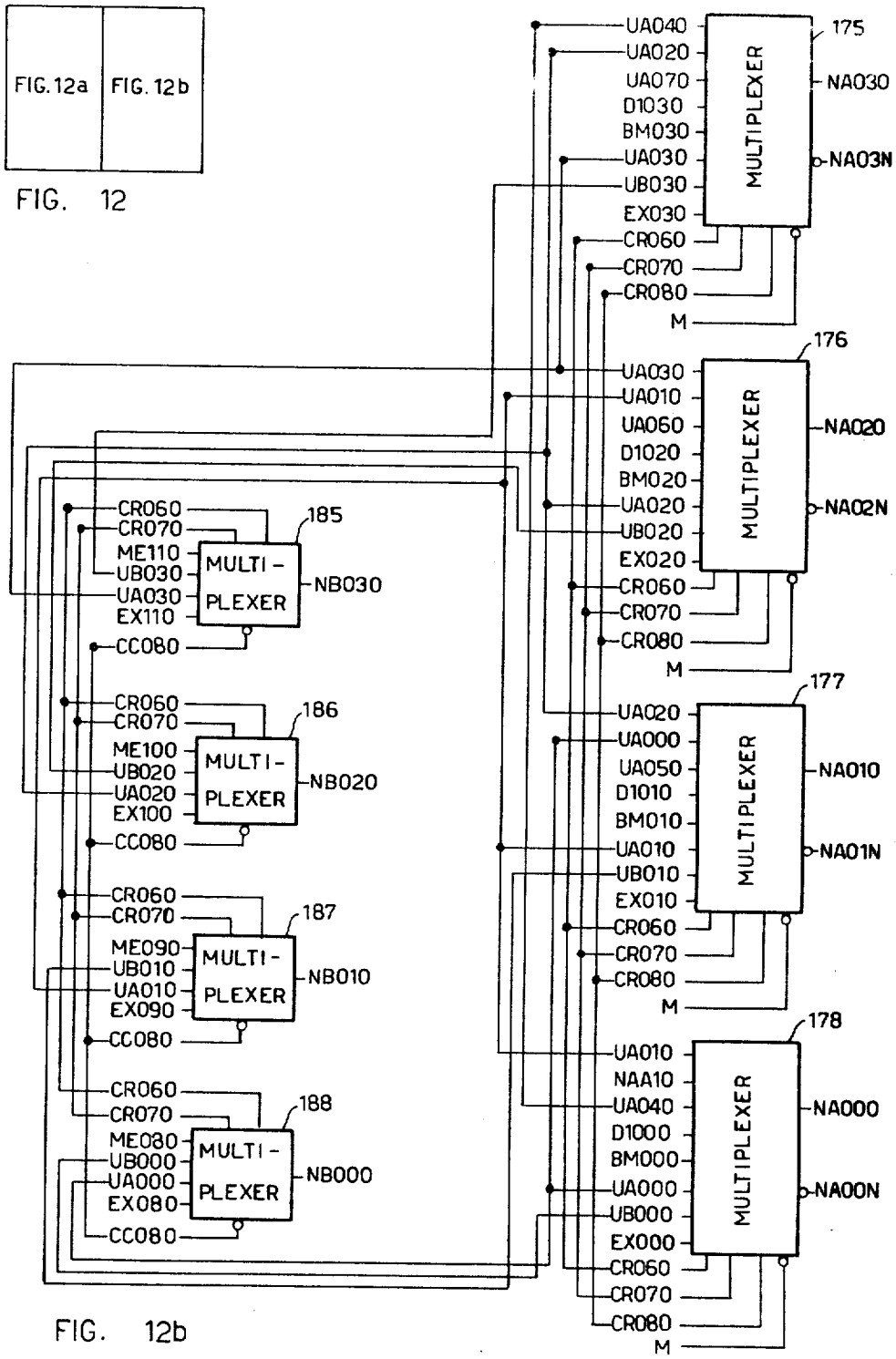

ALFA MICROINSTRUCTIONS

ELECTRONIC DATA PROCESSING COMPUTER

BACKGROUND OF THE INVENTION

The invention relates to the central processing unit (CPU) of an electronic computer having three machine levels. The first level is the instruction level, the second level is the microinstruction level, the third level is the nanoinstruction level. In particular the present invention is directed to the hardware structures comprised in the second and third machine levels, which are used during the execution of each microinstruction.

As is known, there are two types of central units. The first of these utilizes a sequence logic matrix for generating the signals which execute the microinstructions. The second type comprises a read only memory (ROM) which utilizes the code of the microinstruction for addressing a nanoprogram adapted to supply the signals which act on the logical groups to carry out the processing operations required by the microinstruction.

The central unit hereinafter described is of the second type. The advantage of nanoprogramming is that of permitting greater flexibility in generating the set of microinstructions. In fact, by changing the contents of the nanomemory (the NROM) the set of microinstructions can be changed without any need for modifying the circuits of the machine.

A central unit of the nanoprogrammed type is known in which each microinstruction addresses a corresponding nanoinstruction. This nanoinstruction is transmitted to a logic unit which divides it into a certain number of groups of bits of predetermined lengths. The first group is fixed throughout the execution of the nanoinstruction and is associated in succession with each of the other groups. The execution of the nanoinstruction is obtained by successively utilizing the pairs of groups of bits which are associated from time to time. It follows, therefore, that the time of execution of a nanoinstruction is fixed and is equal to the sum of the time used to carry out the commands generated by each of these pairs. This has the disadvantage that all the nanoinstructions have a fixed duration which is not subsequently fractionable.

SUMMARY OF THE INVENTION

The object of the present invention is to make it possible for the duration of the nanoinstruction to be made variable according to the complexity of the operations executed by it. In particular the invention enables the timing of each nanoinstruction to be tailored to the particular sequence of orders generated.

According to the present invention there is provided an electronic computer comprising a first memory for recording instructions and data to be processed, a second memory for recording microinstructions and addressable by the instructions to provide a succession of microinstructions which is associated with each of the instructions, a third memory for recording a plurality of words and addressable by the microinstructions to provide at least one word associated with each of the microinstructions, a logic unit and a plurality of registers connectable to the logic unit and to the memories for processing the data, wherein two groups of signals are included in the words for controlling the operations of the logic unit and the registers, and the computer comprises means adapted to transmit in succession the signals contained in the second of the groups to the registers for timing in succession the operations selected by the first group of signals.

Having in mind the above and other objects that will be obvious from an understanding of the disclosure, the present invention comprises a combination and arrangement of parts illustrated in the presently preferred embodiments of the invention which are hereinafter set forth in sufficient detail to enable those persons skilled in the art to clearly understand the function, operation, construction and advantages of it when read in conjunction with the accompanying drawings.

BRIEF DESCRIPTION OF THE DRAWINGS

FIGS. 5a and 5b show a detailed description of the register RO-24;

FIGS. 10a, 10b and 10c show the arithmetic unit UA-7 and UB-17;

FIGS. 12a and 12b show the networks NA-8 and NB-18;

SUBJECT INDEX

Figure 1:
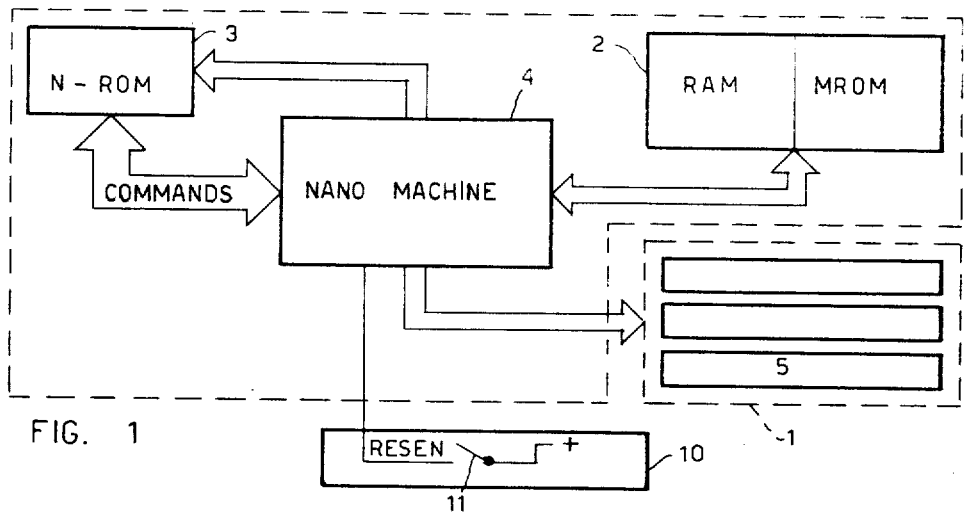
FIG. 1 is a block diagram of a computer embodying the invention.

A. General description
B. Detailed description
1. Instruction register RO-24
2. Nanoinstruction memory NROM-3
2.1 Control section CROM-25
2.2 Enabling section TORM-26
2.3 Timing section VROM-27
3. Circuit generating the clock signals OSC10 and OSCBO
4. Execution of the microinstructions
5. Operative registers RA-6 and RB-16
6. Arithmetic unit UA-7 and UB-17
7. Switching elements DI-21
8. Switching networks NA-8 and NB-18
9. Backing registers BA-9 and BB-19
10. Output register BM-20 data from the memory
11. Addressing register BC-22 of the memory
12. Channel logic, EXT-23
12.1 Decoding network for the priorities associated with the microinterrupts
12.2 Microinterrupt consent generating network
12.3 Network generating the strobe signals requesting the microinterrupts
12.4 Timing network for transfers of characters and commands
12.5 Data output network
12.6 Data input network
13. Set of microinstructions

C. EXAMPLES

14. RESET microinstruction
14.1 Computation of the bits of VROM-27
15. Microinstruction ALFA
16. Microinstruction SEDI
17. Microinstruction AMIP
18. Microinstruction AMI

D. SUMMARY

A. General Description

A brief description of a computer employing the central unit according to the invention will now be given with reference to FIG. 1. The computer comprises a central unit 1 (CPU) comprising in turn a memory 2 adapted to contain programs (RAM) and microprograms (MROM), and a memory 3 (NROM) adapted to generate the commands necessary for the operation of the CPU 1. More particularly, the commands generated by the NROM 3 control the flow of the information within an assembly of circuits called collectively the nanomachine 4. Effectively there are therefore a first memory RAM, a second memory MROM 2 and a third memory NROM 3.

Three machine levels can therefore be distinguished in the computer. The first is that relating to the instructions of the user's programs. This level is controlled by the user program and comprises that memory part indicated as RAM and the entire assembly of elements of the CPU 1 which are necessary for executing the instructions.

The second level comprises the MROM-2 and all the circuits for reading the microinstructions therefrom. The execution of the microprograms by the second machine level is responsive to the instructions which address from time to time the microprograms associated with the MROM 2. This level is not accessible to the user.

The third machine level comprises the NROM 3 and all the circuits which execute the operations required by the microinstructions.

The nanomachine 4 is moreover connected to a group of peripheral units 5 for all the data input and output operations. It is furthermore connected to a console 10 having a key 11 for initializing the nanomachine in the manner which will be described hereinafter. The instructions recorded in the RAM-2 call from the MROM-2 microprograms which carry them out. The microinstructions which make up the microprograms call in their turn from the NROM-3 the nanoinstructions which carry them out, supply to the nanomachine 4 the commands necessary to permit the flow of data.

The nanomachine 4 will now be described in greater detail with reference to FIG. 2.

The nanomachine comprises two groups of elements respectively indicated by the letters A and B and each handling bytes of eight parallel bits.

More particularly, the group A comprises:
an assembly of sixteen operative or working (scratch pad) registers RA-6;
an arithmetic and logic unit UA-7;
a switching and shift network NA-8;
a backing or buffer register BA-9 which contains the data either to be written in one of the sixteen registers RA-6 or to be sent to the peripheral units 5 or to the RAM.

Similarly, the group B comprises the corresponding elements RB-16, UB-17, NB-18 and BB-19. The groups of hardware units of FIG. 2 are functionally duplicated (groups A and B) for the purpose of providing separate data paths for the eight most significant bits (group B) and the eight least significant bits (group A) and for allowing the facility of interaction therebetween through the switching networks NA-8 and NB-18.

Moreover, the following elements are also included in the nanomachine 4:
The data output channel BM-20 of the RAM-2 which is connected to the network NA-8.
A group of eight flip-flops called switching elements DI-21 which staticize particular internal conditions, these being also connected to the network NA-8.
An addresser BC-22 of the memory 2, which receives the addresses from the operative registers RA-6 and RB-16.
Channel logic EXT-23 connected to the registers BA-9 and BB-19 which handles the flow of data between the nanomachine 4, the memory 2 and the peripherals 5.

Figure 2:
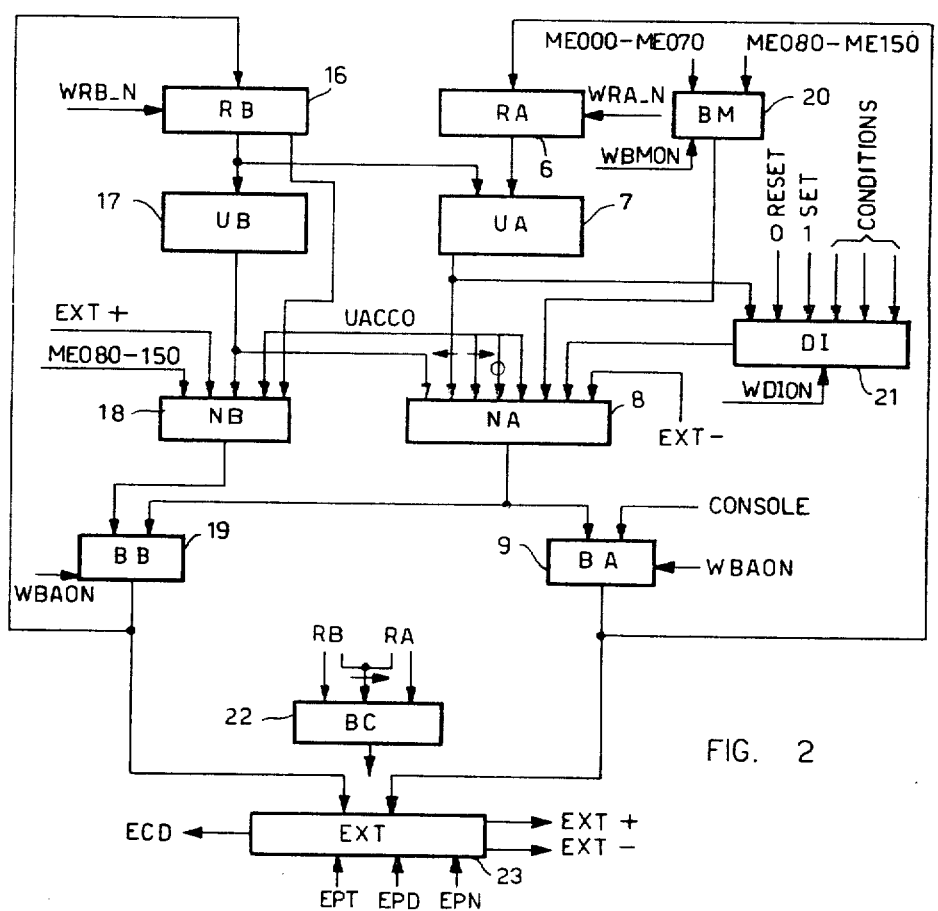
FIG. 2 is a block diagram of the CPU of the computer.

The execution of each microinstruction corresponds uniquely to a given flow of data through the elements shown in FIG. 2. The possible flows may be divided into groups according to the elements involved.

More precisely, it is possible to speak of circular flow of data if, starting from the registers RA-6 and/or RB- 16, the data passes through UA-7, NA-8, BA-9, and/or UB-17, NB-18 and BB-19, respectively, and is rewritten in RA-6 and/or RB-16. This is the case for example, with arithmetic and logical operations in which the operands recorded in the registers RA-6 and RB-16 are processed by UA-7, UB-17 and the results are rewritten in RA-6 and RB-16.

It is moreover possible to have a flow of data which, in addition to the elements used in the circular flow, also involves the data channel BM-20 and the addressing register BC-22 of the memory 2. This flow is used in the operations involving the memory 2.

Finally, it is possible to have a third flow of data which, in addition to the elements used by the foregoing flows, also involves the channel logic EXT-23.

Of course, this third flow may be direct either from the nanomachine 4 to the outside through BA-9 and BB-19 and the channel ECD, or from outside to the nanomachine 4 through the channels EXT+ and EXT−.

All the flows which have just been described must be handled by the control signals or commands coming from the NROM-3 in correspondence with the microinstruction selected. More precisely, these commands must enable the elements concerned in the flow selected and for each of these they must select only the input associated with the flow to be obtained.

A detailed description of a number of flows relating to particular microinstructions will be given hereinafter with reference to FIGS. 22, 23, 25, 27a and 27b.

The nanomachine will now be described with reference to FIGS. 3a, 3b and 3c and for each element all the signals relating thereto will be made clear. That is, the input signals, the output signals and the command and timing signals.

As has been said, the memory 2 contains both the programs and the microprograms; more precisely, the programs and the data to be processed are contained from address 0000 to address 3FFF (these addresses constituting the first memory) while the microprograms are recorded from address 4000 onwards, constituting the second memory. Of course, both the total capacity of the memory and the point at which the division is made may be varied according to specific requirements. The output of the memory 2 is constituted in this embodiment by sixteen bits ME00-ME15 which are loaded into an output register RO-24 having a capacity of sixteen bits. The significance of the fifth character in the bit designations actually shown in the Figures will be explained later on. These bits may be loaded into the 8-bit capacity data register BM-20, into which the eight most significant or least significant bits may be loaded according to the logical level of the signal BPBMO. The signal BPBMO and all the other conditioning signals in FIGS. 3a and 3b are generated by circuits which will be described in detail hereinafter. Only the function performed by these signals is indicated. The manner in which the register RO-24 is loaded is specified by the signals given to the left thereof and by the signal ME150 coming from the memory.

The bits from RO080 to RO140 of the register RO-24 are used to address the NROM-3. This address corresponds to the code of the microinstruction staticized in the register RO-24.

The NROM-3 has parallelism of 32 bits and can be regarded as divided into three memories, the CROM-25, the TROM-26 and the VROM-27, which respectively contain the control signals CR000 – CR1505 the signals TR000 – TR070 enabling writing in the registers and, finally, the timing signals VR000 – VR070. The signals output by the NROM-3 all act both directly and indirectly on the elements of the nanomachine 4. A word provided by the NROM-3 can include signals of two types from a first group, namely a first type control signal from the CROM-26, and a second type enabling signal from the TROM-26 and can also contain a signal from a second group, namely a timing signal from the VROM-27.

Figure 4A:
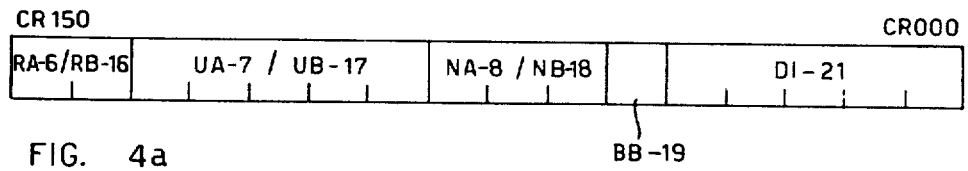
FIG. 4a shows the bits of the CROM-25.

More particularly, the signals CR000 – CR040 (FIG. 4a) act on the switching elements DI-21 to define the operation thereof.

The signal CR050 selects one of the two possible inputs of the register BB-19. The signals CR060 – CR080 select one of the possible inputs of the networks NA-8 and NB-18.

The signals CR090 – CR130 specify one of the possible functions of the arithmetic units UA-7 and UB-17. Finally, the signals CR140 and CR150 control the addressing of one of the sixteen operative registers RA-6 and/or RB-16, respectively. The signals CR000 – CR040 are decoded by a decoder 28 which generates the eight signals CC000 – CC110 which act on the circuits of the nanomachine 4 in the same way as the signals CR000 – CR150. This subsequent decoding of the control signals is effected to reduce the parallelism of the CROM-25.

The signals output by the TROM-26, that is TR000 – TR070, do not act directly on the circuits of the nanomachine, but are combined with the timing signals to generate the master signals enabling or inhibiting writing in the registers which so require. More particularly (FIG. 4b), the signals TR000 and TR010 enable writing in the register RA-6, the signals TR020 and TR030 enable writing in the register RB-16, the signal TR050 enables writing in the register BC-22, the signal TR060 enables writing in the switching elements DI-21 and, finally, the signal TR070 inhibits writing in the register RB-16. The signal TR040 is used to indicate the duration of the microinstruction. It is made clear that in order to be executed each microinstruction requires two phases: a reading phase called pahse ALFA in which the microinstruction is read from the MROM-2 and is transferred to the register RO-24, and an execute phase called phase BETA in which the microinstruction is executed. Both phase ALFA and phase BETA are implemented by nanoinstructions. More particularly, while phase ALFA is implemented by a single nanoinstruction, phase BETA may require one or two nanoinstructions. The bit TR040 distringuishes the duration of phase BETA, that is with TR040 = 1 this phase is executed by means of a single nanoinstruction, while with TR040 = 0 it is executed in two nanoinstructions. This mechanism will be better shown hereinafter with reference to the circuits of the NROM-3.

The signals output by the VROM-27 are serialized by a serializer 29. The instants of enabling of reading of the signals VRA00 – VRA30 and VRB30 are defined by an oscillator OSC-30 having an oscillation period of 50 ns. The signal VROMO output by the serializer 29 therefore copies the signals VRA00 – VRB30, serializing them; the resultant binary sequence is used to time the nanoinstruction. This mechanism will be made clearer with reference to the circuits of the VROM-27.

From what has been said it will be clear how the signals output by the CROM-25 select the elements of the nanomachine 4 which are concerned in the execution of a particular microinstruction and for each element they establish the operation thereof. The signals output by the TROM-26, on the other hand, enable writing or reading in those elements which require this. Finally, the signals output by the VROM-27 time the flow of the data through the elements of the nanomachine and the memories.

The operative registers RA-6 and RB-16 are addressed by the eight least significant bits of the microinstruction which are contained in the register RO-24. More precisely, as shown in FIG. 3a, the choice between the groups of bits RO000 – RO030 and RO040 – RO070 is made by the signal CR140 for RA-6 and by the signal CR150 for RB-16. Moreover, the signals WRAMN, WRAPN, WRBMN and WRBPN enable writing to be carried out selectively in the most significant semibyte (WR-PN) and in the least significant semibyte (WR-MN) of the registers RA-6 and RB-16. These enabling signals are obtained from the bits TR000 – TR030 combined with the timing signals VROMO output by the VROM-27. The registers RA-6 and RB-16 are moreover inhibited by the signals DIMEO and DIRBO, respectively.

The arithmetic units UA-7 and UB-17 are controlled by the signals CR090 – CR130. More particularly, the signal CR130 distinguishes between arithmetic and logical operations, while the signals CR090 – CR120 define the particular arithmetic or logical operation to be effected. If CR090 – CR130 are all "1", the data from RA-6 and RB-16 is transferred unchanged through UA-7 and UB-17.

The signals CR000 – CR040 command the switching elements DI-21, which, as has been said, comprise eight flip-flops D1000 – D1070. The first three D1000 – D1020 are used by UA-7 and UB-17 for staticising particular conditions associated with the arithmetic and logical operations effected. These conditions are recognized by a deconder 36, which has the outputs of UA-7 and UB-17 as input. Moreover, the switching elements DI-21 can be loaded with the bits output by UA-7. The way in which the switching elements are loaded is defined by RO000 – RO070, RO090 and RO100, CR000 – CR040. The outputs from the switching elements DI-21 can be applied to the network NA-8. The signals input to the switching elements DI-21 are transferred to the flip-flops DI000 – DI070 at the instant defined by the writing enabling signal WDION, which is obtained from the bit TR060 combined with the timing signals VROMO output by the VROM-27.

The signals CR060 – CR080 select one of the eight inputs of the network NA-8. More particularly, these inputs have a parallelism of eight and comprise:

the least significant bits EXT- coming from the channel logic EXT-23,
the bits coming from the arithmetic unit UB-17,
the bits coming from the data channel BM-20,
the bits coming from the arithmetic UA-7,
the bits coming from the arithmetic unit UA-7 rotated by four places (ROTA),
the bits coming from the arithmetic unit UA-7 shifted by one place to the left, SHS,
the bits coming from the arithmetic unit UA-7 shifted by one place to the right, SHD,
the bits coming from the switching elements DI-21.

In the shifting to the left or right, the least significant or most significant bit, respectively, may be replaced by the contents of the switching element DI000 or zero.

The signals CR060 amd CR070 select one of the four inputs of the network NB-18. These inputs have a parallelism of eight and are constituted by:

the most significant bits EXT+ coming from the channel logic EXT-23,
the bits output by the arithmetic unit UB-17,
the bits coming from the arithmetic unit UA-7,
a combination of the bits coming from the memory 2 (ME080 – ME150)
with the bits RB050 – RB070 coming from the operative registers RB-16 and with the bit RO150 coming from the register RO-24. This combination is defined by the signal CC02N coming from the CROM-25 through the medium of the decoder 28.

It is made clear that both the network NA-8 and NB-18 and the arithmetic units UA-7 are UB-17 are purely combinational networks and therefore do not need enabling signals (TR000 – TR070). In other words, the signals are their input are present at the output after a time equal to the propagation time characteristic of the combinational network concerned.

The signal CO07N coming from the CROM-25 through the decoder 28 selects one of the two inputs of the buffer register BA-9. These inputs are either the outputs NA000 – NA070 or the bits CON00 – CON70 coming from the operating console 10 of FIG. 1. The signal CR050 enables the buffer register BB-19 to select as input the bits NA000 – NA070 or NB000 – NB070.

Both the registers BA-9 and BB-19 are normally enabled for writing by the signal WBAON. Their inhibition is obtained, contrary to the signals of the other registers, from the signal VROMO.

The register BA-9 receives as input the data coming from the console 10 and, through the medium of the node NA-8, from:
the switching elements DI-21
the arithmetic units UA-7 and UB-17
the memory 2 through the medium of the register BM-20
the peripheral units through the medium of the channel logic EXT-23.

The register BB-19 receives as input, in addition to all the signals coming from the network NA-8, also the signals coming from the network NB-18, that is:
channel logic EXT-23
arithmetic unit UB-17
arithmetic unit UA-7
memory 2 by means of the bits ME080 – ME150.

The outputs of the registers BA-9 and BB-19 are connected to the operative registers RA-6 and RB-16, respectively, and to the channel logic EXT-23.

The signals CC04N, CC09N and CC11N coming from the decoder 28 control the operation of the channel logic EXT-23. AS herein-before mentioned, the channel logic EXT-23 comprises a combinational network which handles the flow of the data from the memory 2 and the peripherals 5 to the nanomachine 4 and vice versa. It moreover activates the microprogram of highest priority among those which have generated a microinterrupt. To this end, all the microprograms recorded in the MROM-2 are divided into four priority levels each intended to handle particular classes of interrupt. More particularly, the minimum priority level (level 4) handles all the operations required by the user's programs recorded in the RAM-2 which concern solely the memory 2 and the nanomachine 4. Levels 1, 2 and 3 are reserved for all the operations which involve the peripheral units, according to the speed with which the exchange of data and commands takes place. With each microprogram level there is associated a particular 16-bit addressing register allocated in the operative registers RA-6 and RB-16.

Figure 3A:
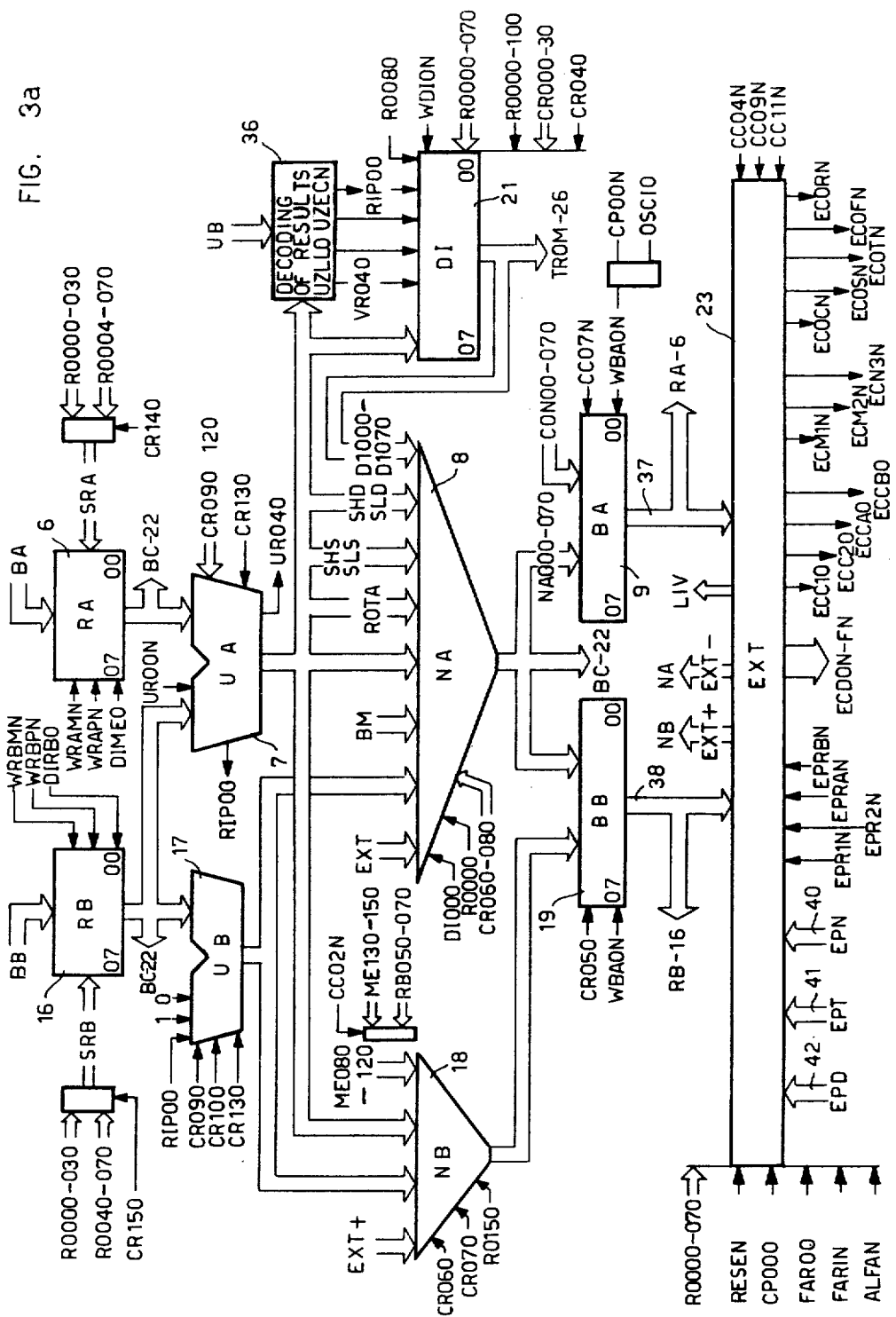
FIGS. 3a and 3b are a detailed diagram of the CPU of FIG. 2.
Figure 3B:
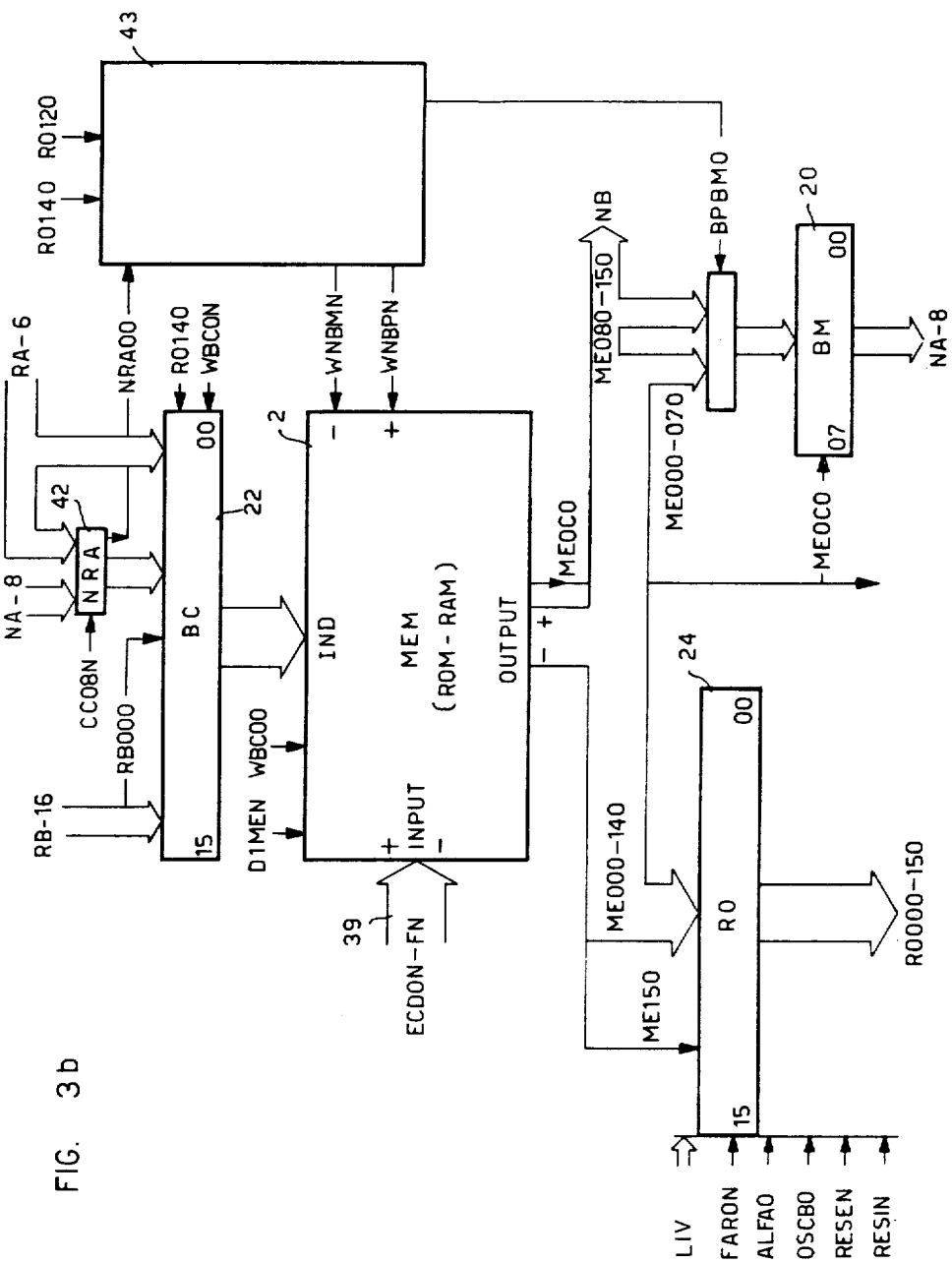

Requests for microinterrupts by the peripheral units 5 are encoded by the signals EPR1N (level 1), EPR2N (level 2), EPRAN and EPREN (level 3) which provide in two bits LV120 and LV140, indicated by LIV in FIG. 3a, the selection of the addressing register of the microprogram associated therewith.

As will be better explained hereinafter, the two bits LIV are forced directly into the locations RO000 − RO030 of the register RO-24 and are used by this to select the corresponding addressing register. In addition the channel logic EXT-23 generates for each activated level the consents ECC10, (level 1), ECC20, (level 2),ECCAO, ECCBO (level 3). These consents inform the interrupting peripheral unit that the microinterrupt has been accepted by the nanomachine 4. In addition to the consents, the channel logic EXT-23 generates the strobe signals ECM10 (level 1), ECM20 (level 2) and ECM30 (level 3) which synchronizes the interrupt requests coming from the peripheral units 5 with the timing of the nanomachine 4. These strobe signals are generated cyclically at the end of each microinstruction, inasmuch as the latter constitutes the uninterruptable elementary function. More particularly, the signals ECM10, ECM20 and ECM30 appear at "1" logical level when the nanomachine 4 is at level 4 and they consequently enable the possible microinterrupts of levels 1, 2 and 3. If, on the other hand, any one of the three levels is activated, the corresponding strobe signal and those of lesser priority are inhibited throughout the execution of the activated microprograms. If, for example, a microprogram of level 2 is executed, ECM2 and ECM3 are deactivated, while ECM1 remains activated to synchronize possible microinterrupts of level "1".

During the execution of microinterrupts, the channel logic EXT-23 sends to the peripheral units 5 concerned special synchronism signals ECOC, ECOT, ECOS, ECOF and ECOR which will be better explained hereinafter.

The data output by the nanomachine 4 and present on the output channels 37 and 38 of the registers BA-9 and BB-19, respectively, is sent directly from the channel logic EXT-23 on the 16-bit channel ECD-39 either to the peripheral units 5 or to the RAM-2. The data coming from the peripheral units 5 is sent on three channels EPN-40, EPT-41 and EPD-42 and, more precisely, the channel EPN-40 carries the name of the interrupting peripheral, the channel EPT-41 the type of peripheral interupt, and the channel EPD-42 the data coming from the peripheral. The channel EPT-41 is connected directly through the channel logic EXT-23 to the channel EXT+ which, as has been said, constitutes one of the inputs of the switching network NB-18. The channels EPN-40 and EPD-42, on the other hand, may be connected alternately by the channel logic EXT-23 to the channel EXT-, which is one of the inputs of the switching network NA-8.

Finally, all the operations of the channel logic EXT-23 are controlled by the signals indicated to the left thereof in FIG. 3, which will be described in greater detail hereinafter.

The addressing register BC-22 of the memory 2 may be loaded in the following ways: 1) directly at one of the registers of RA-6 and of RB-16; 2) from the register RB-16 and from the switching network NRA-42 having as inputs the network NA-8 or the operative registers RA-6.

Figure 3C:
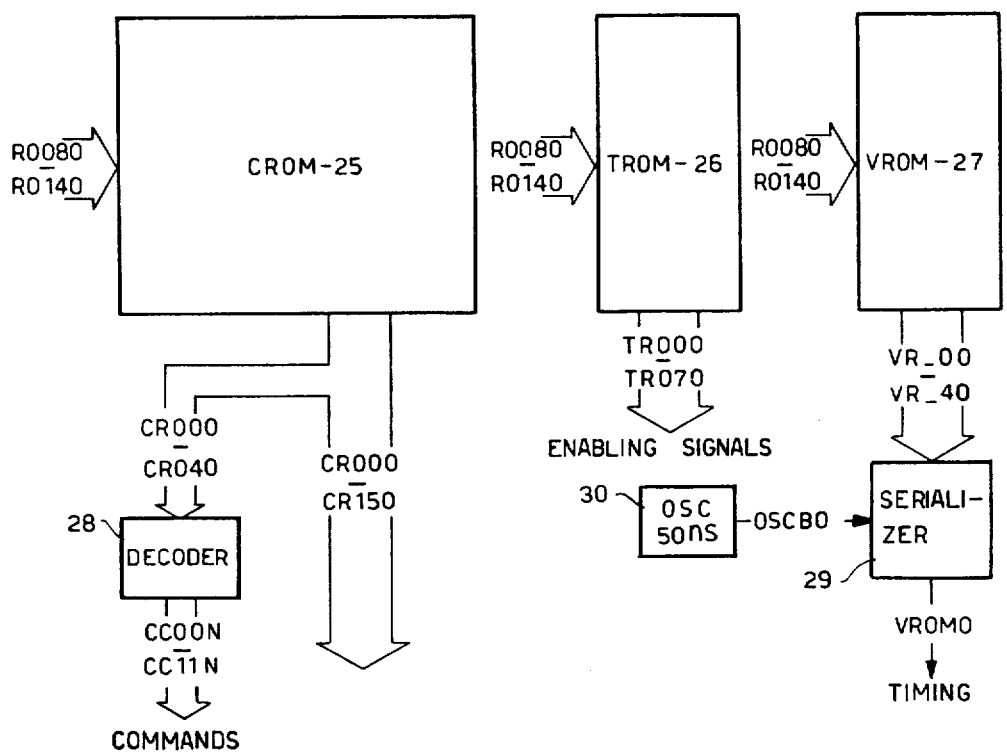
FIG. 3c is a diagram of the NROM-3.

The switching network NRA-42 is controlled by the signal CC08N coming from the decoder 28 (FIG. 3c). The addressing register BC-22 is moreover controlled by the signal RO140 coming from the register RO-24, which indicates, if at "1" logical level, that the address present at the inputs must be loaded into BC-22 without modification. On the other hand, RO140 = 0 indicates that the address present as input to the register BC-22 must be divided by two (that is, shifted by one place to the right with insertion of a "zero" to the left). This is done since the memory 2, although it has 16-bit parallelism, is used both as ROM (with 16-bit parallelism) and as RAM (with 8-bit parallelism), and therefore in each reading or writing operation it is necessary to specify the parallelism with which it is desired to operate. More particularly, if the bit RO140=0 (8-bit parallelism), it is necessary to analyze the least significant bit of the address input to the register BC-22. In fact, if this address is odd, it will be necessary to enable the reading or writing of the least significant byte of the word in memory (16-bit) addressed; if, on the other hand, this address is even, it will be a matter of the most significant byte. Analysis of the odd or even nature of the address is effected by a circuit 43 which will be described in detail hereinafter and which generates selectively the signals WMBMN and WMBPN if the writing of the least significant byte or the most significat byte, respectively, is enabled. The circuit 43 moreover generates the signal BPBMO for enabling the reading of the least or most significant byte from the memory 2 and the transfer thereof to the data channel BM-20. The circuit 43 is enabled for operation by the signal RO140= 0 (reding from RAM), since in the case of reading from ROM (RO140 = 1) the whole word of sixteen bits which is addressed is read. From what has been said it will be clear that each addressable location of the memory 2 (16-bit parallelism) contains a single word if the operation is being carried out in the ROM(-RO140 = 1), or it contains two words of eight bits if the operation is being carried out in the RAM (RO140=1). Thus, for example, if it is desired to read the words in the RAM at addresses 500 and 501 it will be necessary to address the memory 2 at the absolute address 250 and read successively the most significant byte and the least significant byte and the least significant byte, respectively.

It is to be noted, finally, that the addressing register BC-22 is enabled for writing by the signal WBCON which is obtained by the decoding of the bits of the TROM-26 in the manner which will be described hereinafter.

B. Detailed description

A detailed description of the individual blocks of the nanomachine of FIGS. 3a and 3b will now be given with reference to FIGS. 4 to 20 in order to show more clearly the manner in which the signals output at the CROM-25, the TROM-26 and the VROM-27 operate on the nanomachine.

For each block there will be provided a detailed diagram of the circuits of which it is composed (NAND, NOR, AND, flip-flop circuits) and the truth tables of the block itself. The circuits making up the individual blocks will not be desribed in detail, since they are known in the field of circuit design and are commonly available on the market. However, for further explanations on these circuits mention is made of the book by Jacob Millman and Herbert Taub entitled "Pulse Digital and Switching Waveforms" and published in 1965 by McGraw-Hill Inc.

It is made clear that the following nomenclature will be used in the course of the detailed description:

the signals are identified by five characters which may refer both to their origin and to the function performed. In each case, the last character, if "0", indicates that the signal is direct, if "N", indicates that the signal is inverted.

the inputs of the logic elements may moreover be connected to earth or ground (zero logical level) and in this case the symbol "M" will be given, or they may be at "1" logical level and in this case are indicated by the symbol "Z".

the power supplies of the various circuits are indicated by the symbol "T".

the logic elements described are identified either by a number or by the five characters which specify the signals on their output.

all the conditioning inputs (enabling and timing of the logic elements) are indicated by a small circle.

the inputs of the multiplexers are regarded as numbered from 0 to ($n-1$) starting from the top; for the selection of one of these inputs, $m$ signals are required where $n = 2^m$. The $m$ signals select the input corresponding to the decimal number represented by them in binary. For example, a multiplexer with eight inputs ($n=8$) requires three selection signals ($m=3$). To select the fifth input, the selection signals must assume the configuration "100".

into four groups each including four multiplexers. All the multiplexers making up the register RO-24 are enabled to present the signals at their outputs on arrival of the timing signal FAR1N, which will be described hereinafter with reference to the NROM-3. The signals which select the input are repectively ALR10 for the first and third groups of multiplexers, that is RO000 − RO030 and RO080 − RO110, ME150 for the second group RO040 − RO070 and ALR00 for the fourth group RO120 − RO150. These signals are generated by the circuit formed by the flip-flop 50 of the J-K type, the NAND elements 51 and 53 and the NOT element 52. As input to the flip-flop 50 there are the signals OSCBO, FAR1O and RESEN. The signal RESEN is the direct set input of the flip-flop 50, that is this can change over only in the presence thereof. The signal OSCBO is the timing signal for the flip-flop 50, that is the latter changes over with its trailing edge. As output there is therefore generated the signal RESEN which copies the signal FAR1O at the instants specified by the signal OSCBO. The operation of the circuit 51, 52, 53 is summarized in the truth table in Table 1, in which the levels of the signals ALROO, ALR10 and MB150 which select the inputs of the aforesaid four groups of multiplexers in the register RO-24 are shown for each combination of ALFAO, RES1N, ME150. If the signal ALROO = 1, the lower inputs of the fourth group of multiplexers are selected, that is RO120=Z, RO130-=RES1N, RO140=Z, RO150=RES1N, If, on the other hand, ALROO = 0, the upper inputs are selected, that is RO120 = ME120, RO130=ME130, RO140=ME140, RO150-1. Similarly, the signal ALR10=1 sends in the bits RO0080 − RO110 the signal ALRON, while ALR10=0 selects as input the bits MEO80=ME110; ALR10=1 moreover selects the level bits LV14N, M, LV120, LV120 at the outputs RO000 −RO030, while AIR10=0 selects the memory bits ME000–ME030. The signal ME150=1 selects the bits ME040–ME070, while ME150–0 selects ME080–ME110 at the outputs RO040–RO070.

TABLE 1

| ALFAO | RESIN | ME150 | MULTIPLEXER INPUT SELECTION | | | | OUTPUT OF REGISTER RO-24 | | | | | | | | | | | | | | | |
|---|---|---|---|---|---|---|---|---|---|---|---|---|---|---|---|---|---|---|---|---|---|---|
| | | | ALROO | ALRIO | ME150 | ALRIO | R0015 | R0014 | R0013 | R0012 | R0011 | R0010 | R009 | R008 | R007 | R006 | R005 | R004 | R003 | R002 | R001 | R000 |
| 0 | 0 | 0 | | | | | 0 | 1 | 0 | 1 | 0 | 0 | 0 | 0 | ME | ME | ME | ME | | | | |
| 0 | 1 | 0 | | | | | 1 | 1 | 1 | 1 | 0 | 0 | 0 | 0 | 1 | 1 | 0 | 0 | | | | |
| 1 | 0 | 0 | 1 | 1 | 0 | 1 | 0 | 1 | 0 | 1 | 0 | 0 | 0 | 0 | 1 | 0 | 9 | 8 | | | | |
| | | | | | | | | | | | | | | | 0 | 0 | 0 | 0 | | | | |
| 0 | 0 | 1 | | | | | 0 | 1 | 0 | 1 | 0 | 0 | 0 | 0 | ME | ME | ME | ME | | | | LV120 |
| 0 | 1 | 1 | | | | | 1 | 1 | 1 | 1 | 0 | 0 | 0 | 0 | 0 | 0 | 0 | 0 | | | | LV120 / 0 |
| 1 | 0 | 1 | 1 | 1 | 1 | 1 | 0 | 1 | 0 | 1 | 0 | 0 | 0 | 0 | 7 | 6 | 5 | 4 | | | | LV14N |
| | | | | | | | | | | | | | | | 0 | 0 | 0 | 0 | | | | |
| 1 | 1 | 0 | 0 | 1 | 0 | 1 | ME14 0 | ME13 0 | ME12 0 | | | | | 1 1 1 1 | ME11 0 | ME10 0 | 9 0 | 8 0 | | | | |
| 1 | 1 | 1 | 0 | 0 | 0 | 0 | ME14 0 | ME13 0 | ME12 0 | ME11 0 | ME10 0 | ME9 0 | ME8 0 | ME7 0 | ME6 0 | ME5 0 | ME4 0 | ME3 0 | ME2 0 | ME1 0 | ME0 0 | |

1. Instruction Register RO-24 — FIG. 5, Table 1

A detailed description of the register RO-24 will now be given with reference to FIG. 5. The register RO-24 is formed by sixteen multiplexers 251 to 258 and 261 to 268 having the outputs RO000 − RO150 and divided It has been seen from the foregoing description how the various combinations of the input signals ALFAO, RES1N and ME150 select different ways of loading the register RO-24. The origin and significance of these signals will be explained in detail with reference to the description of the microinstructions.

2. Nanoinstruction memory NROM-3, (FIGS. 6a–6e)

As previously mentioned, the NROM-3 is addressed by the bits RO080–RO140 of the register RO-24. Therefore, the number of locations which are addressable with the code of the microinstruction is 128. In the embodiment described here, each microinstruction can be implemented by means of one or two nanoinstructions, according to the value of the bit TR040 of the TROM-26. This bit changes the flip-flop 54 (FIG. 6a) over if at "0" level, that is the signal STCRO is forced to "1".

Figure 6A:
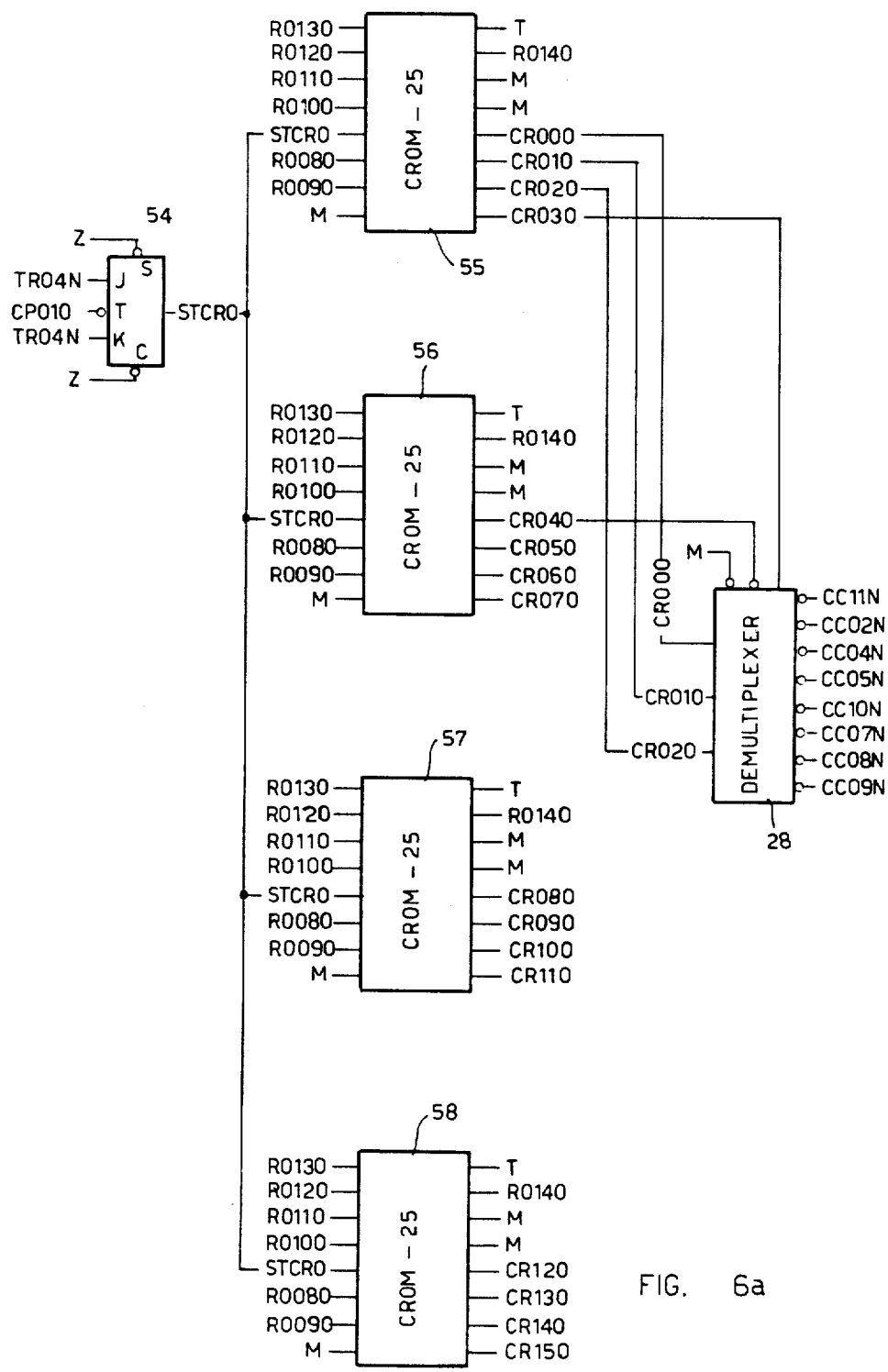
FIG. 6a shows the CROM-25.

The signal STCRO, together with the bits RO080–RO140, constitutes the address of the NROM-3; more particularly, however, all the 128 memory locations having an odd address (that is, STCRO=1) are used only in the case where a microinstruction requires two nanoinstructions (TR040 = 0) to be executed. To sum up, the NROM-3 is formed by 256 addressable locations, of which the even locations are accessible by means of the code of the microinstruction (RO080–RO140) with STCRO=0, while each odd location is accessible solely from the even location which precedes it if, and only if, the corresponding microinstruction so requires (TR040=0). Of course, this is only an exemplification, since if more than one bit of the TROM-26 is used, the number of nanoinstructions required may be specified for each microinstruction. For example, if two bits of the TROM-26 are used, each microinstruction can be implemented by means of a nanoprogram formed at the most by four nanoinstructions. In the example of FIG. 6a, the bit TRO4N conditions both the inputs of the flip-flop 54, so that if this bit is at "1" level (two nanoinstructions) the output STCRO=1 will be obtained and, consequently, the present address is incremented by one at the instant defined by the trailing edge of the signal CP010 which, as will be seen, defines the end of a nanoinstruction.

If, on the other hand, TRO4N=0, the output STCRO=0 will be obtained, so that the address is not incremented and the corresponding microinstruction is completed.

The address of the following nanoinstruction will of course be even, inasmuch as STCRO is always equal to zero at the end of each microinstruction. In fact, if a microinstruction is implemented by two nanoinstructions, the position will be that the bit TR040 of the first of these is equal to zero, while the bit TR040 of the second is equal to one.

2.1 Control Section CROM-25. FIG 6a, Table 2.

The CROM-25 is obtained by means of four packages 55–58 of the MOS-LSI type commonly available on the market, each of which has a capacity of 256 × 4 bits and is addressed by the bits RO080–RO140 and STCRO.

The outputs of the packages 55–58 are the bits CR000–CR030, CR040–CR070, CR080–CR110, CR120–CR150, respectively. Finally, the bits CR000–CR040 are applied as input to the decoder 28 of known type, which supplies as output the commands CC02N, CC04N, CC05N, CC07B-CC11N. The decoder 28 uses the bits CR030 and CR040 as enabling inputs, that is to say the outputs of the decoder are activated according to the configuration of the bits CR000–CR020 if, and only if, CR030=1 and CR040=0. The decoder 28 is moreover enabled by the leading edge of the signal FAR10. The truth table of the decoder 28 is given in Table 2. This subsequent decoding is effected in order to increase the parallelism of the nanoinstructions without enlarging the dimensions of the CROM-25.

TABLE 2

| | | | | | | | | | | | |
|---|---|---|---|---|---|---|---|---|---|---|---|
| FAR10 | | | | 0 | | | | | 1 | X | X |
| CRO40 | | | | 0 | | | | | X | 1 | X |
| CRO30 | | | | 1 | | | | | X | X | 0 |
| CRO00 | 0 | 1 | 0 | 1 | 0 | 1 | 0 | 1 | X | X | X |
| CRO10 | 0 | 0 | 1 | 1 | 0 | 0 | 1 | 1 | X | X | X |
| CRO20 | 0 | 0 | 0 | 0 | 1 | 1 | 1 | 1 | X | X | X |
| CC11N | 0 | 1 | 1 | 1 | 1 | 1 | 1 | 1 | 1 | 1 | 1 |
| CC02N | 1 | 0 | 1 | 1 | 1 | 1 | 1 | 1 | 1 | 1 | 1 |
| CC04N | 1 | 1 | 0 | 1 | 1 | 1 | 1 | 1 | 1 | 1 | 1 |
| CC05N | 1 | 1 | 1 | 0 | 1 | 1 | 1 | 1 | 1 | 1 | 1 |
| CC10N | 1 | 1 | 1 | 1 | 0 | 1 | 1 | 1 | 1 | 1 | 1 |
| CC07N | 1 | 1 | 1 | 1 | 1 | 0 | 1 | 1 | 1 | 1 | 1 |
| CC08N | 1 | 1 | 1 | 1 | 1 | 1 | 0 | 1 | 1 | 1 | 1 |
| CC09N | 1 | 1 | 1 | 1 | 1 | 1 | 1 | 0 | 1 | 1 | 1 |

Figure 6B:
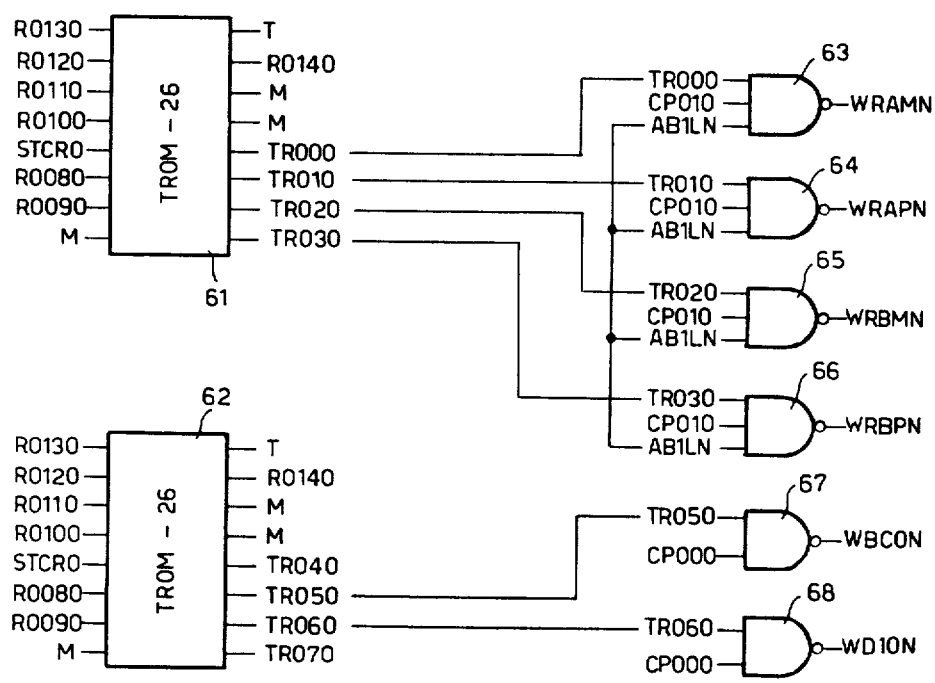
FIG. 6b shows the TROM-26.

2.2 Enabling Section TROM-26. FIG. 6b

The TROM-26 is obtained by means of two packages 61 and 62 each of 256 × 4 bits and of the MOS-LSI type. Each of these is addressed by the bits RO080–RO140 of the register RO-24 and by the bit STCRO, as stated hereinbefore.

The outputs of the package 61 are the bits TR000–TR030, while those of the package 62 are the bits TR040–TR070. The bit TR000 is applied together with the timing signal CP010 and the signal AB1LN as input to the NAND element 63, which generates the signal WRAMN as output. This signal, as has been mentioned hereinbefore (FIG. 4a), is the writing command of the four least significant bits (RA000–RA030) of the operative register RA-6. The signal WRAMN is at "0" logical level if, and only if, all the inputs are at "1" logical level. The condition WRAMN = 0 will therefore be obtained when the following three conditions are satisfied:

1. the operative registers are enabled (TR000 = 1),
2. the timing signal CP010 is present,
3. the conditions required by particular microinstructions and staticized in the switching elements DI-21 are realized, that is the signal AB1LN = 1. Similarly, the NAND elements 64–66 generate the commands WRAPN, WRBMN, WRBPN from the bits TR010–TR030, respectively, and from the signals CP010 and AB1LN. These commands have the following enabling actions:

WRAPN enables the four bits RA040–RA070 of the registers RA-6;
WRBMN enables the four bits RB000–RB030 of the registers RB-16;
WRBPM enables the four bits RB040–RB070 of the registers RB-16.

As has been said hereinbefore when speaking of the addressing of the NROM-3, the bit TR040 establishes whether the microinstruction requires one or two nanoinstructions in order to be implemented. This function is performed by the flip-flop 54 (FIG. 6a) which generates the signal STCRO. The bit TR050 is applied, together with the timing signal CP000, to the input of the NAND element 67. This NAND element 67 generates as output the signal WBCON, which commands the writing operation in the register BC-22, that is to address the memory 2. The bit TR060, similarly to the bit TR050, generates by means of the NAND element 68 the signal WD10N, which commands the writing operation in the switching elements DI-21. The bit TR070, on the other hand, inhibits writing in the operative registers RB-16.

Figure 6C:
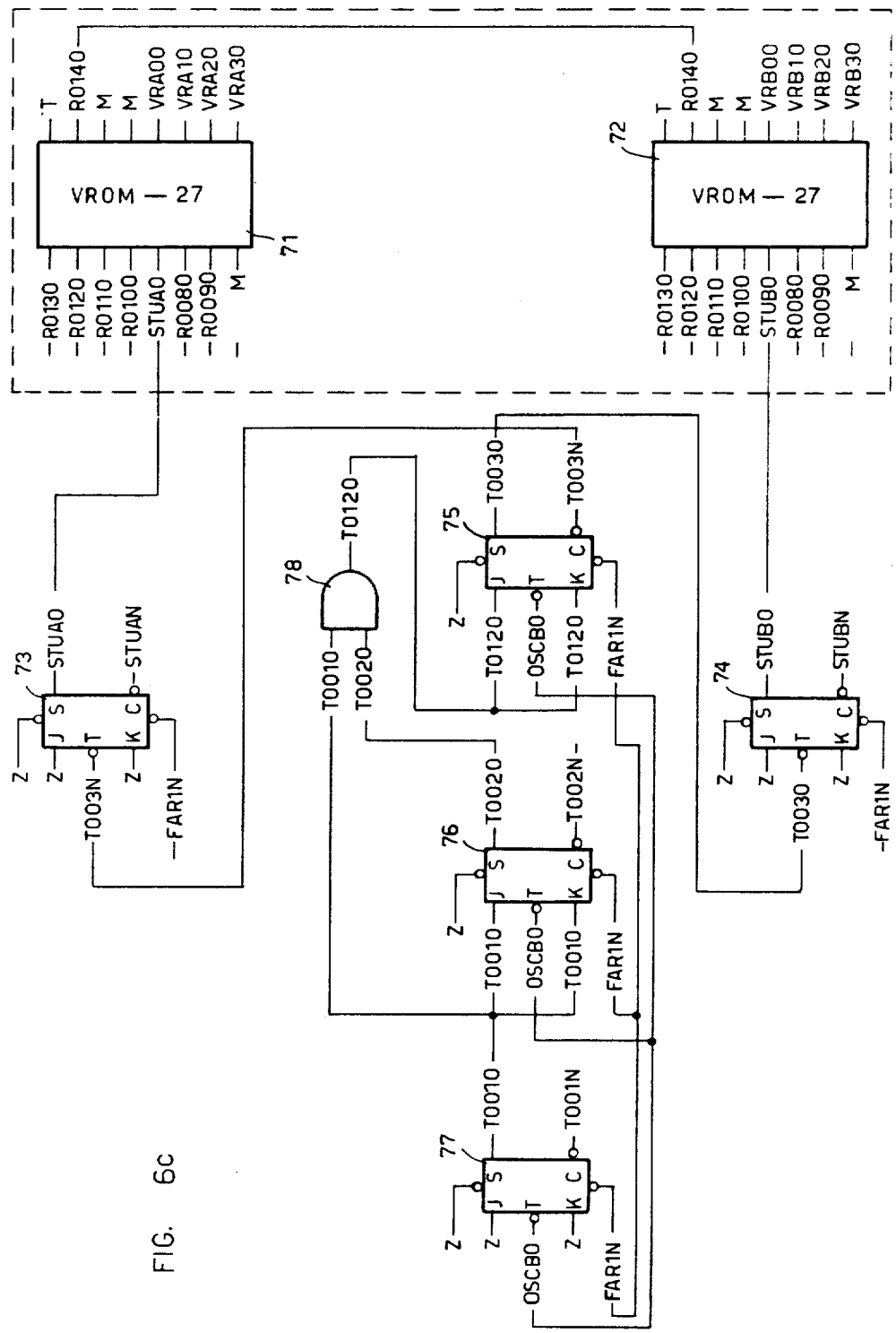
FIGS. 6c and 6d show the VROM-27.
Figure 6D:
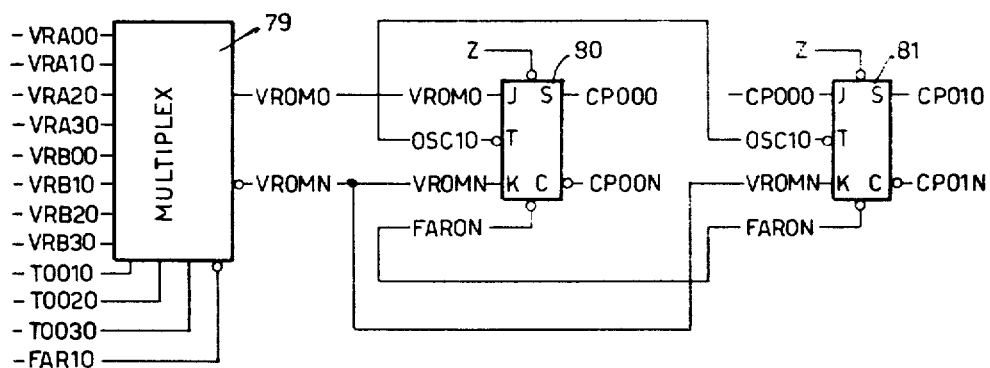

2.3 Timing Section VROM-27. FIGS. 6c, 6d

Figure 6E:
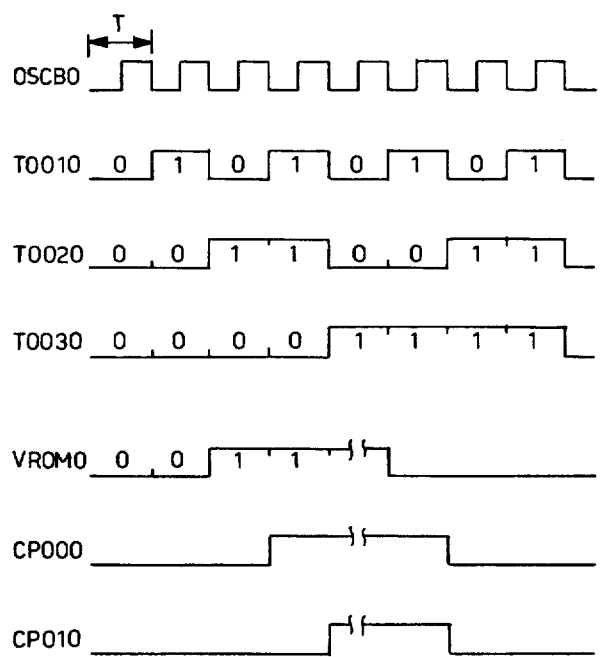
FIG. 6e shows the timing signals of the nanomachine 4.

The VROM-27 is obtained by means of two packages 71 and 72 each of 256 × 4 bits and of the MOS-LSI type. Each of these is addressed by the bits RO08-0–RO140 of the register RO-24 and by the signal STUAO in the case of the package 71 and the signal STUBO in the case of the package 72, which signals have the same function as the signal STCRO in the case of the sections CROM-25 and TROM-26. The two signals STUAO and STUBO are generated by the flip-flops 73 and 74, respectively, which are of the J-K type. These flip-flops have their inputs, S, J and K permanently connected to one logical level. The direct set input C is controlled by the signal FAR1N, which will be explained hereinafter, and the timing input T is controlled by the signal TO03N in the case of the flip-flop 73 and by the signal TO030 in the case of the flip-flop 74. The signals TO030 and TO03N are the outputs of the J-K type flip-flop 75. The flip-flop 75, together with the two flip-flops 76 and 77, forms a counter for eight as is shown in FIG. 6e. In fact, the direct output TO010 of the flip-flop 77 is applied to the inputs J and K of the flip-flop 76, the direct output TO020 of which is applied to the AND element 78 together with TO010. The output TO120 of the AND element 78 is applied to the inputs J and K of the flip-flop 75. The direct set inputs S of the three flip-flops 75, 76 and 77 are permanently connected to one logical level. Finally, the direct reset inputs C and the timing inputs T are controlled by the signals FAR1N and OSCBO, respectively, while the inputs J and K of the flip-flop 77 are permanently connected to one logical level. Consequently, at each cycle T= -50 nsec of the signal OSCBO and, in particular, during its trailing edge, the bits TO010, TO020 and TO030 form in binary the numbers zero to seven.

The outputs of the package 71 are the signals VRA0-0–VRA30, while those of the package 72 are the signals VRB00–VRB30. These outputs are applied to the eight inputs of the multiplexer 79, the selection inputs of which are the bits TO010–TO030, while the enabling input is controlled by the signal FAR10. Consequently, on the changing over of FAR10 (from "1" to "0"), the signals VRA00–VRA30 and VRB00–VRB30 will appear in succession at the output VROMO of the multiplexer 79 at each cycle T = 50 nsec, according to the configuration of the bits TO010–TO030.

It will be clear from what has been said how the multiplexer 79 together with the flip-flops 75, 76 and 77 form a seralizer with a period of 50 nsec for the bits recorded in the VROM-27.

The outputs VROMO and VROMN of the multiplexer 79 are connected to the inputs J and K, respectively, of a flip-flop 80, the output CP000 of which is connected to the input J of a flip-flop 81. The direct set inputs S of the flip-flop 80 and 81 are permanently connected to "1" level, the direct reset inputs C are connected to the signal FARON and, finally, the inputs T are controlled by the signal OSC10 similar to the signal OSCBO. The input K of the flip-flop 81 is controlled by the signal VROMN, while the output is the signal Cp010. The signals CP000 and CP010 are the timing clock signals of the nanomachine 4. It is clear from the circuit (see FIG. 6e) that the signal CP000 copies the signal VROMO introducing a delay of 50 nsec, while the signal CP010 switches to "1" logical level with a delay of 50 nsec after the signal CP000 and returns to zero simultaneously therewith. The configuration VROMO=0, CP000=1 is used to indicate the end of a nanoinstruction; in fact, this end is signalled in the VROM-27 by the last bit at "1" logical level. In consequence of this, each nanoinstruction lasts for an interval of time equal to the whole multiple of 50 nsec which is necessary for its implementation. This characteristic constitutes one of the objects of the invention and will be explained in greater detail hereinafter with reference to FIGS. 8b and 8c.

Figure 7:
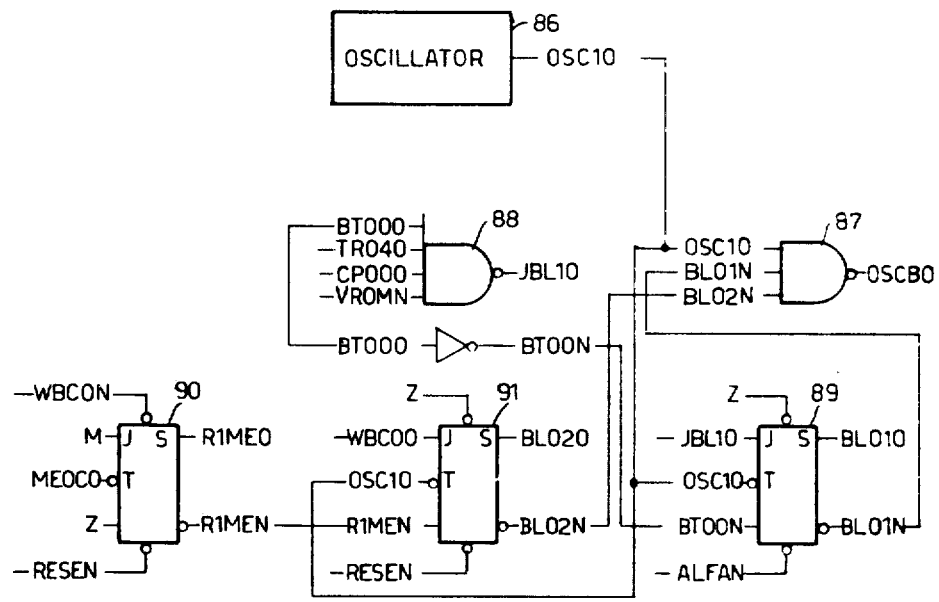
FIG. 7 shows the circuit generating the clock signals OSC10 and OSCBO.

3. Circuit Generating the clock signals OSC10 and OSCBO. FIG. 7

The oscillator 86 generates the signal OSC10 having a period of 50 nsec. The signal OSC20 is applied together with the blocking signals BL01N and BL02N to an AND circuit 87, the output of which generates the signal OSCBO. While OSC10 is always present, OSCBO is generated only if no blocking signal is present (BL01N=BL02N=1). The signal OSC10 is applied to all those circuits of the nanomachine 4 which do not require the conditioning of the blocking signals, while the signal OSCBO is applied to those circuits which must remain inactive during the asynchronous operation of some parts (memory or console 10). The blocking of the timing may come either from the console, BL01N=0, or from the memory 2, BL02N=0. The blocking signal BL01N=0 is used, for example, during the step-by-step execution of a program, while the blocking signal BL02N=0 is used during the operations concerning the memory 2.

The console 10 causes the blocking of the oscillator by activating the signal BT000. This blocking request is accepted only at the end of the microinstruction in progress, which, as has been seen (FIG. 6d), is characterized by the signals TR040, CL000, VROMN all at "1" logical level. It is called to mind that the bit TR040=1 indicates that the nanoinstruction in progress is the last required for terminating the microinstruction.

The condition of BT000, TR040, CP000 and VROMN all being at "1" logical level sends the output JBL10 of the AND 88 circuit 88 to "1". This output is connected to the input J of a flip-flop 89, the input K of which is BT00N, the input T of which is OSC10, the input S of which is always at "1" and the input C of which is the signal ALFAN. The signal ALFAN=1 together with JBL10=1 indicates, as will be explained hereinafter, that the nanomachine 4 has completed the execution of a microinstruction and is preparing to read the code of the following microinstruction from the ROM-2.

To sum up, if a blocking from the console is present, BT000=1, this causes the blocking of the timing (OSCBO=0) if, and only if, the microinstruction in progress has been completed (JBL10=1 and ALFAN changes from 0 to 1).

During the execution of the microinstructions which concern the memory 2, and in particular during the interval of time between the beginning and the end of the reading from, or writing in, the memory 2, the signal OSCBO must be maintained at "0" level. The reason for this is the necessity for deactivating all the elements of the nanomachine, inasmuch as to be able to continue the microinstructions it is necessary to have completed the operation in progress with the memory. The blocking of the nanomachine is effected by the signal BL02N=0, which is generated by the circuit formed by two flip-flops 90 and 91. The flip-flop 90 has as input S the signal WBCON which, if at 1 level, indicates that the memory 2 has received the address from the register BC-22. The input T of the flip-flop 90 is controlled by the signal MEOCO generated by the memory 2. MEOCO=1 is obtained when the reading of the cell addressed by BC-22 is completed, that is the data or instruction is available as output from the memory. Of course the time interval between the loading of the address in memory (WBCON=1) and the reading of the cell addressed (MEOCO=1) depends on the access time of the memory 2. When MEOCO changes from zero to one, the result obtained is that the output R1MEN of the flip-flop 90 is at 1 level and, consequently, the output BL02N of the flip-flop 91 is at 1 level. This causes the unblocking of the oscillator 86 (OSCBO=OSC10). On the other hand, throughout the time during which MEOCO=0 (Memory busy) the signal R1MEN is forced to zero, so that BL02N=0 and, consequently, the timing is blocked (OSCBO=0) for all the circuits which use the signal OSCBO.

Figure 8A:
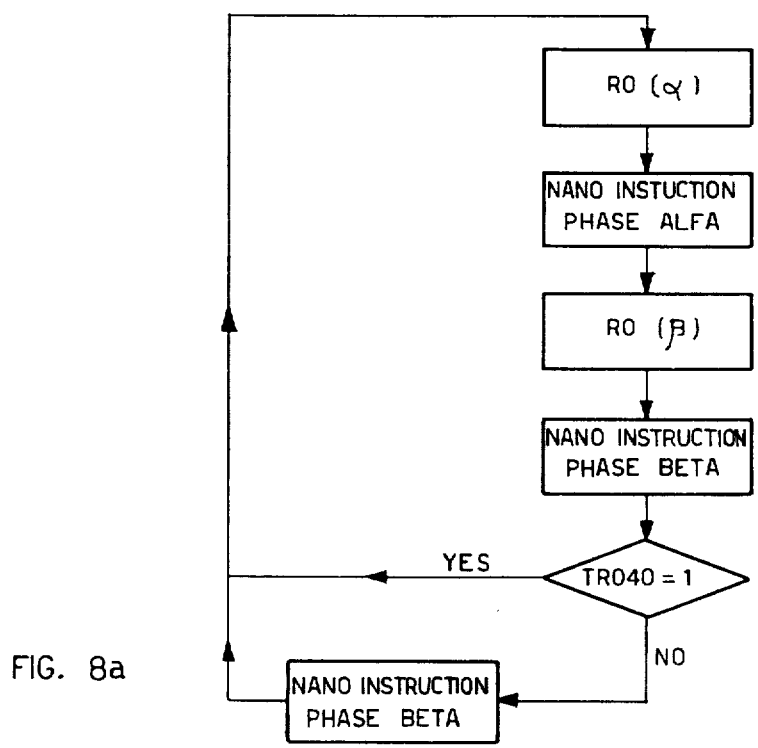
FIG. 8a illustrates the flow of a microinstruction.
Figure 8B:
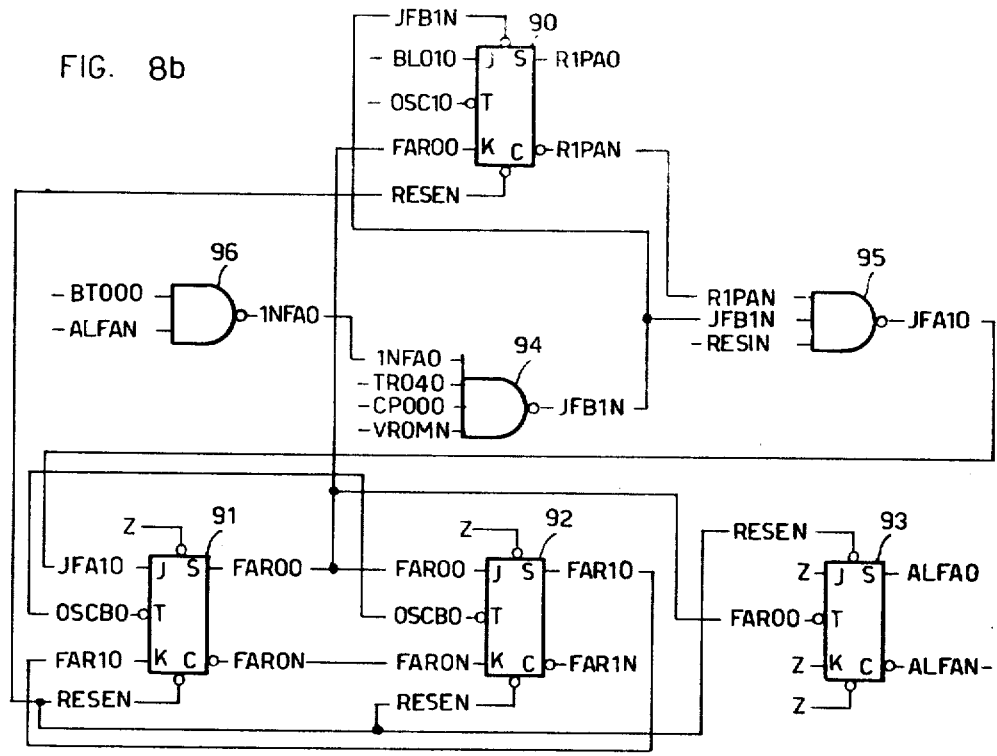
FIG. 8b shows the circuit for switching between phase ALFA and phase BETA.
Figure 8C:
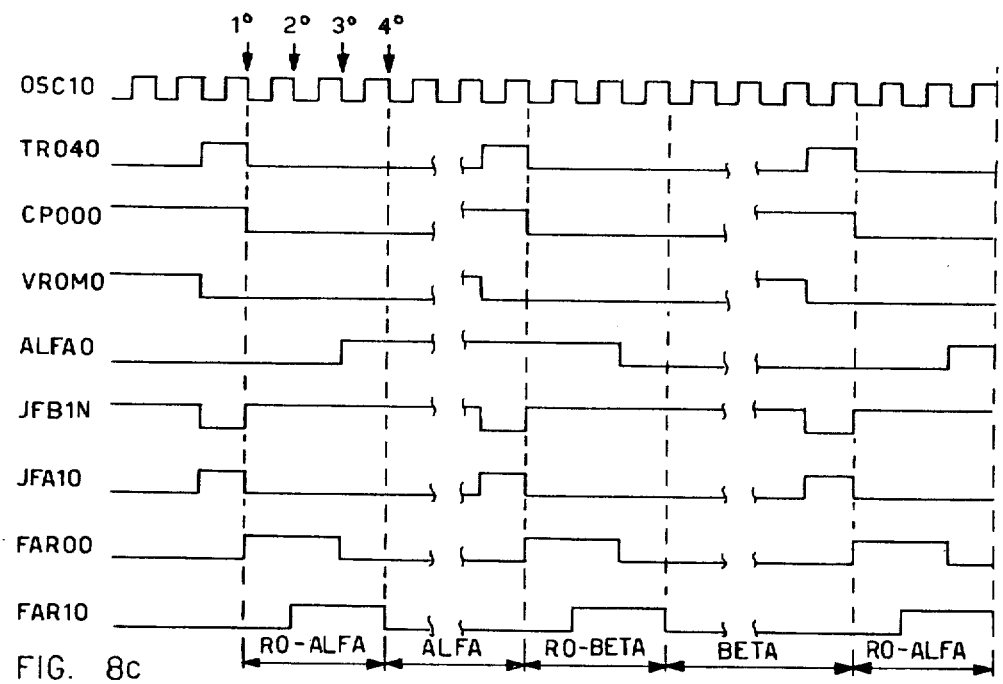
FIG. 8c is a diagram of the signals of the circuit of FIG. 8b.

4. Execution of the microinstructions. FIGS. 8a, 8b, and 8c

All the microinstructions are executed by the nanomachine 4 in two separate phases: Phase ALFA and Phase BETA. Phase ALFA is executed by a nanoinstruction and is preceded by a phase RO-ALFA in which the register RO-24 is loaded with a fixed configuration. Phase BETA is also preceded by a phase RO-BETA in which the register RO-24 is loaded with the code of the microinstruction to be executed coming from the memory 2. In phase RO-ALFA there is loaded into the register RO-24 the fixed address of the NROM-3 at which is recorded the nanoinstruction which implements it and there is selected the level associated with the microprogram being executed. The effect of this nanoinstruction is that of loading into the register BC-22 the address of the microinstruction which will be executed in phase BETA, this address being read by the microprogram addresser associated with the level previously selected.

At the end of phase ALFA, the register RO-24 contains the code of the microinstruction to be executed. In phase RO-BETA, this code is used to address the NROM-3. At the end of phase RO-BETA, the NROM-3 commands the elements of the nanomachine to execute the commands generated by the current BETA instruction. The execution of these commands is timed by the signal VROMO obtained by serializing the bits VRA00-VRA30 and VRB00-VRB30 coming from the VROM-27, as stated hereinbefore with reference to FIGS. 6c and 6d.

At the end of phase BETA, if the bit TR040=1, the nanomachine goes on to execute the phase RO-ALFA relating to the following microinstruction. If, on the other hand, TR040=0, the address of the NROM-3 is incremented by one unit (STCRO=1) and a new phase BETA relating to the same current microinstruction is executed. At the end of this second phase BETA, the bit TR040=1 indicates that the microinstruction is finished, as a result of which the nanomachine goes on to execute phase RO-ALFA of the following microinstruction.

The circuit which carries out this sequence will now be described with reference to FIGS. 8b and 8c. This circuit comprises four flip-flops 90, 91, 92 and 93 of the J-K type and three NAND elements 94, 95 and 96. The NAND element 94 has the signals 1NFAD, TR040, CP000 and VROMN as inputs. The last three signals, if at 1 logic level, indicates (as stated hereinbefore) that the microinstruction if finished, 1NFAO=1 indicates that there is no blocking from the console, that is BT000=0. These conditions, in short, indicate that the nanomachine is passing from phase BETA to the next phase RO-ALFA. In fact, the output JFBIN=0 of the NAND element 94 forces the output R1PAN of the flip-flop 90 to zero in the presence of the trailing edge of OSC10.

The signals R1PAN, JFB1N and RES1N, all at 0 logical level, force the output JFA10 of the NAND element 95 to one. It is to be noted that the signal RES1N is at zero logical level since the signal RESEN=0 (FIG. 5). The signal RESEN=0 is generated by the console on actuation of the general RESET key 10 (FIG. 2) which is connected directly to the direct set input (S) of the flip-flop 50. The signal JFA10-1 forces the output FAR00 of the flip-flop 91 to 1 on arrival of the first trailing edge of OSCBO (FIGS. 8b and 8c). Similarly, FAR00=1 forces the output FAR10 of the flip-flop 92 to one on arrival of the second trailing edge of the following signal OSCBO. At the third trailing edge OSCBO, the condition JFA10=FAR10-1 sends the output FAR00 to zero. During this drop of the signal FAR00, the flip-flop 93 switches its output ALFAN from 1 to 0. It is to be noted that in the reset phase ALFAN is brought to zero directly by the signal RESEN applied to the direct set input of the flip-flop 93, so that the nanomachine 4 is forced to operate in the phase RO-BETA. Finally, at the fourth trailing edge of OSCBO, FAR10=0 is obtained. The time interval between the leading edge of FAR00 and the trailing edge of FAR10, in the presence of ALFAN which changes from 1 to 0, constitutes phase RO-ALFA.

In this phase (see FIG. 5 and Table 1) the configuration 1111, 0000, ME070, LIV is forced into the register RO-24; in fact, the leading edge of FAR10 brings the output RES1N of the flip-flop 50 to 1 and enables the loading of the register RO-24. Therefore, at the instant when FAR10 changes from 0 to 1, the selection signals of RO-24 are ALFAO =0, RES1N=1 and ME150=1 and consequently ALR00=1 and ALR10=1 causes the loading of the register RO-24 with the aforesaid configuration (as shown in the fifth line of Table 1). As has been said, the bits RO080-RO140 (that is the configuration 1111, 0000) are used to address the NROM-3, while the bits RO000-RO030(LIV) are used to select the operative register RA-6, RB-16 used as microprogram addresser. In this way a fixed location of the NROM-3 is addressed in which is stored a word controlling the operation of phase ALFA.

During the following phase ALFA, the signals of CROM, TROM and VROM which are recorded at the address 1111, 0000 address the NROM-3 with the contents of the register RA, RB selected by the bits LIV and increment the same; this will be shown hereinafter when discussing the nanoinstruction ALFA.

It is to be noted that the NAND element 96 synchronizes the asynchronous console blocking BT000=1 with the beginning of the phase RO-ALFA (AL- FAN=1). To this condition there corresponds a new LIV (forced externally), for which reason the nanomachine 4 goes on to execute an alternative microprogram (interrupt mechanism).

The same conditions which act on the NAND element 94, producing JFB1N=0, occur at the end of the nanoinstruction which implements phase ALFA. From this follows the passage to phase RO-BETA, characterized by the same signal levels as in phase RO-ALFA, with the exception of the signal ALFAN. This signal, in fact, is at 0 level on the switching of FAR10 from 0 level to 1 level, whereby there are present the conditions of the last line of Table 1 in the register RO-24.

Consequently, at the outputs RO000-RO140 there will be present the bits ME000-ME140, while RO150=1, that is the 16 bits of the microinstruction addressed in the preceding phase ALFA which are read from the memory. The bits RO080-RO140 are used (as before) to address the NROM-3 at the instant determined by the switching of FAR10 and, from the instant determined by the trailing edge of FAR10, the execution of phase BETA of the microinstruction begins.

It is to be noted that at the end of phase BETA, if the bit TR040=1, the nanomachine goes on to phase RO-ALFA of the following microinstruction, while if TR040=0 a new phase BETA is executed inasmuch as JFB1N does not change (remaining at 1 level), JFA10 remains at 0 level and, consequently, FAR00 and FAR10 which, as has been seen, define phase RO-ALFA, are not generated. Moreover, the persistence of TR040=0 (that is, TR04N=1, see FIG. 6a) causes the output STCRO of the flip-flop 54 to change over. As has been said, this corresponds to incrementing the address of the NROM-3 by one and therefore the new signals present at the CROM and TROM outputs implement the new phase BETA.

Figure 9:
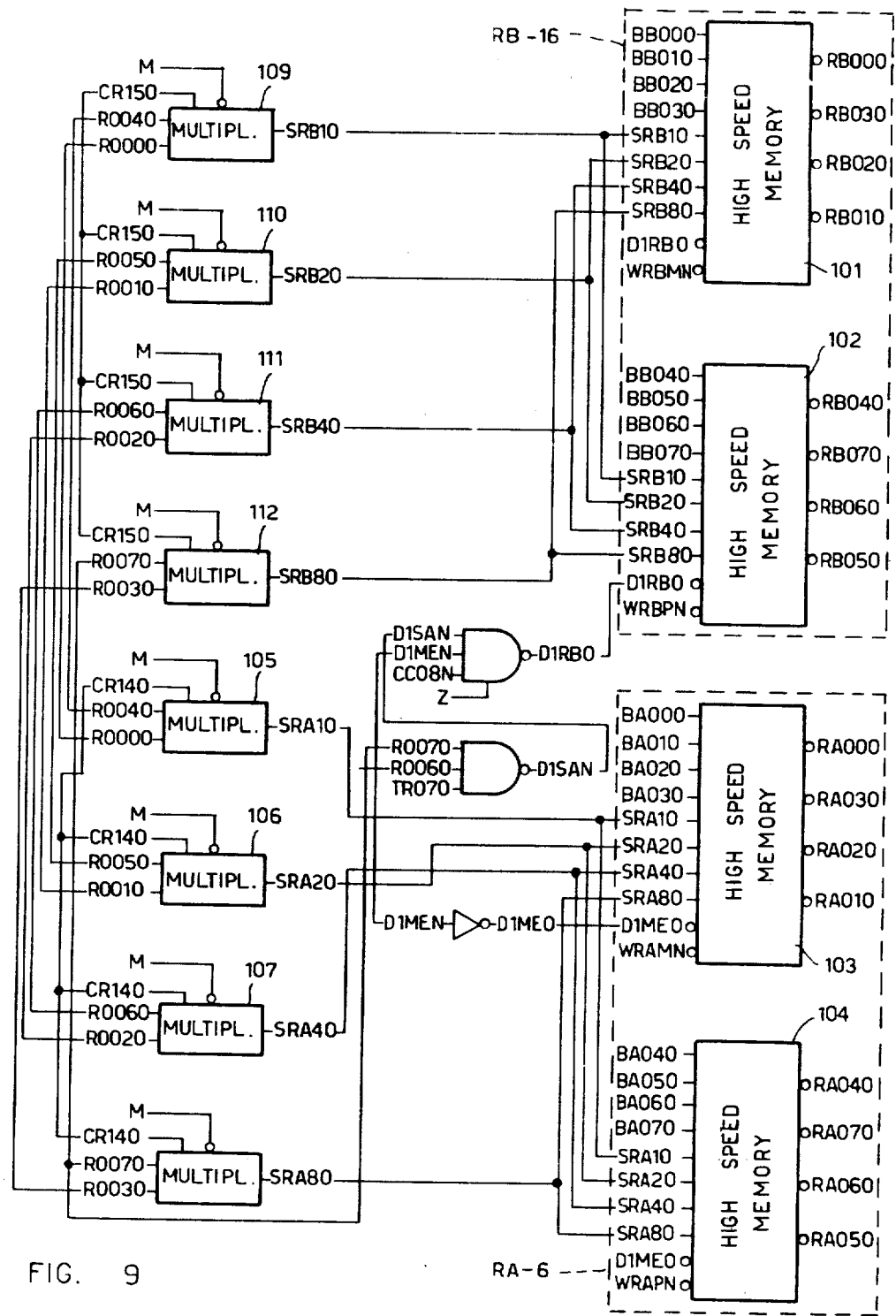
FIG. 9 shows the operative registers RA-6 and RB-16.

5. Operative registers RA-6 and RB-16. FIG. 9, Tables 3, 4, 5a and 5b

The operative registers RA-6 and RB-16 comprise four packages 101-104 of the MOS-LSI type each having a capacity of 16 × 4 bits. The outputs RB000-RB070 of the packages 101 and 102 are the eight bits of the registers RB-16, while the outputs RA000-RA070 of the packages 103 and 104 are the eight bits of the registers RA-6. The inputs of the package 101 and 102 are connected to the outputs BB000-BB030 and BB040-BB070, respectively, of the register BB-19. The inputs of the package 103 and 104 are connected to the outputs BA000-BA030 and BA040-BA070, respectively, of the buffer register BA-9. The addressing of the operative registers takes place by means of the following selection bits: SRB10, SRB20, SRB40 and SRB80 for the registers RB-16, and SRA10, SRA20, SRA40 and SRA80 for the registers RA-6.

The signals SRA10-SRA80 are the outputs of the multiplexers 105-108, respectively, while th signals SRB10-SRB80 are the outputs of the multiplexers 109-112, respectively. The multiplexers 105-112 are of the two-input type and therefore need a single selection signal. The multiplexers 105-108 have the bit CRO140 of the CROM-25 as selection signal, while the multiplexers 109-112 have the bit CR150 as selection signal. If CR140=1, the inputs RO000-RO030 of the multiplexers 105-108 are selected, while if CR140=0 the inputs RO040-RO070 are selected.

Similarly, if CR150=1, the inputs RO000-RO030 of the multiplexers 109-112 are selected, while if CR-150=0 the inputs RO040-RO070 are selected. The selection of the operative registers RA-6 and RB-16 is summarized in Table 3.

TABLE 3

| CR150 | 0 | 0 | 1 | 1 |
| --- | --- | --- | --- | --- |
| CR140 | 0 | 1 | 0 | 1 |
| SRA10 | RO040 | RO000 | RO040 | RO000 |
| SRA20 | RO050 | RO010 | RO050 | RO010 |
| SRA40 | RO060 | RO020 | RO060 | RO020 |
| SRA80 | RO070 | RO030 | RO070 | RO030 |
| SRB10 | RO040 | RO040 | RO000 | RO000 |
| SRB20 | RO050 | RO050 | RO010 | RO010 |
| SRB40 | RO060 | RO060 | RO020 | RO020 |
| SRB80 | RO070 | RO070 | RO030 | RO030 |

TABLE 4

| WRAMN | 1 | | 0 | | 1 | | 0 | |
| --- | --- | --- | --- | --- | --- | --- | --- | --- |
| WRAPN | 1 | | 0 | | 0 | | 1 | |
| DIME0 | 0 | 1 | 0 | 1 | 0 | 1 | 0 | 1 |
| RA000 | RAX | 0 | BAX | | RAX | | BAX | |
| RA010 | RAX | 0 | BAX | NOT | RAX | READ | BAX | WRITE |
| RA020 | RAX | 0 | BAX | WRITE | RAX | | BAX | |
| RA030 | RAX | 0 | BAX | | RAX | | BAX | |
| RA040 | RAX | 0 | BAX | | BAX | | RAX | |
| RA050 | RAX | 0 | BAX | NOT | BAX | WRITE | RAX | READ |
| RA060 | RAX | 0 | BAX | WRITE | BAX | | RAX | |
| RA070 | RAX | 0 | BAX | | BAX | | RAX | |

TABLE 5a

| WRBMN | | 1 | | | | 0 | | 1 | | 0 | |
| --- | --- | --- | --- | --- | --- | --- | --- | --- | --- | --- | --- |
| WRBPN | | 1 | | | | 0 | | 0 | | 1 | |
| DIRBO | 0 | 1 | 1 | 1 | 1 | 1 | 0 | 1 | 0 | 1 | 0 |
| RB000 | RBX | 1 | 0 | 0 | 0 | | BBX | | RBX | | BBX |
| RB010 | RBX | 0 | 1 | 0 | 0 | NOT | BBX | READ | RBX | NOT | BBX |
| RB020 | RBX | 0 | 0 | 0 | 0 | WRITE | BBX | | RBX | WRITE | BBX |
| RB030 | RBX | 0 | 0 | 0 | 0 | | BBX | | RBX | | BBX |
| RB040 | RBX | 0 | 0 | 0 | 0 | | BBX | | BBX | | RBX |
| RB050 | RBX | 0 | 0 | 0 | 0 | NOT | BBX | NOT | BBX | READ | RBX |
| RB060 | RBX | 1 | 1 | 1 | 0 | WRITE | BBX | WRITE | BBX | | RBX |
| RB070 | RBX | 0 | 0 | 0 | 0 | | BBX | | BBX | | RBX |

TABLE 5b

| RO060 . RO070 . TR070 | 0 | X | X | X | 1 |
| --- | --- | --- | --- | --- | --- |
| CC08N | X | X | 0 | X | 1 |
| DIMEN | X | X | X | 0 | 1 |
| DIRBO | 1 | 1 | 1 | 1 | 0 |

The enabling for writing or reading of the registers RB-16 is provided by the signal D1RBO=0 and, therefore, if D1BRO=1, the registers RB-16 are inhibited (Table 5b). Similarly, the enabling of the registers RA-6 is provided by the signal D1MEN=1. The signal D1MEN=0 is generated when there is a console interrupt, so that it becomes necessary to inhibit both the registers RA-6 and the registers RB-16. In fact, if D1MEN=0, D1RBO=1 will be obtained. The signal D1RBO=1, on the other hand, is generated by all the nanoinstructions which do not provide for the use of the registers RB-16.

The enabling of the operative registers RA-6 is given in Table 4, while that of the registers RB-16 is given in Table 5a. It can be observed from these Tables that it is not possible to inhibit the registers RA-6 and simultaneously enable the registers RB-16.

The signals which command writing in the operative registers RA-6 and RB-16 are WRBMN, WRBPN, WRAMN and WRAPN. These signals, as has been said (FIG. 6b), are a combination respectively of the signals TR000-TR030 of the TROM-26 with the timing signal CP010 deriving (FIG. 6d) from the bits of the VROM-27. Consequently, the start of the writing in the registers RA-6 and RB-16 is determined by the leading edge of CP010. These combinations are summarized in Table 4.

From the above it is apparent that the operative registers RA-6 and RB-16 are all selected, whatever the current microinstruction, since the multiplexers 105-112 are always enabled. It follows that the outputs become significant if the enabling signals D1MEO and D1RBO are at zero level; moreover, in the case of writing, the signal WR--N=0 is also required. If the signal WR--N=1, the reading of the register selected is carried out, provided that the enabling signal permits this.

structions. The outputs of the package 114 are the signals UA000-UA030 and the signal UR04N, which is generated only in the case of a carry after the fourth bit. This signal, in fact, forms the input of the carry bit of the package 115. The other eight inputs of the package 115 are constituted by the bits RA040-RA070 and RB040-RB-070. The outputs of the package 115 are the signals UA040-UA070 and the carry signal R1P0N on the eighth bit.

The arithmetic unit UB-17 comprises eight adding circuits 121-128 each having three inputs and three outputs. The adder 121 has as inputs the bits RB000 and K000. The latter is generated by the multiplexer 129 having the bits CR090 and CR100 as control signals and the bit CR130 for enabling. The inputs of this multiplexer are the signals R1P00 and R1P0N and the configurations assumed by the output K0O0 are given in the antepenultimate column of Table 6.

The outputs of the adder 121 are UB000 and UR09N, which is the carry bit of the adder 122. The adder 122 has as inputs the bit RB010, the bit K001N and UR09N. The bit K001N is generated by the NAND element 130 from the signals K001A and CR13N. The signal K001A is generated by the logic network 131 from the signals CR090, CR10N and R1P00. The configurations of the signal K001A are given in the penultimate column of Table 6. The outputs of the adder 122 are the signals UB010 and UR100, which is the carry applied to the adder 123.

The adders 123, 125 and 127 are connected similarly

TABLE 6

| | CR130 | CR120 | CR110 | CR100 | CR090 | UR00N | UA000 + 070 | K0000 | K001A | UB000 + 070 |
|---|---|---|---|---|---|---|---|---|---|---|
| LOGICAL OPERATIONS | 1 | 1 | 1 | 1 | 1 | X | A | 0 | 0 | B |
| | 1 | 1 | 1 | 0 | 0 | X | 0 | | | |
| | 1 | 0 | 1 | 1 | 0 | X | A + B | | | |
| | 1 | 0 | 1 | 0 | 1 | X | B | | | |
| | 1 | 1 | 1 | 0 | 1 | X | A . B | | | |
| | 1 | 0 | 1 | 1 | 1 | X | A + B | | | |
| ARITHMETIC OPERATIONS | 0 | 0 | 0 | 0 | 0 | 1 | A + 1 | R1P00 | 0 | B + R1P00 |
| | 0 | 1 | 0 | 0 | 1 | D100N | A + B + D1000 | | | |
| | 0 | 0 | 1 | 1 | 0 | D100N | A − B − D1000 | | | |
| | 0 | X | X | 1 | 0 | — | — | 1 | 1 | B − 1 |
| | 0 | X | X | 0 | 1 | — | — | 1 | 0 | B + 1 |
| | 0 | 1 | 1 | 1 | 1 | 0 | A − 1 | R1P0N | R1P0N | B − R1P00 |

Figure 10C:
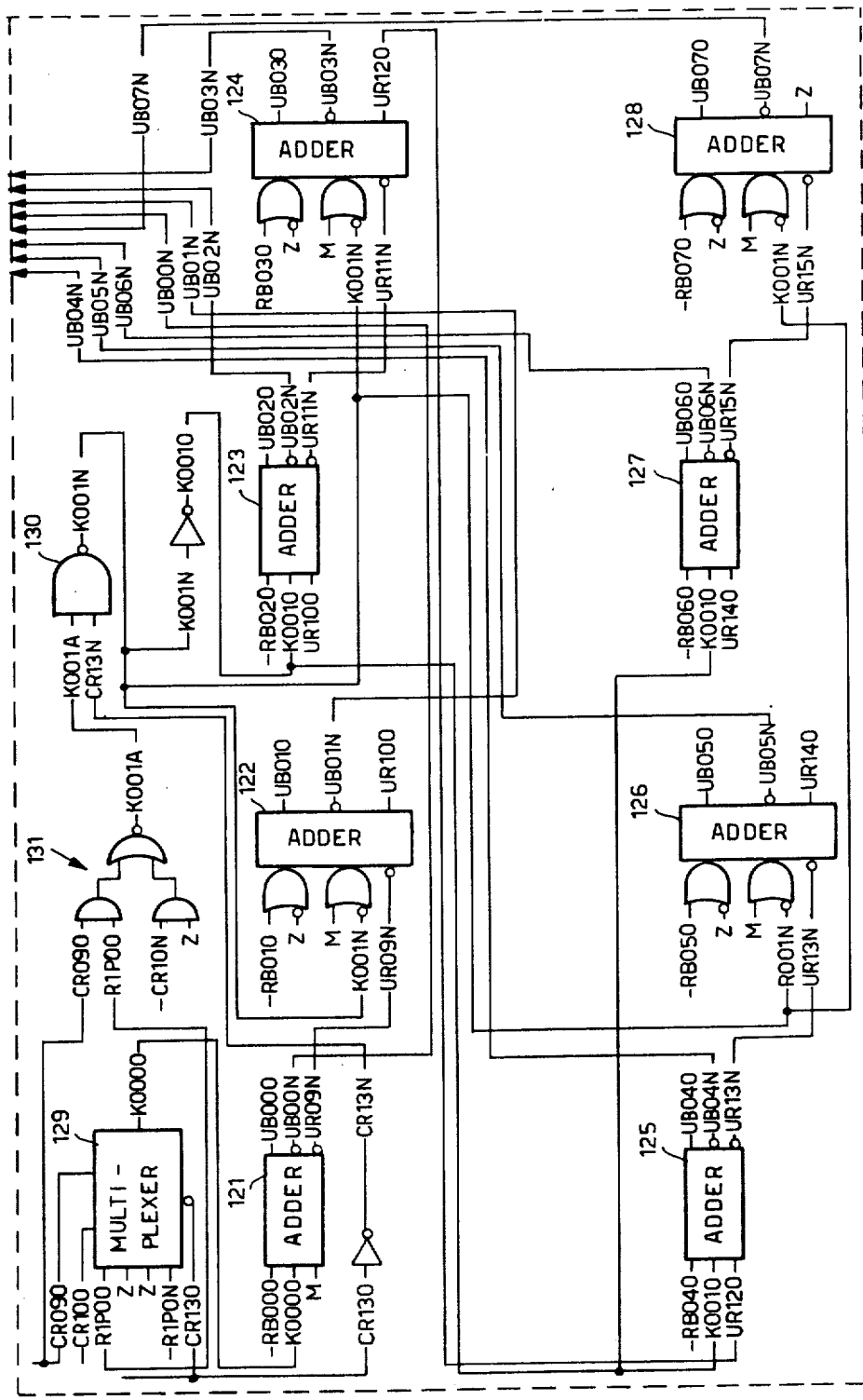

6. Arithmetic units UA-7 and UB-17. FIG. 10, Table 6.

The arithmetic unit UA-7 is formed by two packages 114 and 115 of the MSI type having five output bits. Each package is capable of performing eight logical operations and eight arithmetic operations, of which only six are used for each type, these being given in Table 6. Both the packages are controlled by the bits CR090-CR130. The bit CR130 distinguishes the logical operations (CR130=1) from the arithmetic operations.

The bits CR090-CR120 identify the operation on the operands RA000-RA070 (indicated by A in Table 6) and RB000-RB070 (indicated by B).

Each package is formed by nine inputs and four outputs. The inputs of the package 114 are RA00-0-RA030, RB000-RB030 and the signal UR00N, which is generated by the multiplexer 116.

This multiplexer is enabled only during the arithmetic operations (CR130=0) and can supply as output, according to the bits CR090 and CR100, the signal UR00N=1, UR00N=D100N and UR00N=0, as shown in Table 6. The signal UR00N-D100N is used by package 114 as a signal for a carry coming from arithmetic operations effected by previously executed microinto the adder 121, while the adders 124, 126 and 128 are connected in similar manner to the adder 122. The outputs of the arithmetic unit UB-17 are given in the last column of Table 6. Connected to the arithmetic units UA-7 and UB-17 is the results decoding circuit 36, which supplies as output the signals UZAAO, UZECN and UZLLN. The signal UZAAO is generated by the NOR element 132 when all the outputs UA00-0-UA070 are at 0 level. The signal UZECN=0 is generated by the NAND element 133 when UZAAO=1 and UZECO=1. The signal UZECO is generated by a decoder 134 which is enabled by the signal UZAAO=1 to analyze the bits UB00N-UB07N. If the bits UB00-N-UB03N are all at 1 level, the decoder 134 generates UZECO=1 and therefore UZECN=0 will be obtained. Consequently, UZECN=0 indicates that the twelve bits UA000-UA070 and UB000-UB030 are all at 0 level. If, in addition to this, the bits UB04N-UB07N are also at 0 level, the decoder 134 generates the signal UZLLN=1, which therefore indicates that all the bits output by the arithemetic units UA-7 and UB-17 are zero.

The signals UZAAO, UZECN, UZLLN are sent to the switching elements DI-21 to store the results of the operations effected.

Figure 11B:
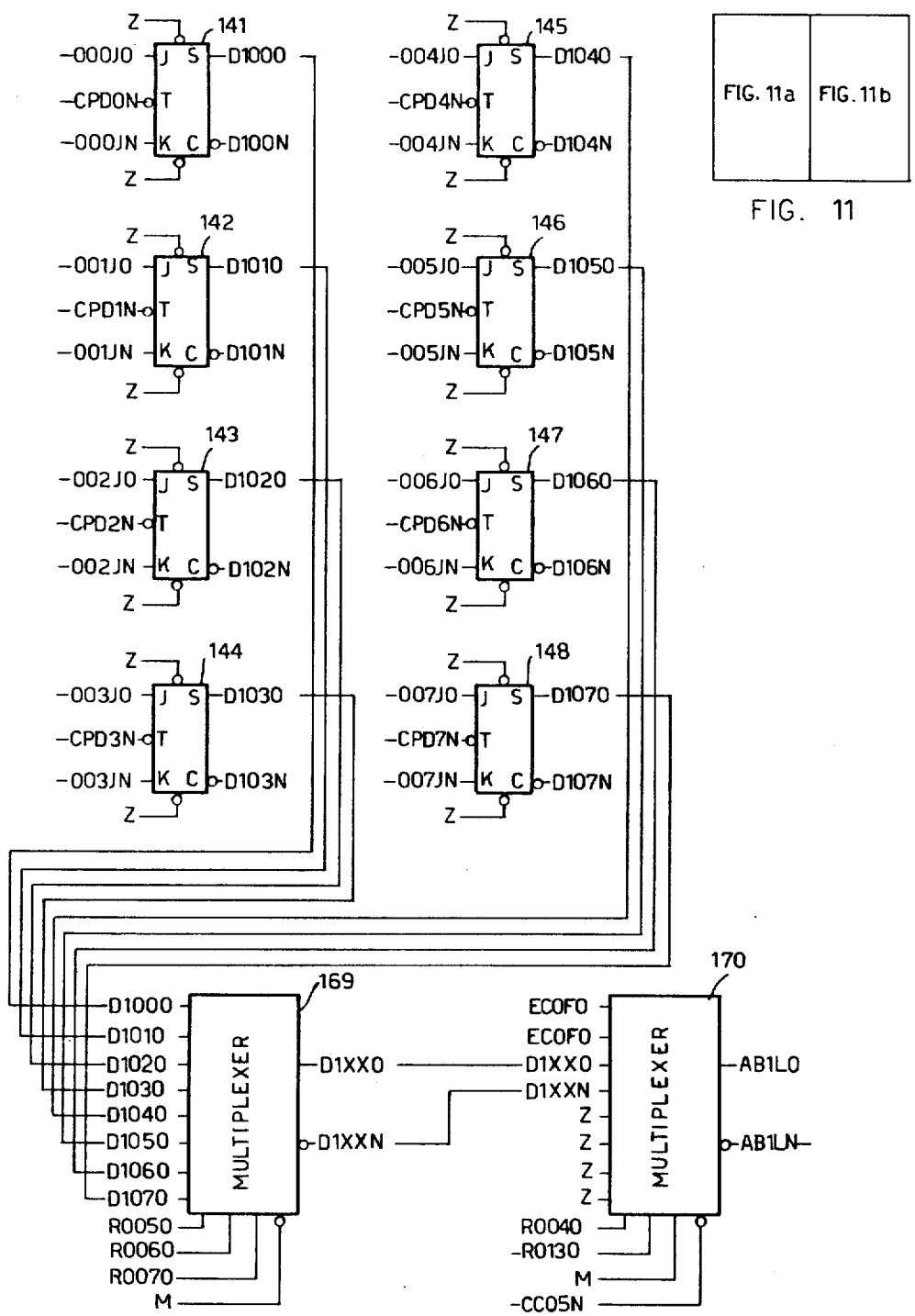
FIGS. 11a and 11b show the switching elements DI:21.
Figure 11A:
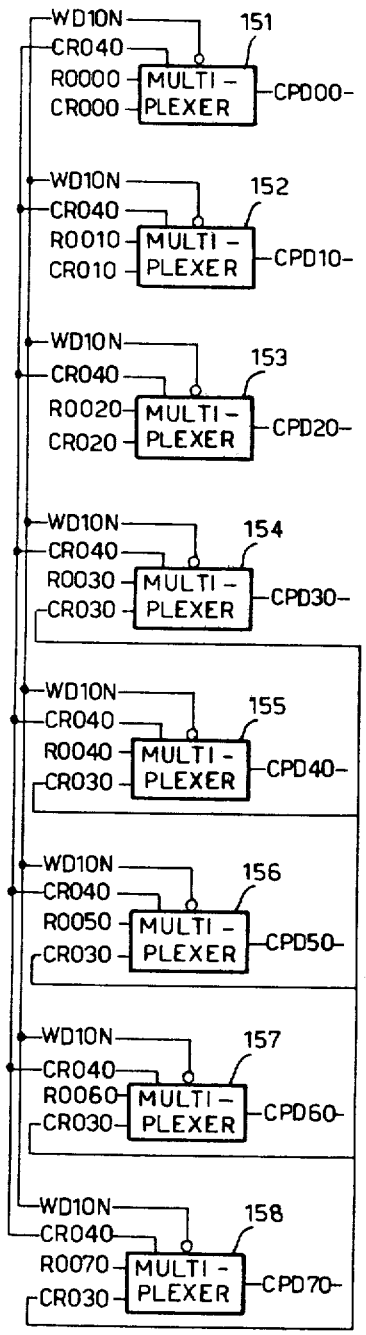
Figure 11A:
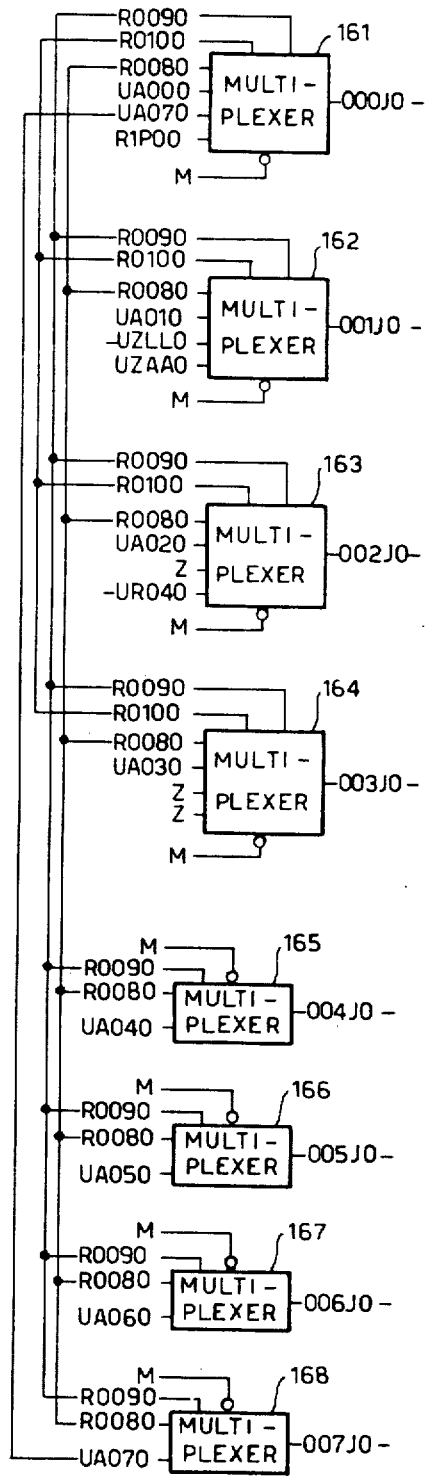
Figure 12A:
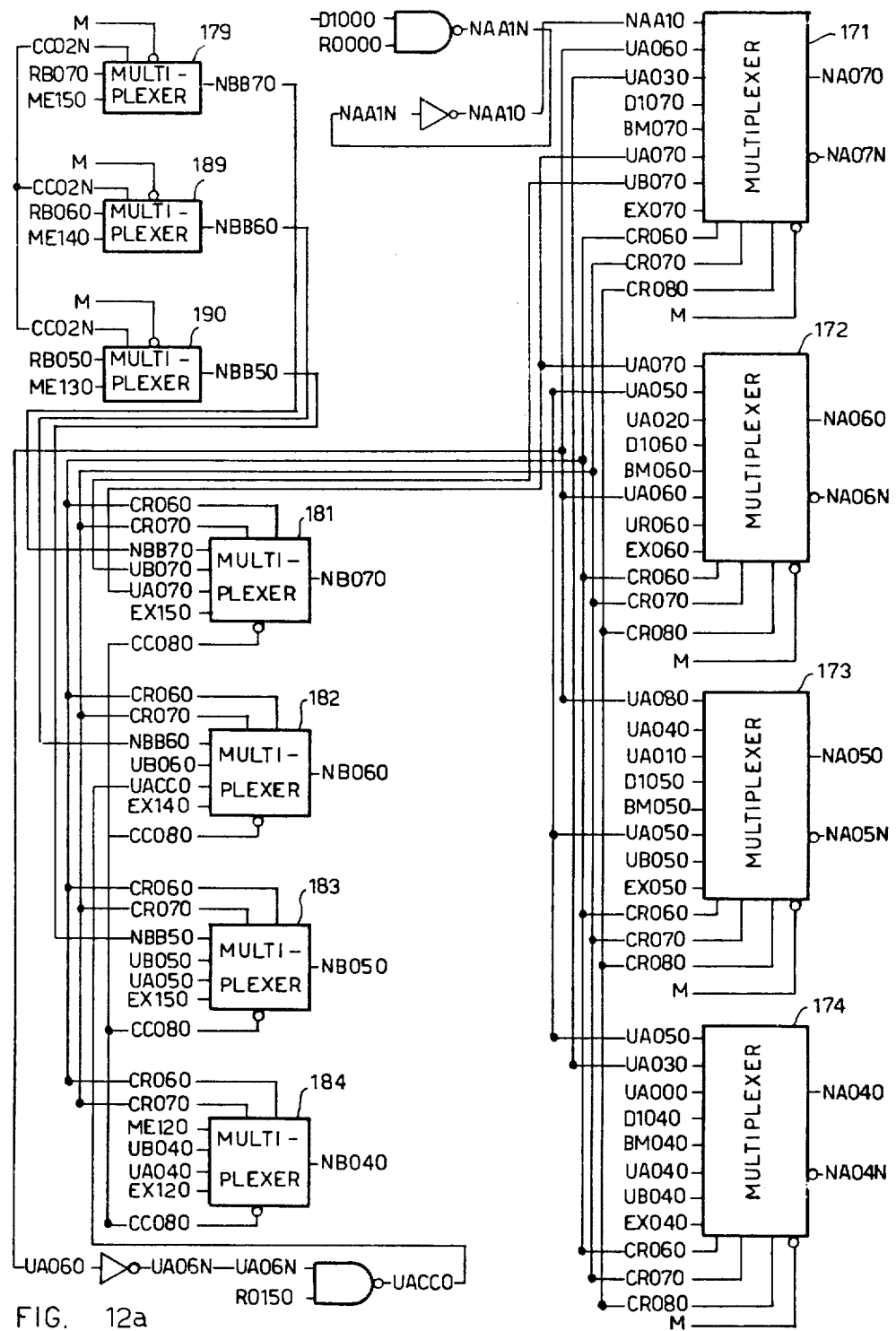

7. Switching elements DI-21. FIG. 11 and Table 7

The switching elements 21 are formed by eight flip-flops 141–148 of the J-K type having their direct set and direct reset inputs always enabled. The outputs of the switching elements DI-21 are the signals D1000–D1070, while the timing inputs T are controlled by the signals CPD0N–CPD7N, respectively. The signals CPD0N–CPD7N, in turn, are generated by the multiplexers 151–158, respectively. These multiplexers are all enabled by the signal WD10N which (FIG. 6b), changes over with the leading edge of the signal CPOOO which is derived from the timing bits VROMO. In this way, the signal WD10N defines the instant of enabling the switching elements 141–148 for writing. The selection input of the multiplexers 151–158 is controlled by the bit CR040 which, if at 0 level, selects the inputs RO000–RO070 and, if at 1 level, selects the inputs CR000, CR010, CR020 for the multiplexers 151–153, respectively, and the input CR030 for the multiplexers 154–158.

Since the signals CPD00–CPD70 are applied to the inputs T of the switching elements 141–148, they enable the changing over the flip-flops only if they are at 1 level.

In this way it is possible to select the flip-flops in which it is desired to record information and, more precisely, if CR040=0, the selection is effected by the bits RO000–RO070, that is it is possible to select any combination of the flip-flops. If, on the other hand, CR040=1, the selection is effected by the bits CR000–CR030, that is it is possible to select any combination of the flip-flops 141–143, while the remaining flip-flops 144–148 may or may not be enabled en bloc by the signal CR030.

The information which it is desired to record in the switching elements 141–148 is supplied to the inputs J by the signals D00J0–D07JO which correspond to the outputs of the multiplexers 161–168, respectively.

The multiplexers 161–168 are always enabled and are divided into two groups: to the first group there belong the multiplexers 161–164 of the type having four inputs, while to the second group there belong the remaining multiplexers, which are of the type having two inputs. The selection inputs of the multiplexers of the first group are the signals RO090 and R0100, which select one of the four possible inputs. The inputs of the multiplexer 161 are in order: RO080, UA000, UA070 and R1P00; for the multiplexer 162 they are: RO080, UA010, UZLL0 and UZAAO; for the multiplexer 163 they are: RO080, UA020, "Z", UR040; for the multiplexer 164 they are: RO080, UA030, Z, Z. The second group of multiplexers 165–168 has a selection input the signal RO090 and as possible inputs the signal RO080 if RO090=0 or the signals UA040–UA070, respectively, if RO090=1.

The possible configurations of the outputs D1000–D1070 of the switching elements 141–148 are given in Table 7, in which it can be seen that only the outputs of the flip-flops whose signals applied to the input T are at 1 level are significant.

The non-significant outputs are indicated by a dash in Table 7. It can be seen from Table 7 how it is possible to load into the eight switching elements a combination of eight bits present in the arithmetic unit UA-7; in fact the bits UA000–UA070 are applied to the inputs of the switching elements. It is moreover possible to store directly the significant conditions of logical or arithmetic operations carried by the signals UZAA0, UZLLN, UR040, which are applied as input to the flip-flops 141, 142 and 143, respectively.

Analysis of the significant conditions recorded in the switching elements DI-21 takes place by means of the multiplexer 169, the selection inputs of which are the bits RO050–RO070, which supply in binary the serial number of the switching element of which it is desired to analyze the contents. The output D1XX0 of the multiplexer 169, that is the signal supplied by the selected switching element, is supplied together with the negated output D1XXN to the third and fourth inputs of another multiplexer 170.

TABLE 7

| | Selection | | | | | | | | | | |
|---|---|---|---|---|---|---|---|---|---|---|---|
| | CR040 = 1 | CR040 = 0 | | | | | | | | | |
| D1000 | CR000  0 / 1 | R0000  0 / 1 | — 0 | — 1 | — UA000 | — UA070 | — UA070 | — R1P00 | | | |
| D1010 | CR010  0 / 1 | R0010  0 / 1 | — 0 | — 1 | — UA010 | — UZLL0 | — UZLL0 | — UZAA0 | | | |
| D1020 | CR020  0 / 1 | R0020  0 / 1 | — 0 | — 1 | — UA020 | — 1 | — 1 | — UR040 | | | |
| D1030 | CR030  0 / 1 | R0030  0 / 1 | — 0 | — 1 | — UA030 | — 1 | — 1 | — UA030 | | | |
| D1040 | CR030  0 / 1 | R0040  0 / 1 | — 0 | — 1 | — UA040 | — 0 | — 1 | — UA040 | | | |
| D1050 | CR030  0 / 1 | R0050  0 / 1 | — 0 | — 1 | — UA050 | — 0 | — 1 | — UA050 | | | |
| D1060 | CR030  0 / 1 | R0060  0 / 1 | — 0 | — 1 | — UA060 | — 0 | — 1 | — UA060 | | | |
| D1070 | CR030  0 / 1 | R0070  0 / 1 | — 0 | — 1 | — UA070 | — 0 | — 1 | — UA070 | | | |
| | | | | 0 | 1 | X | 0 | 1 | X | | R0080 |
| | | | | 0 | 0 | 1 | 0 | 0 | 1 | | R0090 |
| | | | | 0 | 0 | 0 | 1 | 1 | 1 | | R0100 |
| | | | | | | | WRITING | | | | |

These inputs are selected in the presence of RO130=1 by the bit RO040, which selects the input D1XX0 if at 0 level and the input D1XXN if at 1 level.

The output AB1LN of the multiplexer 170 is used, as has been seen hereinbefore (FIG. 6c), to generate the signals WRAMN, WRAPN, WRBMN and WRBPN which enable writing in the registers RA-6 and RB-16. The multiplexers 169 and 170 are used by the conditional jump microinstructions, which have the format F, 0/1 DEV, ADDRESS. If, for example, it is desired to effect a jump to the address E.4 on condition D1050=1, the code of the microinstruction will be. F, 1101, E, 4. The bits RO050=1, RO060=0 and RO070=1 select the input D1050 of the multiplexer 169 and the bit RO040=1 selects the input D1XX0 of the multiplexer 170. Therefore, if D1050=1, we will have AB1LN=1 and therefore WRAMN=WRAPN=0 allows (FIG. 9) the bits RO080-RO150 (that is, the address E, 4) to be written in the microprogram addresser selected by the bits LIV. On the contrary, if D1050=0, the address will not be written because AB1LN will remain at 0 level.

8. Switching networks NA-8 and NB-18, FIG. 12, Tables 8 and 9

The switching network NA-8 is formed by eight multiplexers 171-178 of the MSI type having eight inputs. Selection of the input is effected by the bits CR060-CR080 coming from the CROM-25, while enabling is permanent.

The eight configurations of the signal CR060-CR080 enable the operations summarized in Table 8 to be effected on the specified input data.

Similarly, the network NB-18 is formed by eight multiplexers 181-188 of the MSI type having four inputs the bits VROMO (FIG. 6d) on the rise of the signal CP000.

The inputs are selected by the signal CC07N generated by the decoder 28 (Table 2 and are constituted by the bits CON00-CON70 coming from the console and the bits NA000-NA070 coming from the switching network NA-8.

The register BB-19 is formed by eight two-input multiplexers 201-208 which are also normally enabled. Their output is masked by the signal WBAON=1.

The inputs are selected by the signal CR050. The outputs of the registers BA-9 and BB-19 are summarized in Table 10.

Figure 14:
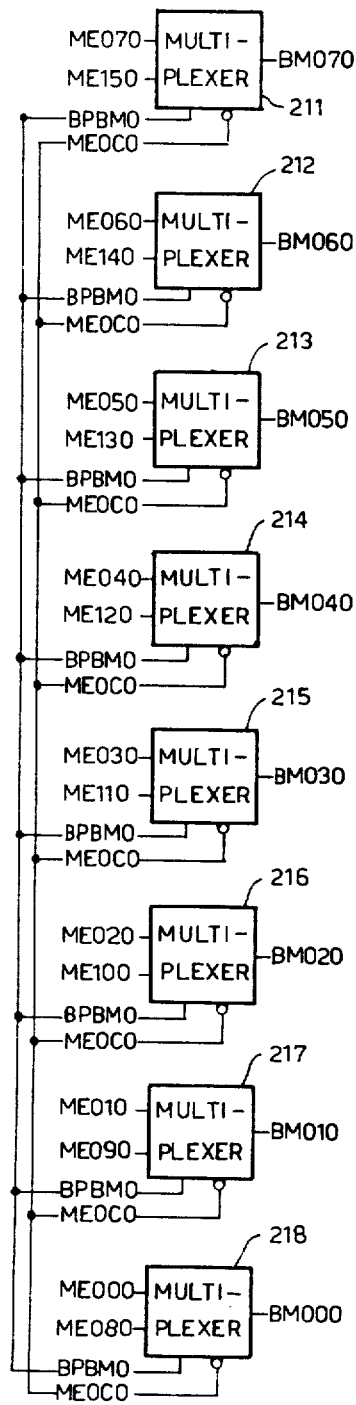
FIG. 14 shows the register BM-20.

10. Output Register BM-20 for data from the memory. FIG. 14

The output register BM-20 is formed by eight two-input multiplexers 221-218 enabled by the drop of the signal MEOCO generated by the memory 2 at the end of the reading cycle.

TABLE 8

| OPERATION EFFECTED | SHIFT TO RIGHT | SHIFT TO LEFT | EX-CHANGE | NA←DI | NA←BM | NA←UA | NA←UB | NA←EX |
|---|---|---|---|---|---|---|---|---|
| CR080 | 0 | 0 | 0 | 0 | 1 | 1 | 1 | 1 |
| CR070 | 0 | 0 | 1 | 1 | 0 | 0 | 1 | 1 |
| CR060 | 0 | 1 | 0 | 1 | 0 | 1 | 0 | 1 |
| NA070 | D1000 . R0000 | UA060 | UA030 | DI070 | BM070 | UA070 | UB070 | EX070 |
| NA060 | UA070 | UA050 | UA020 | DI060 | BM060 | UA060 | UB060 | EX060 |
| NA050 | UA060 | UA040 | UA010 | DI050 | BM050 | UA050 | UB050 | EX050 |
| NA040 | UA050 | UA030 | UA000 | DI040 | BM040 | UA040 | UB040 | EX040 |
| NA030 | UA040 | UA020 | UA070 | DI030 | BM030 | UA030 | UB030 | EX030 |
| NA020 | UA030 | UA010 | UA060 | DI020 | BM020 | UA020 | UB020 | EX020 |
| NA010 | UA020 | UA000 | UA050 | DI010 | BM010 | UA010 | UB010 | EX010 |
| NA000 | UA010 | DI000 . R0000 | UA040 | DI000 | BM000 | UA000 | UB000 | EX000 |

TABLE 9

| OPERATION EFFECTED | NB←(ME080-ME120) | NB←ME+ | NB←UB | NB←UA | NB←EXT+ |
|---|---|---|---|---|---|
| CR02N | 0 | 1 | X | X | X |
| CR070 | 0 | 0 | 0 | 1 | 1 |
| CR060 | 0 | 0 | 1 | 0 | 1 |
| NB070 | RB070 | ME150 | UB070 | UA070 | EX150 |
| NB060 | RB060 | ME140 | UB060 | UA060 . R0150 | EX140 |
| NB050 | RB050 | ME130 | UB050 | VA050 | EX130 |
| NB040 | ME120 | ME120 | UB040 | UA040 | EX120 |
| NB030 | ME110 | ME110 | UB030 | UA030 | EX110 |
| NB020 | ME100 | ME100 | UB020 | UA020 | EX100 |
| NB010 | ME090 | ME090 | UB010 | UA010 | EX090 |
| NB000 | ME080 | ME080 | UB000 | UA000 | EX080 | which are enabled by the signal CC080 generated by the decoder 28 (Table 2). The inputs of the multiplexers 181-188 are selected by the bits CR060 and CR070.

Moreover, the first input of the multiplexers 181-183 is formed by the signals NBB70, NBB60 and NBB50 output by three two-input multiplexers 179, 189 and 190 which have as selection input the signal CC02N generated by the decoder 28 (Table 2). The five configurations used by the signals CR060, CR070 and CC02N permit as many operations on the signals input to the network NB-18, these operations being shown in Table 9.

Figure 13:
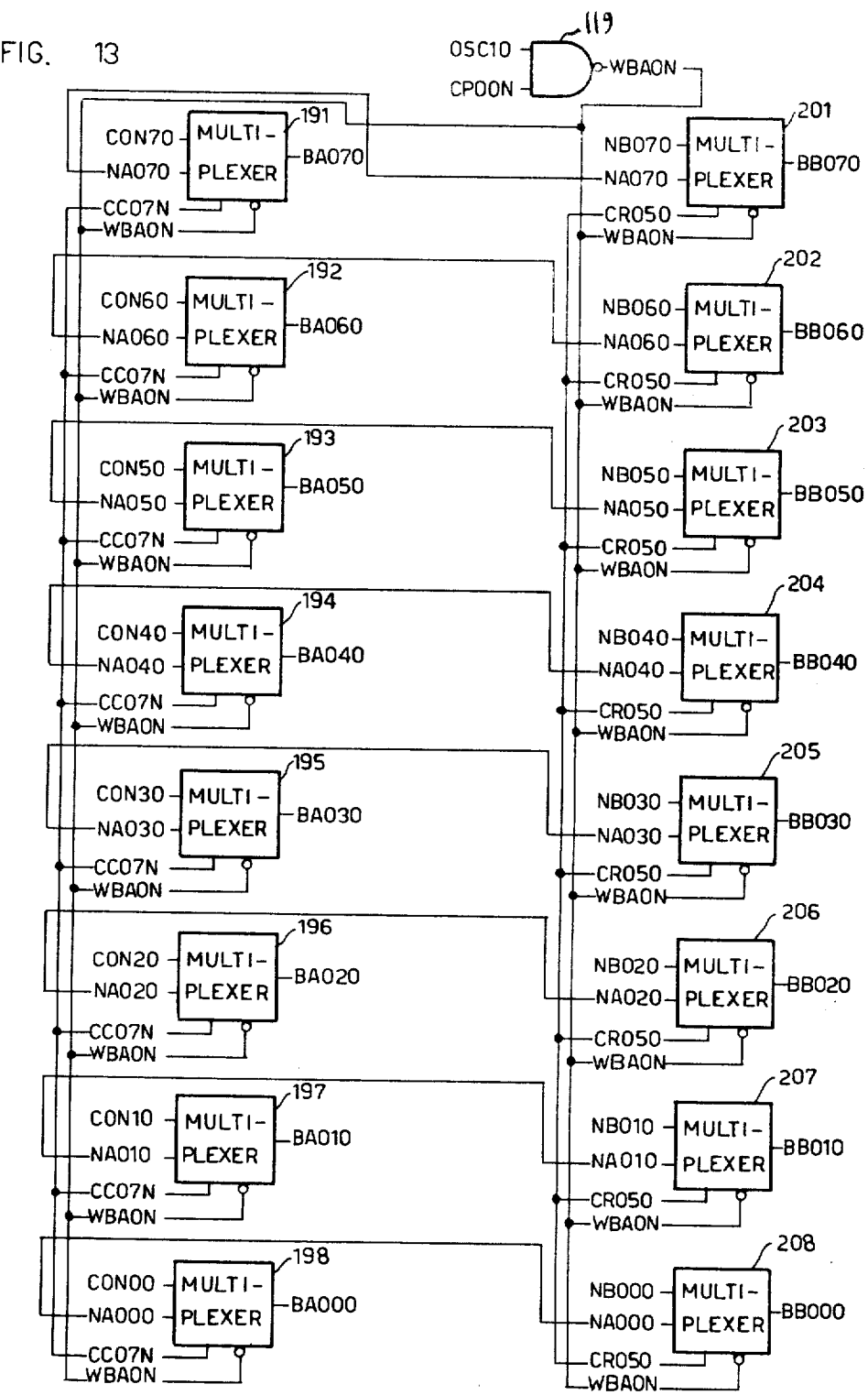
FIG. 13 shows the registers BA-9 and BB-19.

9. Buffer registers BA-9 and BB-19. FIG. 13 and Table 10

The register BA-9 is formed by eight two-input multiplexers 191-198 which are normally enabled. The output is masked by the signal WBAON=1 generated by

TABLE 10

| CC07N | 0 | 1 | CR050 | 0 | 1 |
|---|---|---|---|---|---|
| BA000 | CON00 | NA000 | BB000 | NB000 | NA000 |
| BA010 | CON10 | NA010 | BB010 | NB010 | NA010 |
| BA020 | CON20 | NA020 | BB020 | NB020 | NA020 |
| BA030 | CON30 | NA030 | BB030 | NB030 | NA030 |
| BA040 | CON40 | NA040 | BB040 | NB040 | NA040 |
| BA050 | CON50 | NA050 | BB050 | NB050 | BA050 |
| BA060 | CON60 | NA060 | BB060 | NB060 | NA060 |
| BA070 | CON70 | NA070 | BB070 | NB070 | NA070 |

The inputs are selected by the signal BPBMO, which enables the passage of the least significant bits ME000-ME070 (BPBMO=0) or the most significant bits ME080-ME150 (BPBMO=1) read from the memory 2. The signal BPBMO will be explained hereinafter with reference to FIG. 15.

Figure 15A:
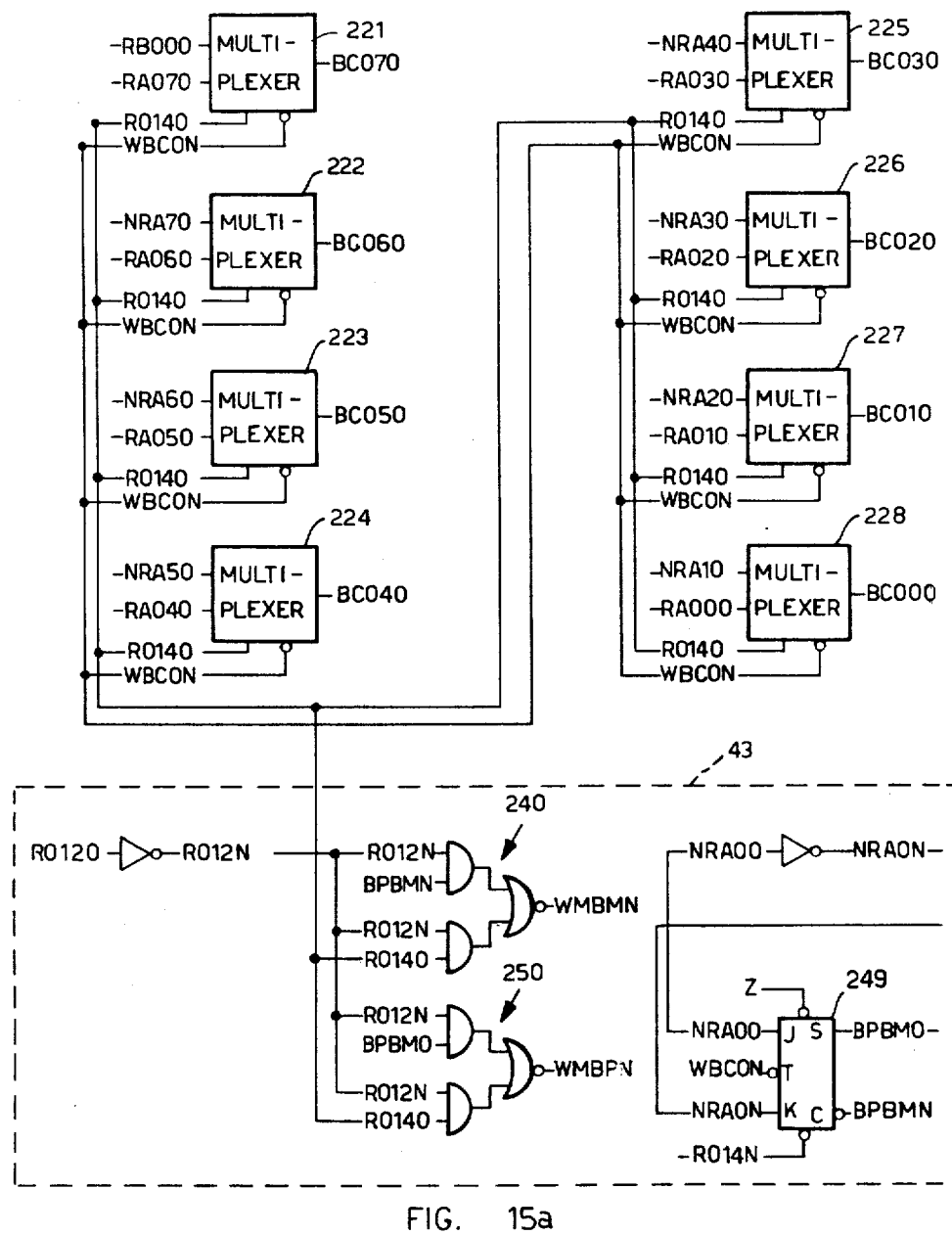
FIGS. 15a and 15b show the addressing register BC-22.
Figure 15:
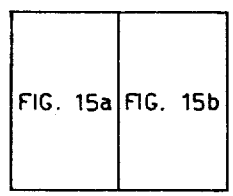
Figure 15B:
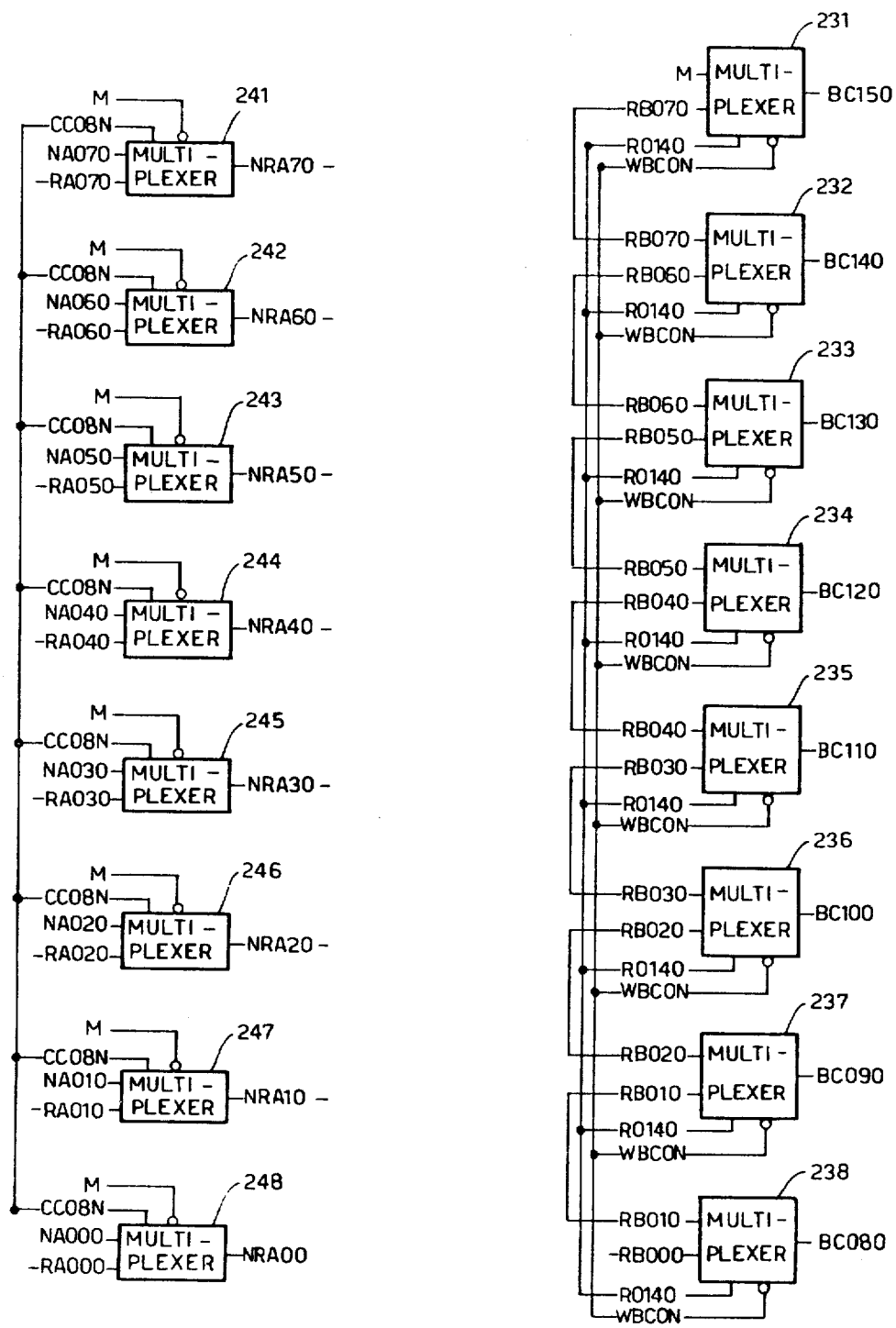

11 Addressing register BC-22 of the memory. FIG. 15, Tables 11, 12 and 18

The memory addressing register BC-22 is formed by sixteen two-input multiplexers 221-228 and 231-238 of the MSI type.

The outputs BC000-BC150 address the memory 2 and are enabled, as has been said, by the signal WBCON= which, as has been seen, is generated with the leading edge of the signal CP000 derived from the bits of the VROM-27.

The selection of the inputs is effected by the bit R0140 which, as hereinbefore mentioned, if it is at 1 level, indicates that operation is being carried out in the ROM and therefore with 16-bit parallelism, while if it is at 0 level, it indicates that operation is being carried out in the RAM and therefore with 8-bit parallelism.

In fact, if R0140=1, there will be present at the outputs BC000-BC150 the bits RA000-RA070 and RB000-RB070 coming from the microprogram addresser associated with the enable level, that is selected from the operative registers by the bits LIV.

On the other hand, in the case of reading from the RAM (R0140=0), there will be present at the outputs BC000-BC070 the bits NRA10-NRA70 and the bit RB000, respectively, and there will be present at the outputs BC080-BC150 the bits RB010-RB060 and the bit 0, respectively. Consequently, into the register BC-22 is forced the address presented at the inputs shifted to the right by one place, that is divided by two.

The least significant bit of the address NRA00 (which is not loaded into the register BC-22) and which indicates whether the address is even (NRA00=0) or odd (NRA00=1) is used by circuit 43 to select the least significant byte (NRA00=0) or the most significant byte (NRA00=1)

TABLE 11

| CC08N | 0 | 1 | X |
|---|---|---|---|
| R0140 | 0 | 0 | 1 |
| BC000 | NA010 | RA010 | RA000 |
| BC010 | NA020 | RA020 | RA010 |
| BC020 | NA030 | RA030 | RA020 |
| BC030 | NA040 | RA040 | RA030 |
| BC040 | NA050 | RA050 | RA040 |
| BC050 | NA060 | RA060 | RA050 |
| BC060 | NA070 | RA070 | RA060 |
| BC070 | RB000 | RB000 | RA070 |
| BC080 | RB010 | RB010 | RB000 |
| BC090 | RB020 | RB020 | RB010 |
| BC100 | RB030 | RB030 | RB020 |
| BC110 | RB040 | RB040 | RB030 |
| BC120 | RB050 | RB050 | RB040 |
| BC130 | RB060 | RB060 | RB050 |
| BC140 | RB070 | RB070 | RB060 |
| BC150 | 0 | 0 | RB070 |
|  | RAM |  | ROM |

TABLE 12

| CC08N | 0 | 0 | 1 | 1 | X |
|---|---|---|---|---|---|
| R0140 | 0 | 0 | 0 | 0 | 1 |
| NA000 | 0 | 1 | X | X | X |
| RA000 | X | X | 0 | 1 | X |
| BPBM0 | 1 | 0 | 1 | 0 | 0 |

TABLE 13

| RO120 | 0 | 0 | 0 | 1 |
|---|---|---|---|---|
| RO140 | 0 | 0 | 1 | X |
| EPBMO | 0 | 1 | X | X |
| WMBMN | 0 | 1 | 0 | 1 |
| WMBPN | 1 | 0 | 0 | 1 |
|  | Writing in RAM with 8-bit parallelism | Reading from RAM | Writing in RAM with 16-bit parallelism | |

TABLE 14

| EMPGO | EPR10 | EPR20 | EPRAO | EPRBO | LV120 | LV140 | MICROINTERRUPT LEVEL | R0030 | R0020 | R0010 | R0000 | ADDRESS RA6 and RB16 |
|---|---|---|---|---|---|---|---|---|---|---|---|---|
| X | 1 | X | X | X | 1 | 1 | 1 | 1 | 1 | 0 | 0 | 12 |
| X | 0 | 1 | X | X | 1 | 0 | 2 | 1 | 1 | 0 | 1 | 13 |
| 1 | 0 | 0 | 1 | X | 0 | 0 | 3 | 0 | 0 | 0 | 1 | 1 |
| 0 | 0 | 0 | 0 | 0 | 0 | 1 | 4 | 0 | 0 | 0 | 0 | 0 |

The bits NRA00-NRA70 are generated by the switching network NRA-42 formed by eight two-input multiplexers 241-248 which are always enabled.

The selection of the inputs NA000-NA070 or RA000-RA070 is effected by the signal CC08N generated by the decoder 28 (FIG. 3c). The outputs BC000-BC150 of the register BC-22 are summarized in Table 11.

The circuit 43 comprises a J-K flip-flop 249 which is enabled by the signal RO140=0 (operation on the RAM). The inputs J and K of this flip-flop are controlled by the signals NRA00 and NRA0N, respectively, which correspond to the least significant bit selected by the signal CC08N. Table 12 gives the truth table of the flip-flop 249. In this table there appear the inputs NA000 and RA000 of the multiplexer 248. In the case of RO140=1 (that is, reading from the ROM), the flip-flop 249 is reset in direct manner.

The timing input of the flip-flop 249 is controlled by the trailing edge of the signal WBCON. As has been seen (FIG. 14), the output BPBMO of the flip-flop 249 serves to select the most significant byte (BPBMO=1) or the least significant byte (BPBMO=0).

The circuit 43 moreover comprises two networks 240 and 250 which generate the signals WMBMN and WMBPN, respectively. The signal WMBMN enables the writing in the RAM-2 of the least significant byte carried by the input channel 39 (FIG. 3b) of the memory, that is the bits ECD00-ECD07. Similarly, the signal WMBPN enables the writing of the bits ECD08=ECD15. Selection between the writing and reading operations and, in the case of writing, selection of the most significant or least significant byte, is effected by the bits RO120 and RO140 as shown in Table 13.

12. Channel Logic, EXT-23.

As has been stated hereinbefore, the channel logic comprises substantially six circuit networks, namely:
Decoding network for the priority level of the microinterrupts,
Network generating consents to the interrupting channel,
Network generating the strobe signals of the microinterrupt requests, Network generating timing signals for transfers of characters and commands,
Network for output of data from the nanomachine,
Network for input of data into the nanomachine.

Figure 16:
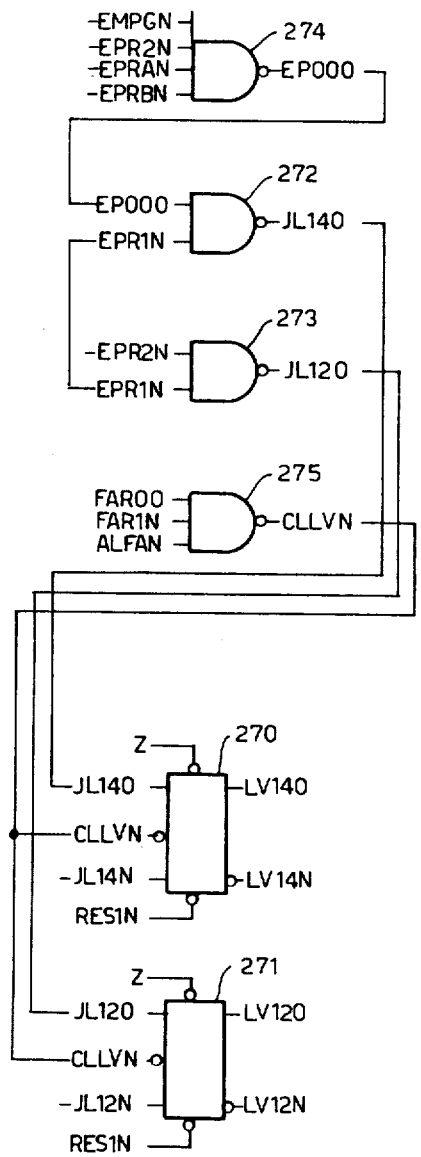
FIG. 16 shows the decoding network for the priority levels of the microinterrupts.

12.1 Decoding Network for the Priorities Associated with the Microinterrupts,

FIG. 16 and TABLE 14

The decoding network for the priority level of the microinterrupts is formed by two flip-flops 270 and 271 the outputs of which are the signals LV140 and LV120.

The direct set inputs S are always enabled, while the direct reset inputs C are enabled by the signal RES1N=1, that is in the absence or reset. On the other hand, if RES1N=0, then LV120=LV140=0, that is level three is forced, to which level there corresponds the interpreter microprogram which has the function of initializing the nanomachine 4.

The inputs J and K of the flip-flop 270 are the signals JL140 and JL14N, respectively, while those of the flip-flop 271 are the signals JL120 and JL12N, respectively.

The signals JL140 and JL120 are generated by the NAND elements 272 and 273, respectively. The NAND element 273 has as inputs the signals EPR2N and EPR1N associated with the microinterrupts of levels two and one, respectively. The NAND element 272 has as inputs the signals EPR1N and EP000, which latter is generated by the NAND element 274. The inputs of the NAND element 274 are the signals EPR2N, EPRAN, EPRBN and EMPGN, of which signals EPRAN and EPRBN are associated with external microinterrupts of level three, while EMPGN is associated with synchronous internal microinterrupts of level three. The input T of the flip-flops 270 and 271 is controlled by the signal CLLVN, which is generated by the NAND element 275, this having as inputs the signals FAR00, FAR1N and ALFA0. The signal CLLVN is normally at 1 and changes over with the inputs all at 1; this condition is obtained only in phase RO-ALFA (FIG. 8c).

Consequently, the microinterrupts are synchronized with phase RO-ALFA of the microinstruction to be executed.

Figure 17:
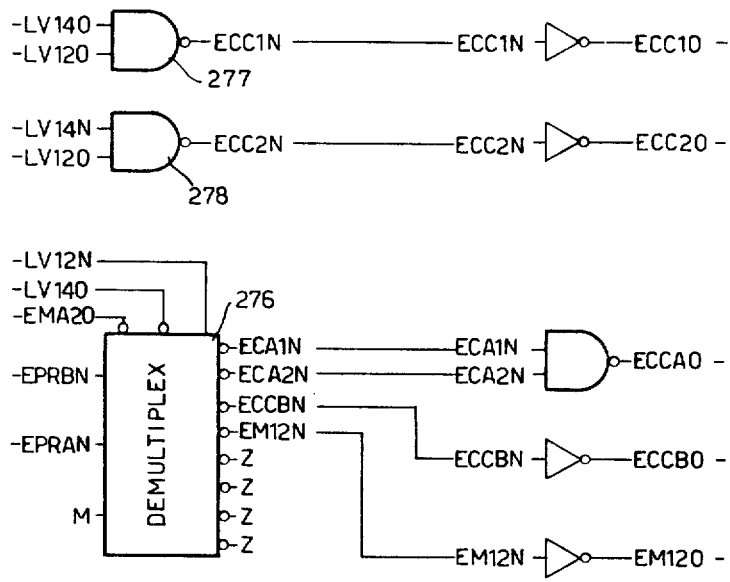
FIG. 17 shows the microinterrupt consent generating network.

12.2 Network generating consents to the interrupting channel, FIG. 17,

Table 15

The consent generating network is formed by a demultiplexer 276 and two NAND elements 277 and 278. The latter generate the two signals ECC1N and ECC2N at 0 level when level one or level two, respectively, is enabled.

These signals are sent selectively to the peripheral to inform it that the respective microinterrupt has been accepted. In fact, these signals are generated during phase RO-ALFA, simultaneously with the change of level. The demultiplexer 276 is enabled only if a microinterrupt of level three is present (LV120=LV140=0), whether the microinterrupt is internal (EMA20=0) or external (EPRAN or EPRBN=0). Consents to level three will be considered with reference to Table 15. The consent ECCAO=1 is given if an external microinterrupt EPRAN=0 is present. ECCBO=1 is obtained if the external microinterrupt EPRBN=0 is present, but EPRAN is not present. If, on the other hand, EPRAN=EPRBN=1 (that is, there are no external microinterrupts of level three), then EM120=1 is given to indicate that an internal microinterrupt is present (whether this is synchronous and/or asynchronous).

Figure 18:
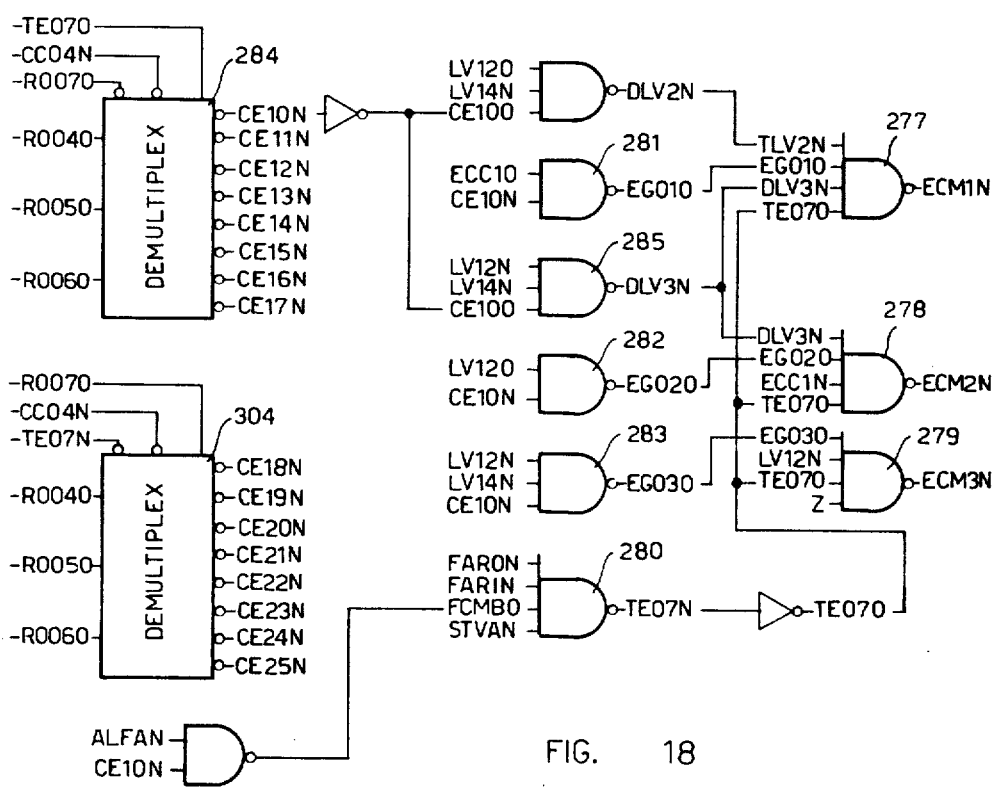
FIG. 18 shows the network generating the strobe signals for the microinterrupts.

12.3 Strobe signal generating network (FIG. 18, Table 16)

In order to synchronize microinterrupt requests with the operation of the nanomachine 4, the channel logic EXT-23 generates the signals ECM1N=0, ECM2N-0 and ECM3N=0, respectively, for levels one, two and three. The circuit which generates these signals comprises three NAND elements 277, 278 and 279 having the signal TE070 as timing input. This signal is generated by a NAND element 280 during phase ALFA of each microinstruction characterized by FARON=λ FAR1N=1 and ALBAN=0 (FIG. 8c). The NAND elements 277, 278 and 279 moreover have as inputs the signals EG010, EG020 and EG030, respectively, which are generated by the NAND elements 281, 282, 283. The NAND element 281 has as inputs the signals ECC10 and CE10N, the NAND element 282 the signals LV120 and CE10N and the NAND element 283 the signals LV12N, LV14N and CE10N. Finally, the NAND elements 278 and 279 have as third input the signals ECC1N and LV12N, respectively. The signal CE10N is generated by the demultiplexer 284, which is timed by the signal TE070 and is enabled by the signals CC04N and RO070.

The inputs of the demultiplexer 284 are the signals RO040-RO060 and, together with the enabling signal RO070, if they are all at 0 level, constitute the four bits characteristic of a particular microinstruction used to signal the end of the microprogram associated with one of the three instruction levels. The presence of this microinstruction sends the output CEC0N of the demultiplexer 284 to 0.

Moreover, the signal DLV3N is input to the NAND elements 277 and 278, this signal in turn being generated by the NAND element 285 having the signals LV12N, LV14N and CE100 as inputs.

The operation of the circuit is shown in Table 16.

Let us assume that the nanomachine is executing a microprogram of level 4. During phase ALFA of each microinstruction there are generated for a duration of 200 nsec the three microinterrupt request strobe signals (ECM1N=ECM2N=ECM3N=0) associated with all three levels, since level four is of the lowest priority. The duration or 200 nsec of the said strobe signals is defined by the signal TE07N=0, which switches to zero on the dropping of the signal FAR10 (see FIG. 8c)which indicates the beginning of phase ALFA. TE07N returns to one when STUAN changes over to zero, that is after 200 nsec (See FIGS. 6c and 6e).

If a microinterrupt request of level three arrives during these 200 nsec, then ECM3N=1 and ECM1N=ECM2N=0, that is the strobe signal of microinstrrupt requests of level three is masked, since this level is current.

If, on the other hand, there is a microinterrupt of level two, the strobe signals ECM2N–ECM3N=1 are masked, since level three is of lower priority. Similarly, if there is a microinterrupt of level one, all the levels are masked. This mechanism enables requests for microinterrupts belonging to levels of lower priority then the current one to be masked.

The end of the processing operations in progress on a level is defined, as has been said, by a particular microinstruction which is characterized by the bits R0040–R0070=0. This microinstruction generates the signal CE10N=0 which restores the conditions of the signals ECM1N, ECM2N and ECM3N corresponding to the level of highest priority among those of the microinterrupts activated. If, for example, the end of the processing operations associated with level one has been reached and microinterrupts of levels two and three are present, then the nanomachine goes on to level two, that is only the strobe signal ECM1N is enabled; if, on the other hand, a microinterrupt of level three is present, the strobe signals ECM2N and ECM3N are enabled.

TABLE 15

| EPRAN | EPRBN | OUTPUT OF DEM.276 | CONSENTS |
|-------|-------|-------------------|----------|
| 0 | 0 | ECA1N | ECCAO |
| 0 | 1 | ECA2N | |
| 1 | 0 | ECCBN | ECCBO |
| 1 | 1 | EM12N | EM120. |

TABLE 16

| LEVEL | ECM1N | ECM2N | ECM3N |
|-------|-------|-------|-------|
| 4 | 0 | 0 | 0 |
| 3 | 0 | 0 | 1 |
| End (CE10N = 1) | 0 | 0 | 0 |
| 2 | 0 | 1 | 1 |
| End (CE10N = 1) | 0 | 0 | 1 |
| 1 | 1 | 1 | 1 |
| End (CE10N = 1) | 0 | 1 | 1 |

Figure 19:
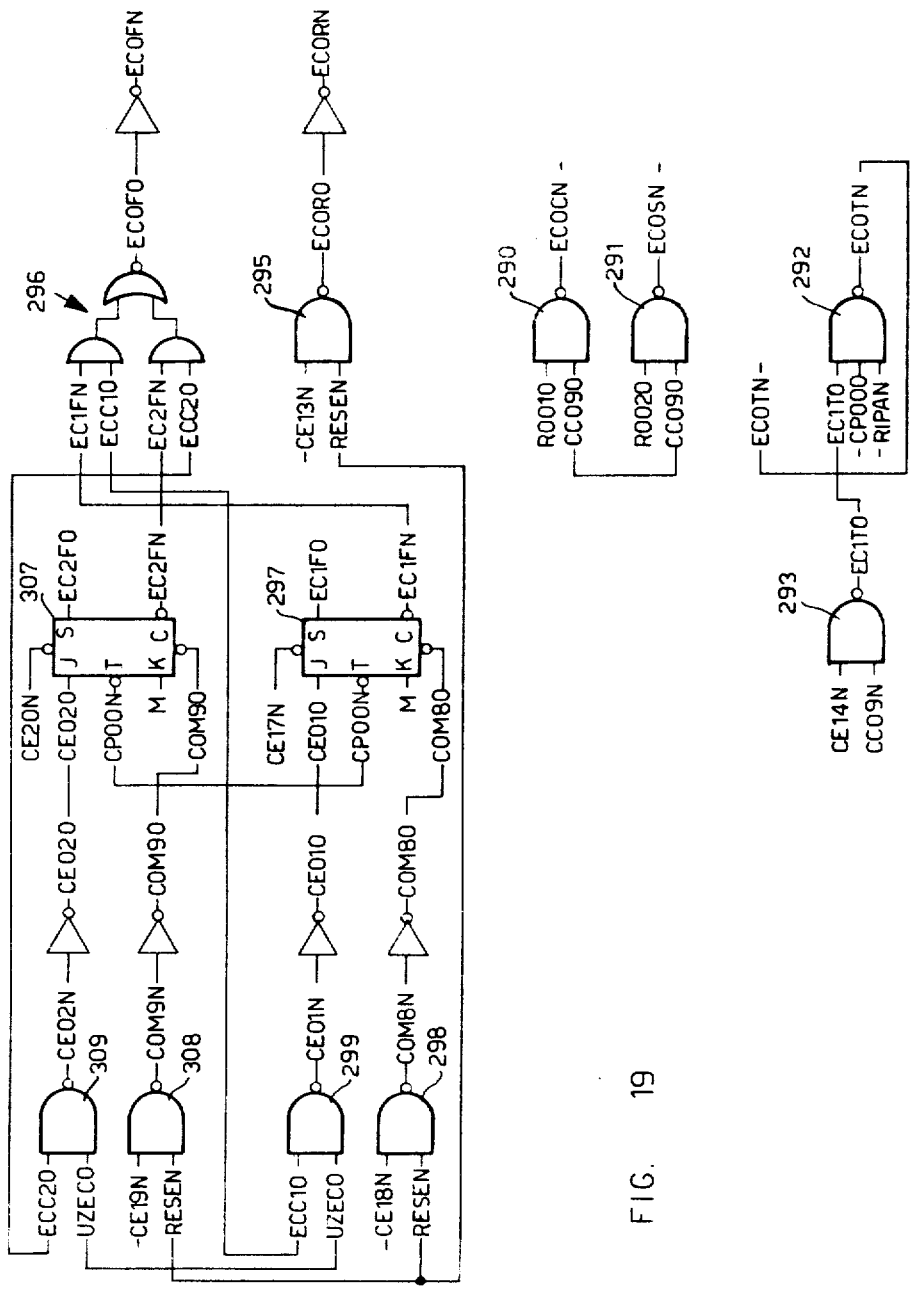
FIG. 19 shows timing signals for I/O operations.

12.4 Network generating timing signals. FIG. 19

The signal EC0CN=0 indicates that the byte sent to the peripheral is a command. It is generated by the NAND element 290 in the presence of the signals R0010 and CC090 which is included in the microinstruction transmitting the command to the peripheral.

Similarly, the signal EC0SN=0 indicates that the byte sent to the nanomachine 4 is to be used to select one of the peripheral units of the machine. This signal is generated the NAND element 291 in the presence of the signals R0020 and CC090 characteristic of the peripheral selection microinstruction.

The signal EC0TN=0 is a signal with a duration of 200 nsec which defines the duration of validity of the data sent by the central unit to the peripheral and present on the data channel, ECD00–ECD15. This signal is generated by the NAND element 292 having as input the signals EC1T0 and CP000 and RIPAN. The signal EC1T0 is generated by the NAND element 293 having as inputs the signals CE14N and CC09N derived directly from the data timing microinstruction. The duration of the signal EC0TN is derived from the signal CP000 the duration of which, as has been seen, is programmable by recording bits at 1 level in the VROM-27.

The signal RIPAN, as has been said, switches to 0 level 50 nsec before the signal CP000; in this way, the duration of the signal EC0TN is equal to the duration of CP000 less 50 nsec. The reason for this lies in the fact that it is desired to allot a validity interval to the data present in the registers BA-9 and BB-19 with a duration less than the time for which the data is present in the registers.

In this way there is ensured a margin of 75 nsec. during which the data, while still being in the registers BA-9 and BB-19, is no longer considered valid by the data channel.

The signal EXORN=0 is a reset signal of the peripherals which is generated by the NAND element 295 in correspondence with the actuation of the general RESET key (RESEN=0), or in correspondence with the execution of a RESET microinstruction characterized by the signal CE13N=0.

The signal EC0FN=0 indicates the end of the exchange between the central unit and peripheral. This signal is sent to all the peripherals, but has significance only for the peripheral which is activated when it arrives.

The signal EX0FN is generated by an AND-OR network 296 which is activated only if levels one and two are activated (ECC10 =1 or ECC10=1, respectively). If exchange is activated on level 1 (ECC10=1), the signal EC1FN=1 sends EC0FN to zero, while the signal EC2FN has no effect inasmuch as ECC20=0. The signal EC1FN is generated by the flip-flop 297 which has the signal CE17N as direct set input and the signal COM80 as direct reset input. The signal COM80 is generated by the NAND element 298 having the signals CE18N and RESEN as inputs.

The signals CE17N and CE18N are derived from two microinstructions which command activation and deactivation, respectively, of the level one data channel. In fact, if CE17N=0, then EC1FN=0, that is EC0FN=0 (level one channel activated). If, on the other hand, CE18N=0, then COM80=0, that is EC1FN=1 and, consequently, EC0FN=1 (level one channel deactivated).

The signal EC0FN is forced to zero by the signal RESEN=0 (general reset from console) which through the NAND element 298 forces COM80 to zero. Moreover, the signal EC0FN is forced to zero by the signal CE010=1, which sends the output EC1FN of the flip-flop 297 to zero. The signal CE010=1 is generated by the NAND element 299 if operation is at level one (ECC10=1) and if the signal UZECO=1 is present, which, as has been seen from FIG. 10, indicates that the first twelve bits of the arithmetic unit are all equal to zero. This signal is used, for example, to indicate the end of the transfer of a field of memory to a peripheral unit, the length of which (number of characters) has been written in a long operative register. On transfer of each character, the register is decremented by one unit, until the first twelve bits are at zero level (generation of UZECO=1).

Similarly, the transfer of data at level two is commanded by the signal EC2FN=0, which is generated by the flip-flop 307 and the NAND elements 308 and 309, which correspond to the flip-flop 297 and the NAND elements 298 and 299, respectively, corresponding to level one. It is observed only that the signals CE10N and COM90 are derived from the corresponding set and reset microinstructions of level two.

Finally, it is pointed out that all the signals CEXXN of FIG. 19 are generated by the demultiplexers 284 and 304 of FIG. 18.

12.5 Data output network

The data output network is formed by sixteen inverters ECD0N–ECD7N and ECD8N–ECDFN (not shown) connected to the outputs BA000–BA070 of the registers BA-9 and to the outputs BB000–BB070 of the registers BB-19, respectively. This network is represented as a whole by the channel 39 of FIG. 3.

Figure 20:
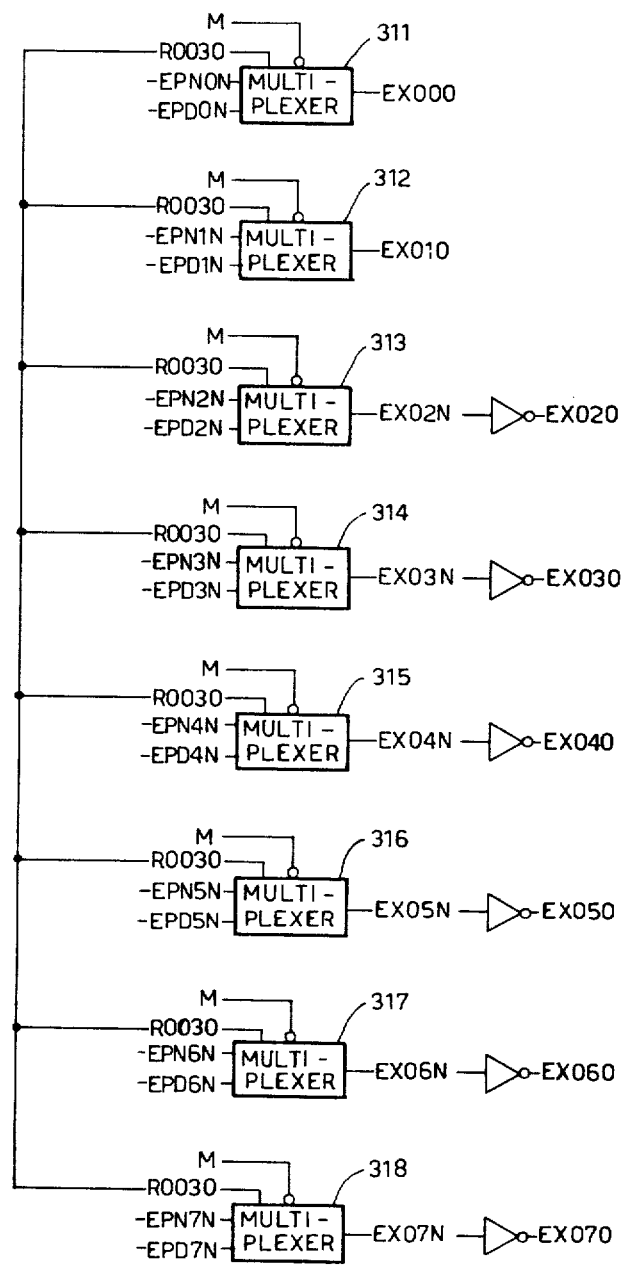
FIG. 20 shows the data input network.

12.6 Data input network, FIG. 20

The network for the input of data to the nonomachine is constituted by eight inverters EX080-EX150 indicated by the symbol EXT+ in FIG. 3, which are connected directly to the channel indicating the type of peripheral indicated by EPT in FIG. 3.

The network also comprises eight two-input multiplexers 311-318 the output signals of which are the bits EX000-EX070. The selection input is constituted by the bit RO030 derived directly from the code of the microinstruction. The inputs to the multiplexers 311-318 are the signals EPNON-EPN7N if RO030=0, which indicate that the character which is input is the name of a peripheral. If, on the other hand, RO030=1, the selected signals are EPDON-EPD7N, which indicate that the character which is input is a datum.

13. Set of microinstructions

It is now desired to show clearly that the hardware of the nanomachine 4 is not tied to a particular set of microinstructions. In fact, in general the commands which act on the elements of the nanomachine 4 (which have already been described hereinbefore) come from the NROM-3. Therefore, by changing the contents of the NROM-3, it is possible to obtain different combinations of the command signals and therefore implement different microinstructions. The restraints imposed by this hardware on the set of microinstructions are:

length of the microinstruction equal to sixteen bits; this restraint or tie is imposed by the parallelism of the ROM.

the function code of the microinstruction is constituted by the eight most significant bits; in fact, these bits are loaded into the locations RO080-RO150 which are used for addressing the NROM-3. It is pointed out, however, that in the embodiment which has just been described the fifteenth bit of the microinstruction is not used to address the NROM-3 inasmuch as this is formed by 128 locations addressable by the microinstruction. What has been stated is valid only in general, inasmuch as the microinstructions which use the switching elements DI-21 and the memory 2 are ties respectively by the bits RO090, RO100 and the bits RO120 and RO140. Consequently, from this there derives a third restraint or tie for the set of microinstructions, that is that of retaining for these bits the significance which they have for the elements which use them directly. This tie, however, is only apparent, inasmuch as it is given expression by suitably allotting the addresses of the NROM-3 corresponding to the tied microinstructions.

A number of examples of execution of particular microinstructions will now be given for the purpose of showing clearly the operation of the nanomachine 4.

C. EXAMPLES

Figure 21:
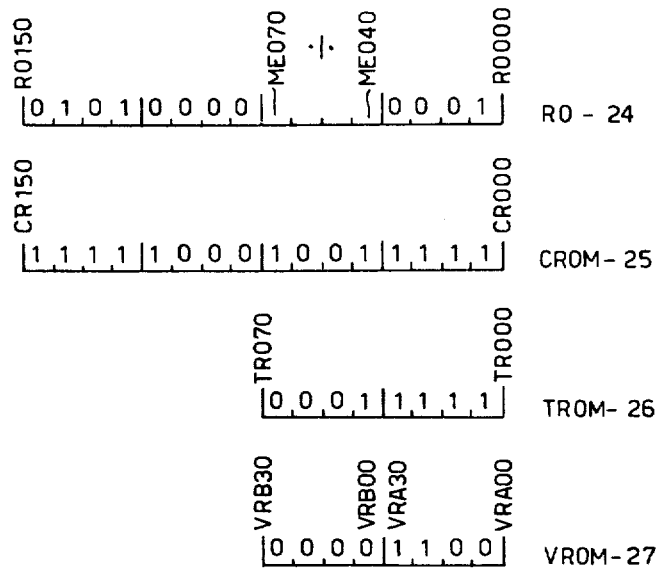
FIG. 21 shows the RESET microinstruction and the timing thereof.
Figure 21:
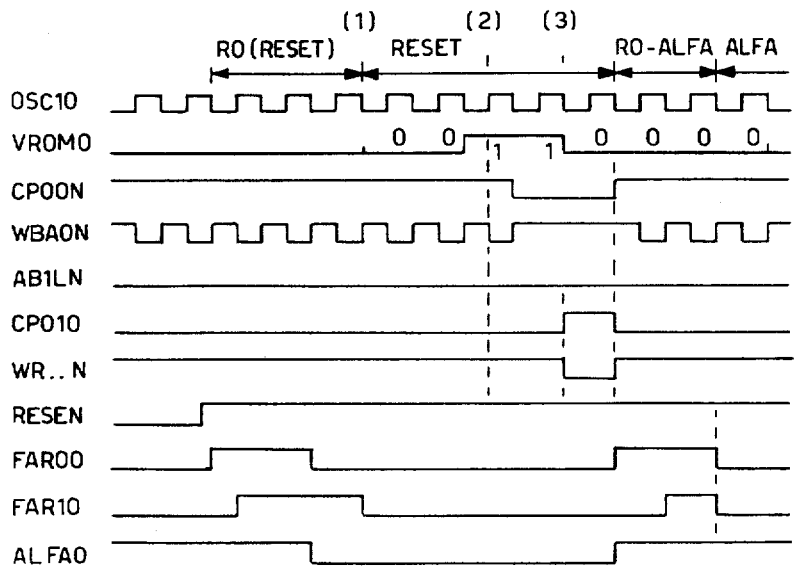

14. Reset Microinstruction. FIG. 21

The RESET microinstruction is of special type inasmuch as it is not executed during the execution of a microprogram, but is forced directly from the console by means of the RESET push button 10 (FIG. 1).

The function of this microinstruction is to initialize the system by calling the interpreter microprogram which is recorded (for example) at the address "4000" in hexadecimal notation and is called by the program addresser L-01 (that is, RA-01 and RB-01 considered as a single register).

The actuation of the RESET push button sends the signal RESEN and the RES1N to zero. The signal RES1N=0 (Table 1) forces the configuration "0101, 0000, ME070-ME040, LIV" into the register RO-24.

The four bits LIV (FIG. 16) are forced into the configuration "001" by the signal RES1N. The bits "0101, 0000" constitute (FIGS. 6a, b, c) a constant address of the NROM-3 at which is recorded a particular word or RESET nanoinstruction shown in FIG. 21.

Figure 5B:
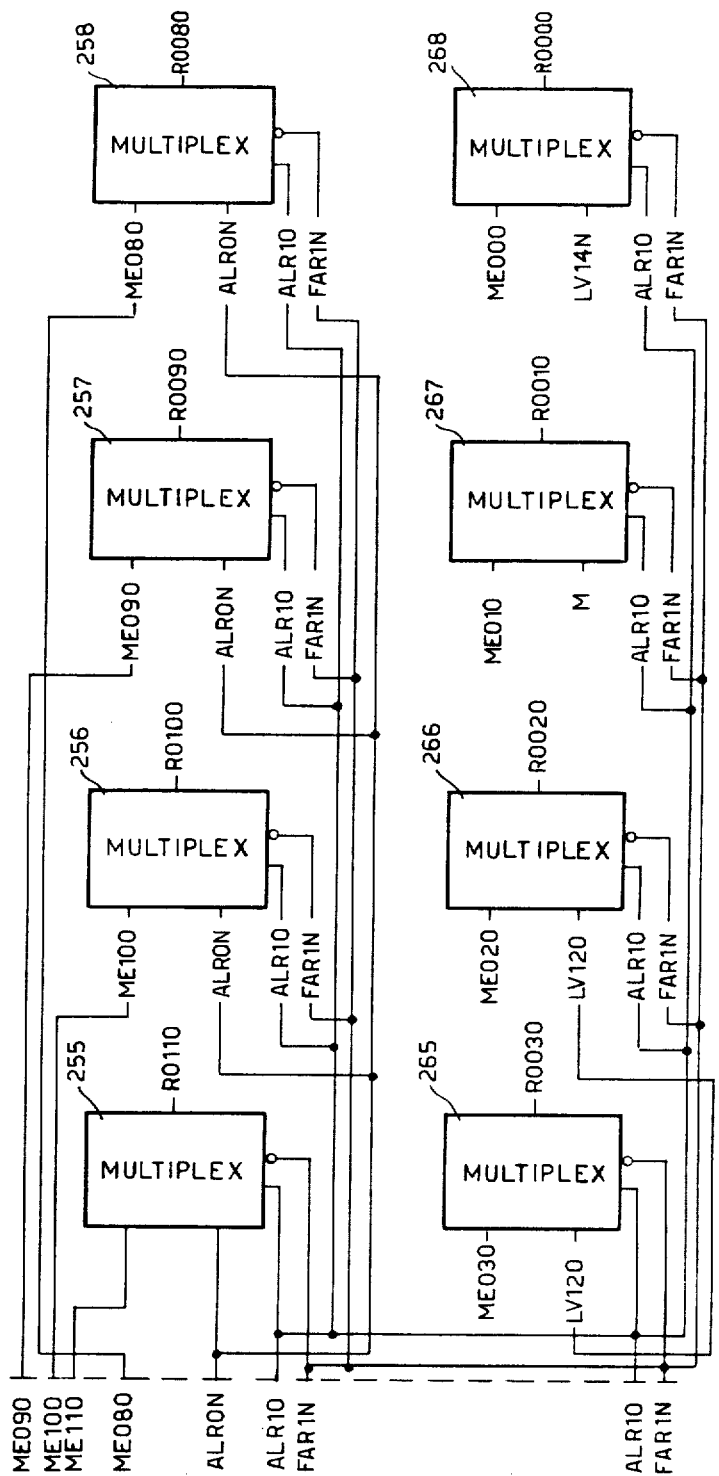

The loading of the register RO-24 with the aforesaid configuration takes place at the first trailing edge of OSC10 in the presence of the signal RESEN=1 (FIG. 8b) and is effected by the leading edge of FAR10 (FIGS. 21 and 5).

In our case, the delay introduced by RO-24 is 32 nsec, so that from this instant the said configuration is present at the input of the NROM-3 (FIGS. 6a-6d). The delay introduced by the latter is 60 nsec, and therefore at the trailing edge of FAR10 the bits of TROM, CROM and VROM are stable at the outputs of the NROM-3.

As has been seen with reference to FIGS. 6c and 6d, the trailing edge of FAR10 defines the starting of the multiplexer 79, thus generating the signal VROMO which is shown in FIG. 21.

Figure 22:
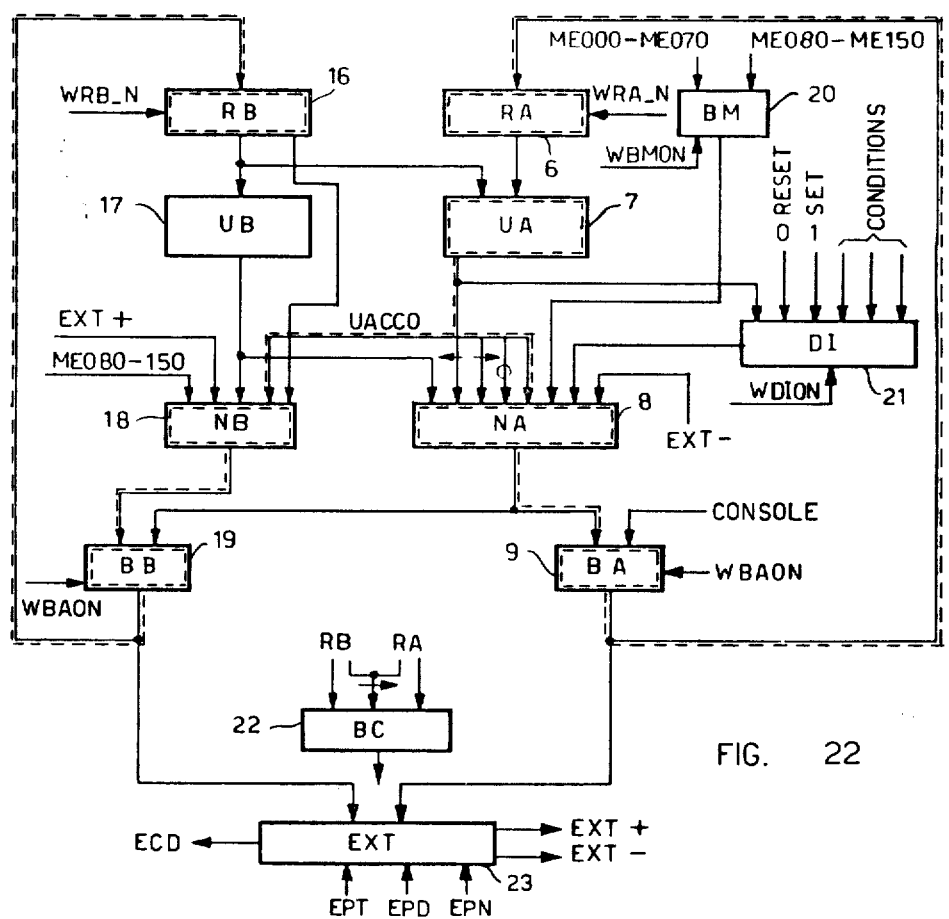
FIG. 22 shows the flow of the data of the nanoinstruction of FIG. 21.

Let us now analyze how the bits of CROM, TROM and VROM must be positioned so that the flow of data required by the RESET microinstruction, shown in FIG. 22 (in dashed lines), may be produced.

The elementary steps to be performed are:

1. order the arithmetic unit UA-7 to load the hexadecimal configuration 4000 (0100, 0000, 0000, 0000) into NA-8 and NB-18.
2. transfer this configuration to BA-9 and BB-19.
3. write this configuration in the register L01 of the registers RA-6 and RB-16, which is selected by the bits RO000-RO030 of the register RO-24.

To achieve step 1 (Table 6), it is sufficient to put the bits CR090-CR130 into the configuration "00111" and, moreover (Tables 8 and 9 and FIGS. 10 and 12), the bits CR060-CR080 into the configuration "010". In fact, the bits CR090-CR130 force the outputs of UA-7 to zero, while the bits CR060-CR080 force into NA-8 the outputs of UA-7 exchanged (the exchange does not have signficance, because all the bits are at zero), and into NB-18 the outputs of UA-7 with the bit NB060 at 1 level. The signal NB060 is equal to UA060, RO150 and, since UA060=RO150=0, this signal is at 1 level. The signal RO150 is forced to zero directly by the signal RES1N (see FIG. 5).

To perform step 2, it is necessary to select as input to BA-9 and BB-19 the outputs of NA-8 and NB-18, respectively, and therefore it is sufficient to position CR050=0 and CC07=1 (see Tables 2 and 10). The writing is timed by the signal WBAON explained hereinafter.

To perform step 3, it is necessary to put CR140=CR150=1, and in fact this corresponds to selecting RA-7 and RB-17 with the bits RO000-RO030 (see Table 3), that is with the bits "0001" (addresser of level 3). Writing in the registers selected is commanded by the signals WR--N explained hereinafter. The signals CR000–CR040, even is at 1 level, are not used, because the switching elements are not concerned.

Figure 4B:
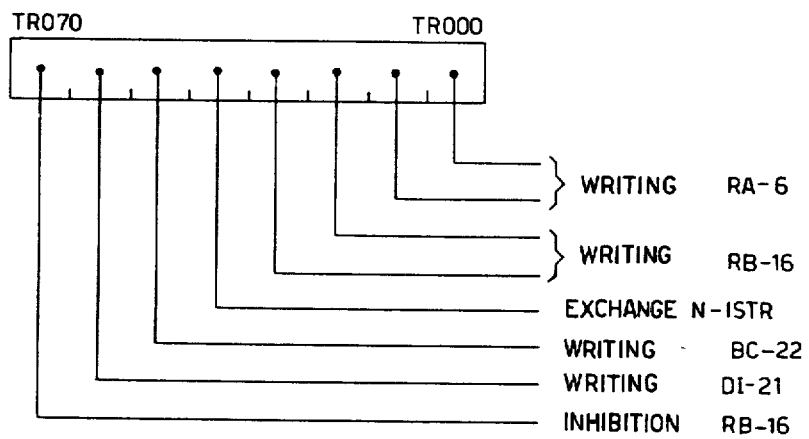
FIG. 4b shows the bits of the TROM-26.
Figure 4C:
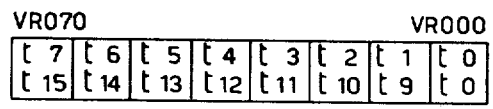
FIG. 4c shows the bits of the VROM-27.

The signals WBAON and WRAMN, WRAPN, WRBMN and WRBPN are a combination of the bits of TROM-26 and VROM-27 (See FIG. 6b). Since it is necessary to enable BA-9 and BB-19 and the long register L01 for writing, it is necessary to put the bits TR000–TR030 to 1 level (FIG. 4b). Of course, the bits TR050–TR070 are at 0 level, since the register BC-22 and the switching elements DI-21 are inhibited from writing.

14.1 Computation of the bits of VROM-27

For computing the timing bits, the initial instant is the trailing edge of FAR10 (indicated by (1) in FIG. 21). In fact, at this instant, as has been seen, all the bits of CROM and TROM are present at the inputs of the circuits concerned. From the instant (1) it is necessary to compute the sum of the delays introduced by the circuits concerned in the flow which precede the registers in which the data is stored.

In this case, it is necessary to add up the delays introduced by the networks UA-7 (48 nsec) and NA-8, NB-18 (29 nsec) and therefore the signal WBAON must be present at least 77 nsec after the switching of FAR10 at level 0.

The signal WBAON is generated (FIG. 13) by the NAND element 119, that is it copies OSC1N (FIG. 21), and moreover enables the registers BA-9 and BB-19 cyclically for writing with its trailing edge. It is therefore required that the last trailing edge of WBAON be generated at least 77 nsec after the fall of FAR10, after which it will be necessary to block the change-over of WBAON to prevent the writing of unrequired data in these registers. The last trailing edge of WBAON indicated by (2) in FIG. 21 will therefore have to be obtained 125 nsec after the instant (1). To block the change-over after this instant of WBAON, it will be sufficient to bring CP00N to zero 150 nsec after the instant (1).

Since the relation between CP000 and the signal VROMO is rigid (FIGS. 6d, 6e), that is CP000 appears 50 nsec after the rise of VROMO, it will be sufficient to put the first two bits of VROM to zero, VRA00–VRA10=0, and VRA20=VRA30=1. Consequently, CP000 appears 150 nsec after the instant (1).

The delay introduced by the registers BA-9 and BB-19 from the instant (2) is 32 nsec and therefore the data will be available at the inputs of the registers RA-6 and RB-16 32 nsec after the instant (2). It is therefore sufficient that the fall of the signals WRA-N takes place at least 32 nsec after the instant (2).

As shown in FIGS. 21, 6b and 6c, the switching of the signal CP010 to level 1 causes the change-over of the signals WR--N and therefore writing in the registers RA-6 and RB-16. This rise of CR010 takes place at the instant indicated by (3) in FIG. 21, that is 75 nsec after the writing in BA-9 and BB-19, in view of the rigid phase relation of 50 nsec existing between CP000 and CP101.

In order to obtain the output of the signal CP010, the duration of CP00N must be at least 100 nsec. This duration is defined by the bits VRA20=VRA30=1 (FIG. 6e). On the other hand, the configuration VRA20=1 and VRA30=0 prevents the rise of CP010, thus deactivating writing in the registers RA-6 and RB-16. This enables the duration of the nanoinstruction to be optimized whenever the result is not required to be written in RA-6, RB-16. In fact, by putting a single bit of VROM to 1 level, CP000 will last only 50 nsec, as a result of which the signal CP010 will not be generated. A second alternative is that of leaving the duration of CP000 equal to 100 nsec and inhibiting writing in the registers RA-6 and RB-16 by putting the bits TR000–TR030 to zero. The signal CP010 is therefore masked by these bits. This alternative does not optimize the time of execution of the nanoinstruction and in fact this lasts 50 nsec more than is necessary.

As has been shown with reference to FIGS. 8b and 8c, the simultaneous presence of CP000=CP010=TR040=1 indicates the end of the nanoinstruction, causing the rise of FAR00 which, as has been said, initiates phase RO-ALFA of the following microinstruction. In our case, this is the one recorded at the address "0100, 0000, 0000, 0000".

It is to be noted that in our case the bits VRB00–VRB30 of VROM which are all at zero level are not used for timing the RESET microinstruction. In fact, this microinstruction ends with the serialization of the bit VRA30.

From what has been said, it is clear how the timing of a microinstruction may be designed expressly for the particular data flow required.

In particular, it is obvious how this timing may be optimized in discrete intervals which are multiples of 50 nsec.

Moreover, by this arrangement of the central unit it is possible to modify the duration of the microinstruction by simply varying the sequence of bits recorded in the VROM-27. This modification is rendered necessary if, for example, for technological reasons, it is desired to replace elements of the nanomachine 4.

It will be apparent that if faster logical circuits were used, that is logical circuits such as to introduce a smaller delay from the instant at which a datum appears as input to the instant at which it is available as output, it would be possible to reduce the duration of the nanoinstruction.

In fact, if the sum of the delays due to the arithmetic unit and to the networks NA-8 and NB-18 had been not 77 nsec, but 48 nsec, for example, it would be sufficient to record in the VROM-17 the bit VRA00=0 and VRA10=VRA20=1 and therefore the nanoinstruction would last 50 nsec less than the one which has just been mentioned. Moreover, if there is available a central unit formed by logic components capable of operating with a machine cycle of less than 50 nsec, the mechanism of programming of the duration of the nanoinstructions which have just been described is automatically optimized by the new machine cycle, since this automatically approximates the duration of a nanoinstruction to a whole multiple of machine cycles.

Figure 23:
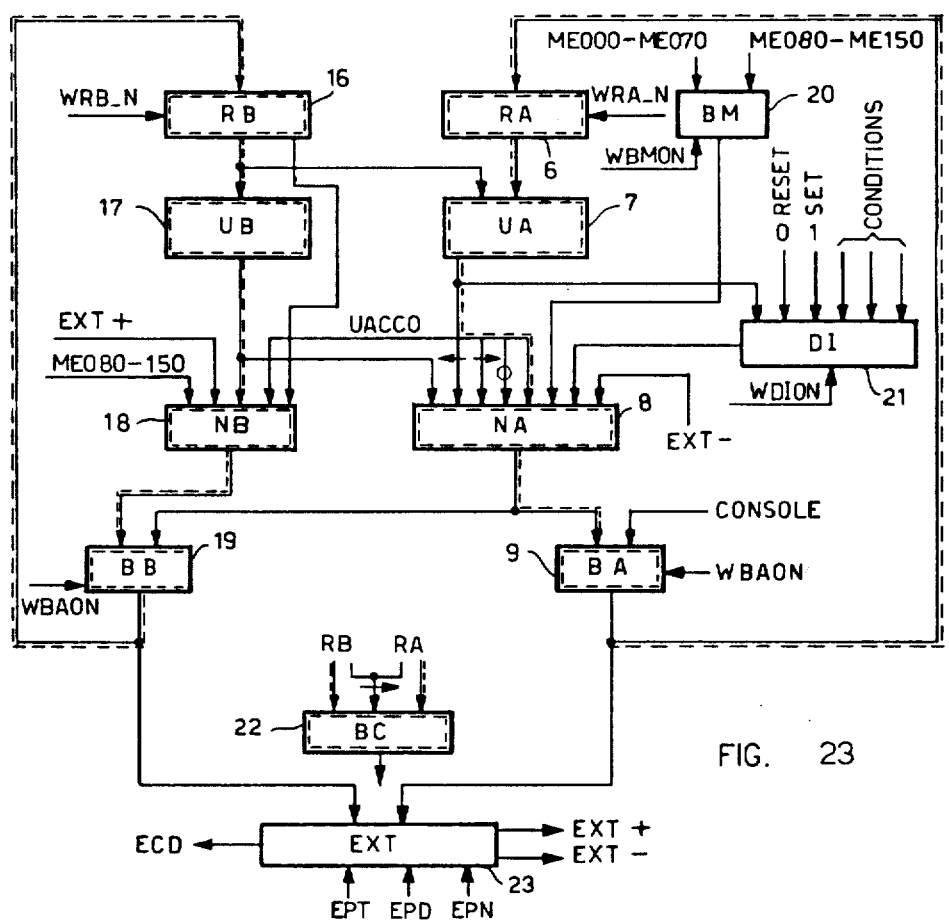
FIG. 23 shows the flow of the data of the microinstruction ALFA.

15. Microinstruction ALFA. FIG. 23

This microinstruction, like the preceding one, is not executed as a step of a microprogram, but it is selected at the end of each microinstruction.

The function performed by the microinstruction ALFA is that of reading from the ROM-2 the microinstruction addressed by the addressing register of the microprogram associated with the enabled level, of loading this microinstruction into the register RO-24 and of incrementing the addressing register used.

As has been said (Table 1 and FIG. 5), the end of a microinstruction is characterized by the signal ALFAO=0 and by the rise of FAR00. The signals AL- FA0=0 and RES1N=1 (absence of general RESET) cause the loading of the configuration "1111, 0000, ME110-ME080, LIV" or "1111, 0000, ME070-ME040, LIV" into the register RO-24, according to whether ME150=0 or ME150=1.

These configurations are equivalent, since they address the same location in the NROM-3 by means of the bits 1111, 0000, and the same addressing register by means of the bits LIV. The remaining bits which come from the memory are not used.

The elementary steps which this microinstruction must carry out are:
1. Transferring to UA-7 and UB-17 the contents of the long register of RA-6 and RB-16 which is addressed by LIV and increment it by one unit.
2. Loading the contents of UA-7 and UB-17 into the registers BA-9 and BB-19 and at the same time load the contents of the long register of RA-6 and RB-16 which is addressed by LIV into the register BC-22 and start the reading cycle of the ROM.
3. Loading the address incremented in step 1 into the long register addressed by LIV and load the microinstruction read into the register RO-24 at the end of the memory cycle.

These steps are synthetized in FIG. 23.

To carry out step 1 it is sufficient to put all the bits CR090–CR130 to zero level (Table 6); and the bits CR140=CR150-1 (Table 3).

To execute step 2, it is necessary that the data be present as input to the registers BA-9 and BB-19.

By means of the bits CR060=CR080=1 and CR070=0, the outputs of UA-7 and UB-17 are transferred to NA-8 and NB-18, respectively (Tables 8 and 9). On the other hand, the bits CR050=0 and CC07N=1 (Table 10) enable the transfer of the outputs of NA-8 and NB-18 to the registers BA-9 and BB-19, respectively. The bits CR000–CR030 at 1 level are not used. The bit RO140=1 selects the bits RA00-0–RA070 and RB000–RB070 as inputs to the register BC-22 (Table 11). The bits TR000–TR050 of the TROM 26 are all at 1 level, since (FIG. 4b) it is necessary to enable writing in RA-6, RB-16, BC-22 and, moreover, the microinstruction is executed by a single nanoinstruction.

The time needed for having the data as input to the registers BA-9 and BB-19 is 77+62=139 nsec, since 62 nsec is the delay introduced by RA-6 and RB-16. This time is calculated from the fall of FAR10.

Finally, the delay due to RA-6 and RB-16 requires two periods of 50 nsec more with respect to the RESET microinstruction discussed in Example 1.

Therefore, the configuration of VROM-17 will be VRB00-VRB10=1 and all the other bits will be equal to zero, so that the signal CP000 is generated 250 nsec after the fall of FAR10.

The leading edge of CP000 causes the fall of WBCON and masks WBAON.

The signal WBCON causes the writing of the contents of the microprogram addressing register in the register BC-22 and moreover starts the reading cycle of the memory.

The signal WBAON is maintained at 1 level, so that it keeps the previously incremented address stable in the registers BA-9 and BB-19. Step 3 is executed by the signal CP010, which causes the fall of WR--N enabling the writing of the address previously incremented and present in the registers BA-9 and BB-19 in the long register addressed by the bits LIV.

Figure 24:
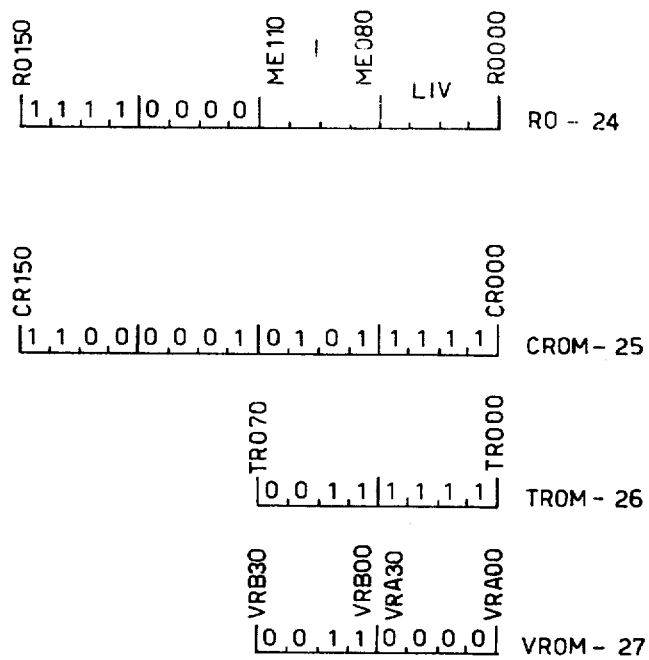
FIG. 24 shows the microinstruction ALFA and the timing thereof.
Figure 24:
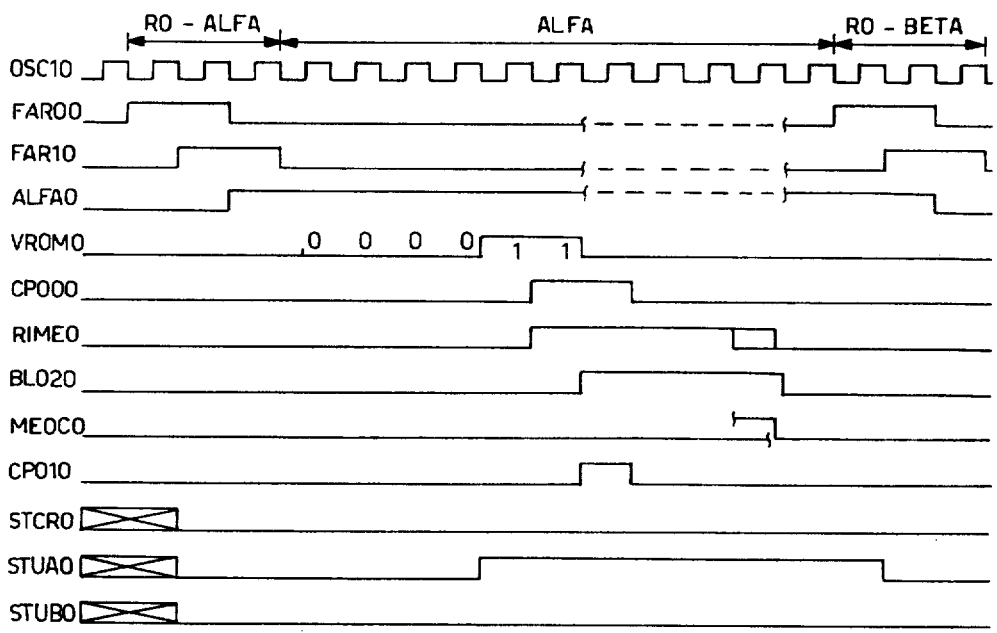

Moreover, the signal WBCON (FIG. 7) blocks the signal OSCBO at 1 level, interrupting the timing. In fact, the signal OSCBO=1 (FIG. 6c) blocks the shifting of the bits VROM deactivating the multiplexer 79. Moreover, it blocks (FIGS. 8b and 8c) FAR00=RAR1-0—0 and ALFAO=1 for the duration of the memory cycle. These blocking actions last while the signal MEOCO is at zero level. The signal MEOCO=1 is generated by the memory at the end of the reading cycle and reactivates OSCBO. The reactivation of OSCBO initiates step 4, resuming the synchronism deactivated during the memory cycle. More particularly, OSCBO, causes the rise of FAR00 and FAR10, which load the register RO-24 with the microinstruction previously read from the ROM-2. After this, the phase RO-BETA already described hereinbefore (FIG. 8c) begins. All the timing signals which have just been described are shown in FIG. 24.

It is to be noted that TR040 being equal to 1, the signal STCRO is always at "0" level (FIG. 6a), and therefore as has been seen there is no incrementation of the address of CROM-25 and TROM-26, indicating that the microinstruction is finished. The signal STUAO, on the other hand, is changed over to 1 by the leading edge of the signal TR030 (FIG. 6c) inasmuch as the address of the package 71 must be incremented by one unit, all the four bits VRA00-30 having been used. The signal STUBO, on the other hand, remains at 0 level, since only two bits (VRB00 and VRB10) of the package 72 are used.

This mechanism enables a new block of four bits of VROM to be prearranged whenever the use of a preceding block has been completed.

Figure 25:
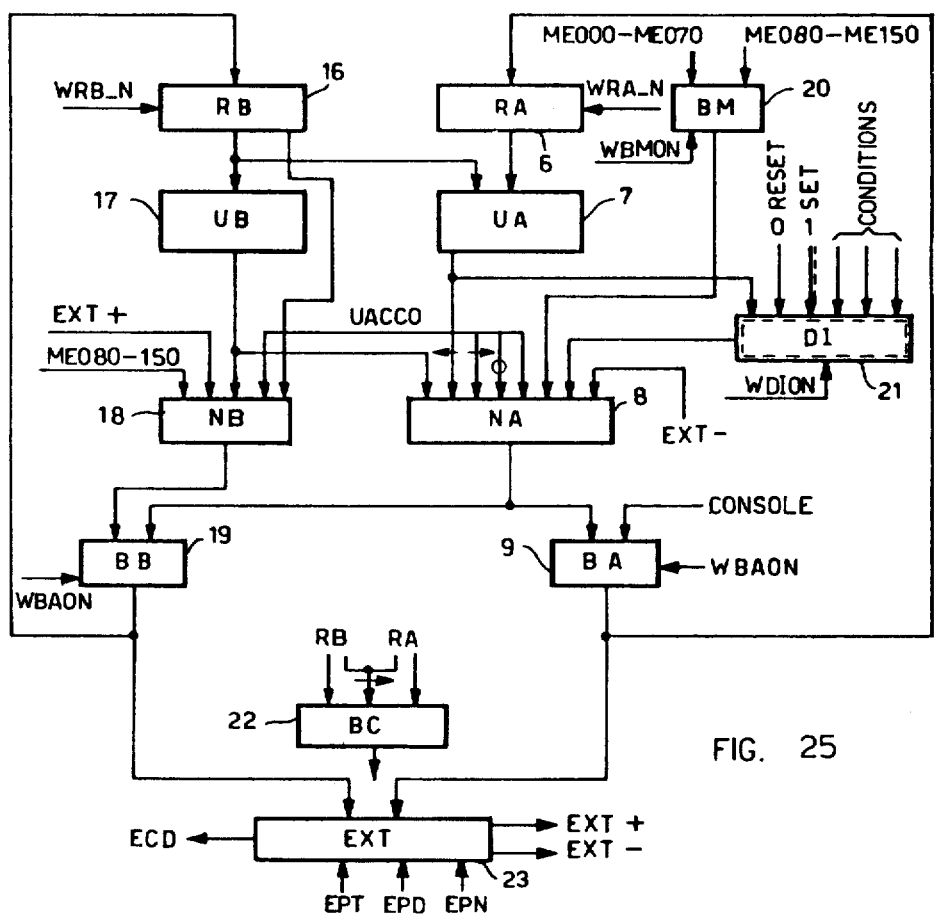
FIG. 25 shows the flow of the data of the microinstruction SEDI.
Figure 26:
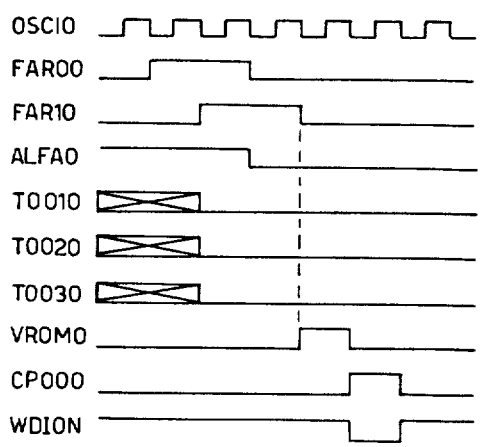
FIG. 26 shows the microinstruction SEDI and the timing thereof.

16. Microinstruction SEDI. FIGS. 25 and 26

This microinstruction is one of the most simple present in the set employed by the computer in question and therefore has a very brief duration. It is callable from microprogram and is therefore carried out during a phase BETA (FIG. 8c). The function performed by the microinstruction SEDI is that of setting (that is, positioning at 1 logical level) one or more switching elements (flip-flops) of the group DI-21.

As has been said hereinbefore, the function of these switching elements DI-21 is that of storing conditions significant for the working out of the program and in this case, therefore, the microinstruction "enters" a number of conditions which may be modified afterwards by the results of the processing operations. Since this microinstruction is executed in phase BETA, during phase RO-BETA there will be obtained ALFAO=1, RES1N=1 and ME150=1. The condition ME150=1 is due to the code of the microinstruction SEDI. This, moreover, is already available at the instant of loading of the register RO-24 (leading edge of FAR10), since the latter is out of phase with delay with respect to the rise of the signal MEOCO, as is apparent from FIGS. 7 and 8b. Consequently, the register RO-24 will be loaded with the configuration (Table 1) ME00-0–ME140 and RO150=1, that is with the configuration shown in FIG. 26.

This microinstruction is executed in a single step consisting precisely of loading into the switching elements DI-21 the eight bits RO000–RO070 indicated by MASK in FIG. 26.

The bits of the CROM-25 indicate by CR040=0 that the selection of the switching elements DI-21 to be set is effected by the bits RO000–RO070, while the bit TR060=1 indicates that the switching elements DI-21 are enabled for writing (Table 7). As has been said, TR040=1 indicates that a single nanoinstruction is sufficient for executing the microinstruction. Since the remaining bits of the TROM-26 are all equal to zero, they inhibit the other elements of the nanomachine 4, rendering the remaining bits of the CROM-25 devoid of significance.

The delay introduced is nil, since the bits RO000-RO070 are loaded directly into the switching elements DI-21 without any need to be processed. In fact, on the fall of FAR10, the bits of RO-24 and those of the TROM-26 and CROM-27 are all present in the switching elements DI-21.

The bit VRA00=1 indicates that the signal CP000 will be brought to 1 level 50 nsec after the fall of FAR10.

The signal CR000=1, together with TR060=1, causes through the NAND element 68 (FIG. 6b) the fall of the signal WD1ON which commands the writing of the switching elements DI-21.

The microinstruction is therefore finished in only 100 nsec from the fall of FAR10; this duration is the minimum possible in this particular embodiment of the invention.

17. Microinstruction AMIP. FIGS. 27 and 28.

This microinstruction performs the function of transferring to memory at the address specified by the microinstruction itself the byte contained in one of the registers RA-6, which is also specified by the microinstruction and therefore, by incrementing the memory address used by one. The microinstruction is used when it is desired to transfer a given number of characters to a field of memory of predetermined length. In this case, it is sufficient to call it successively N times to effect the transfer, inasmuch as it is microinstruction itself which provides for incrementing the address. The register RO-24 is loaded in a similar manner to that described for the microinstruction SEDI with the configuration shown in FIG. 28a.

In this Figure, the four bits L select the long register which contains the address of the memory cell into which the byte of information is written. This byte is recorded in the register of RA-6 which is selected by the bits indicated by A.

The microinstruction is executed by means of two nanoinstructions (obviously of BETA type) which are carried out in the following steps:

First nanoinstruction.

This is executed in three steps similar to those of phase ALFA previously discussed, from which, however, it is distinguished by the following features:

The selection of the register of RA-6 and RB-16 is effected by the bits RO040-RO070 and not by the level bits; this entails that the bit CR140=CR150=0 (Table 3) and not at one level, while all the other bits of the CROM are equal to those of phase ALFA. The bit RO140=0 indicates that the data coming from RA-6 and RB-16 must be shifted to the right by one place and the bit BC150 must be forced to zero (Table 11). The least significant bit NRA00, on the other hand, acts on the circuit 43 to generate the writing signal WMBMN or WMBPN (FIGS. 3b and 15) according to whether the bit NRA00 is zero or one, respectively.

The bit TR040=0 indicates that the microinstruction is being executed by two nanoinstructions.

The remaining bits of the TROM-26 are identical, are also the first six bits of the VROM-27.

It is observed that the analogy of the bits of t NROM-3 between the said two nanoinstructions is d to the substantial identity of the flow of the data whi is produced by them. This can be verified by compa son of FIGS. 23 and 27a. To sum up, at the end of t first nanoinstruction, the memory address at which t datum will be written is recorded in the register BC- and a memory cycle has been started. The memc cycle begins with the leading edge of WBC00, whi corresponds to the rise of CP000. At the followi trailing edge of OSC10 the blocking of the timing effected by BL020=1 (FIG. 7). Consequently, the s nals TO010=0, TO020=1, TO030=1 remain staticiz in this configuration throughout the memory cyc This configuration selects the bit VRB20 (FIGS. 6c a 6d), which is the first of the following nanoinstructic

Second nanoinstruction

The second nanoinstruction begins with the leadi edge of STCRO which, as has been said, increments t address of the NROM-3. The signal STCRO chan; over on the fall of CR010 in the presence of TR040 (FIG. 6a).

The steps which the nanoinstruction performs are

1. Transferring the contents of the register of RA addressed by the bits indicated by A in FIG. 28 to 1 registers BA-9 and BB-19.

2. Keeping the datum to be written stable on 1 channel ECD for 150 nsec after the end of the mem« cycle indicated by MEOCO=1.

Step 1 begins 100 nsec after the rise of STCRO, t] is with the first trailing edge of OSC10 following the nsec of delay introduced by the NROM-3. The bits the second word of the CROM (FIG. 28) have 1 following functions. CR140=CR150=1 enables sel tion in RA-6 and RB-16 of the register indicated by 1 bits A of RO-24 (Table 3). The bits CR090-CR130 at 1 level enable passage unchanged from RA-6 UA-7 (Table 6).

The bits CR060=CR080=1 and CR070=0 peri transfer from UA-7 to NA-8 (Table 8). The CR050=1 permits transfer of NA-8 to BA-9 (Ta 10). The remaining bits are not used.

The bits of the TROM-26 are all at 0 level except TR070=1, which inhibits the registers RB-16, and bit TR040=1 for indicating the end of the microinstr tion.

It is pointed out that this step is executed entir without using the bits of the VROM, which are inh ited since the blocking from the memory which is c ried by the signal BL020=1 is activated. This is possi inasmuch as the elements concerned do not requ enabling for writing dependent on OSCBO. In fact, sole enabling for writing which is required is provic by the signal WBA0N which depends on OSC10 (F 13 and Section 14.1).

The second step begins with the unblocking of timing, that is with BL020=0. From this instant th begins the reading of the succeeding bits of the VRO that is VRB20, VRB30 and VRA00. Since VRA00= VRA10=0 and TR040=1, it follows that CP000= which signals the end of the microinstruction with trailing edge. It is pointed out how it is possible obtain by means of the timing system used by the cc puter according to the invention a sequence of tim signals adapted to the microinstruction to be tin which is longer than the theoretical times by an amount less than 50 nsec. That is, the time of execution of a nanoinstruction is stopped at the multiple of 50 nsec immediately higher than the theoretical time.

It is moreover desired to show clearly how the possibility of stopping these timing signals at the end of a nanoinstruction (CP000=1 and TR040=0 and TR050=0), together with the possibility of resuming these signals from the stopping point (BL020=0), constitutes a considerable optimization of the times of execution of the microinstructions.

In fact, this system enables the duration of the nanoinstruction to be modified in dependence upon the technology used by the store 2. If, in fact, the memory 2 has a cycle of lower duration, the nanoinstruction will be shorter.

Figure 29A:
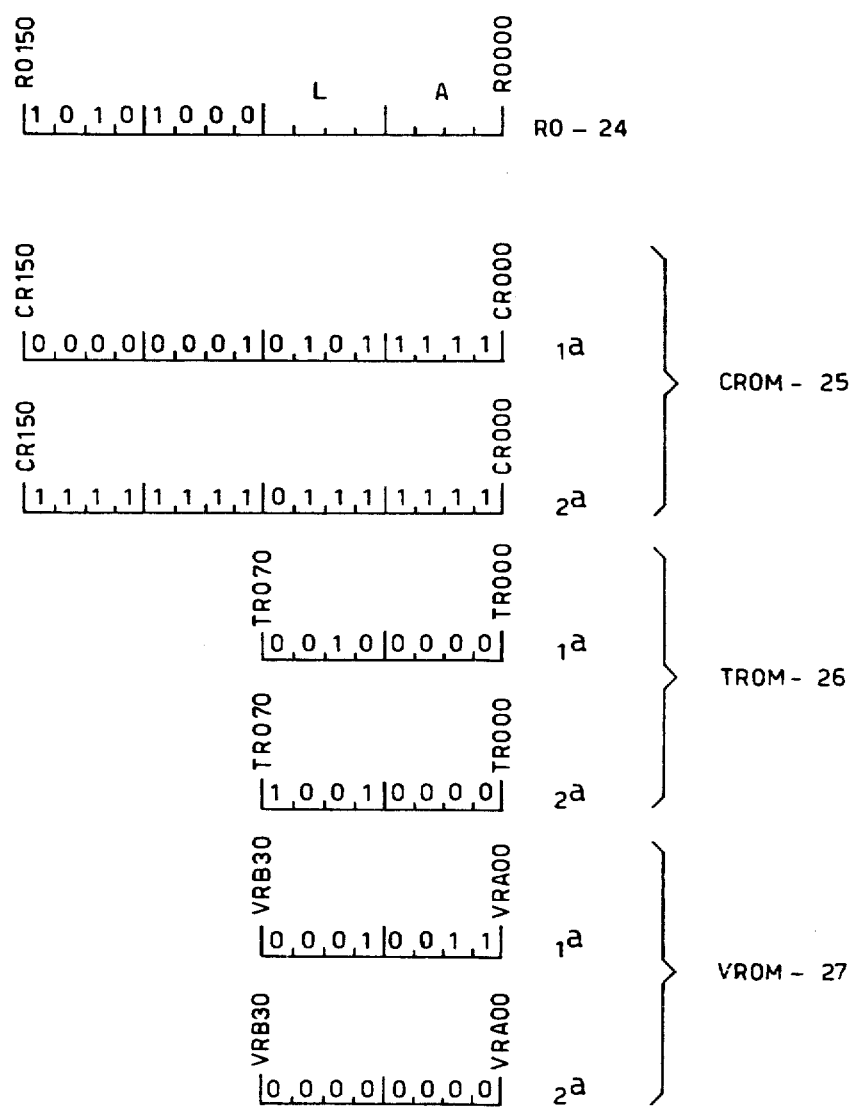
FIG. 29a shows the microinstruction AMI.
Figure 29B:
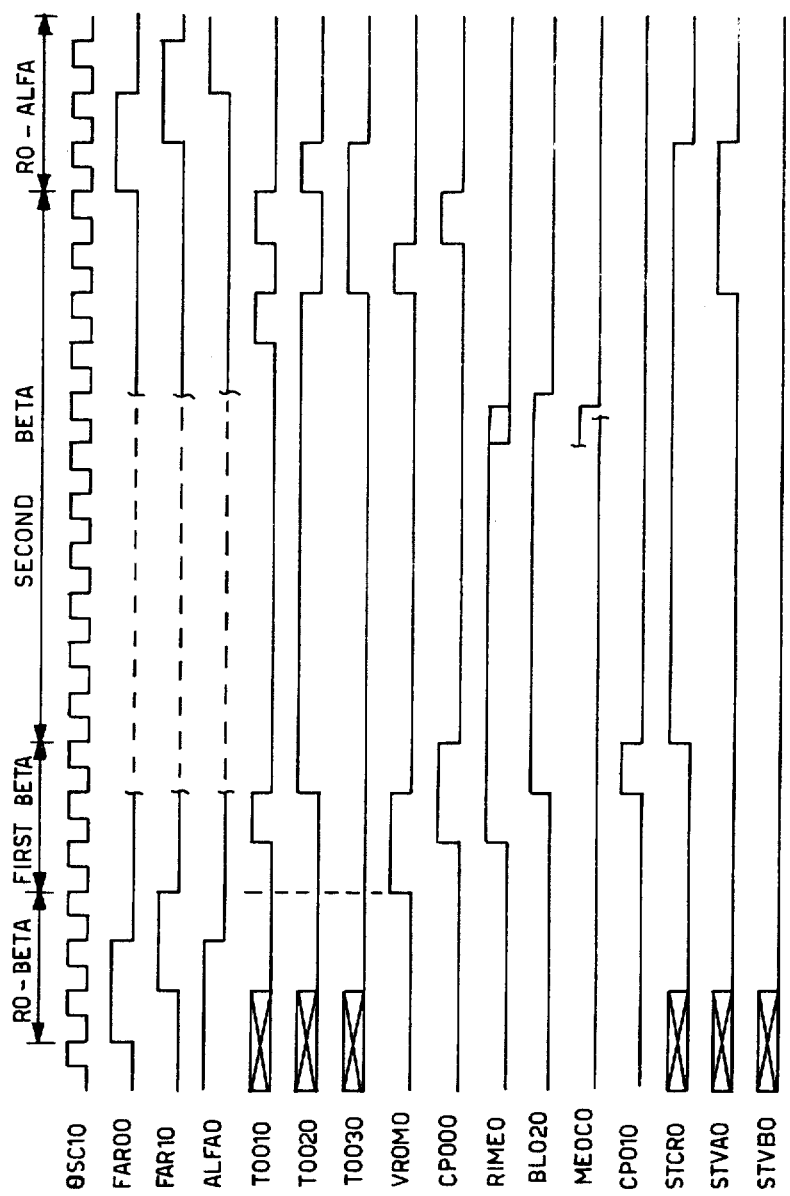
FIG. 29b shows the timing of the microinstruction AMI.

18. Microinstruction AMI. FIG. 29

The microinstruction AMI performs the function of writing in memory at the address specified by the microinstruction itself the contents of one of the registers RA likewise specified by the microinstruction, but without incrementing this address.

The microinstruction is used in the event of it being desired to transfer a single character to memory.

Figure 27A:
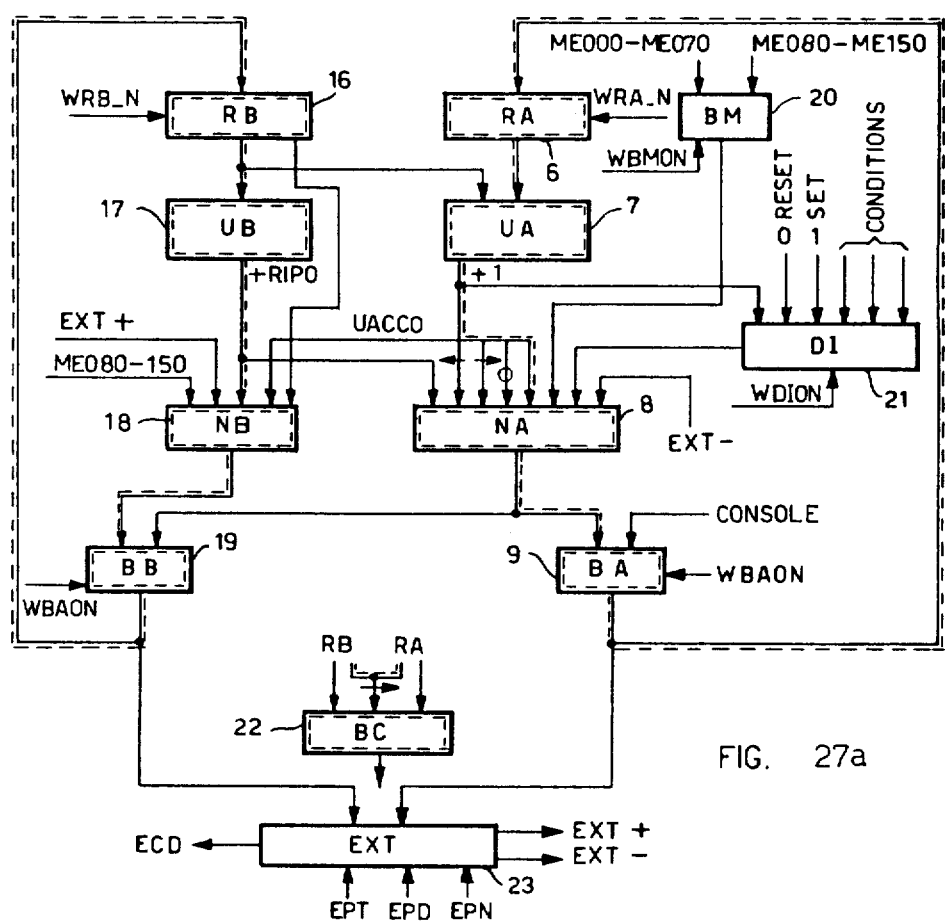
FIGS. 27a and 27b show the flow of the data of the microinstruction AMIP.
Figure 27B:
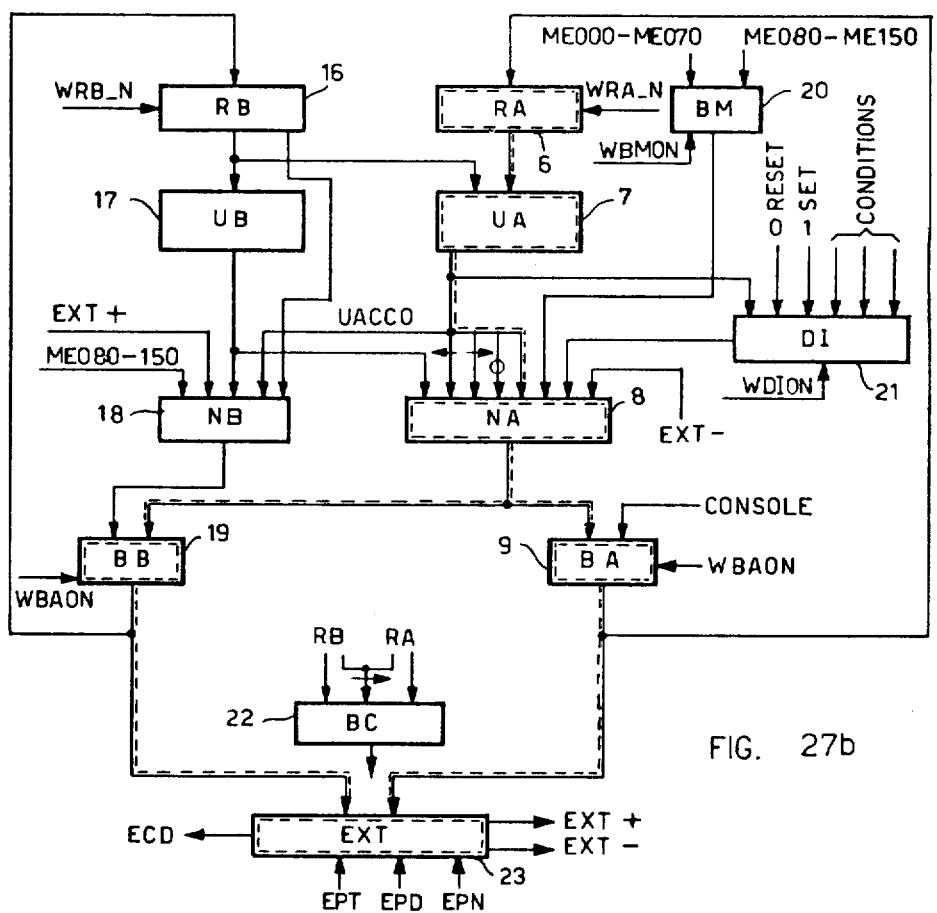
Figure 28A:
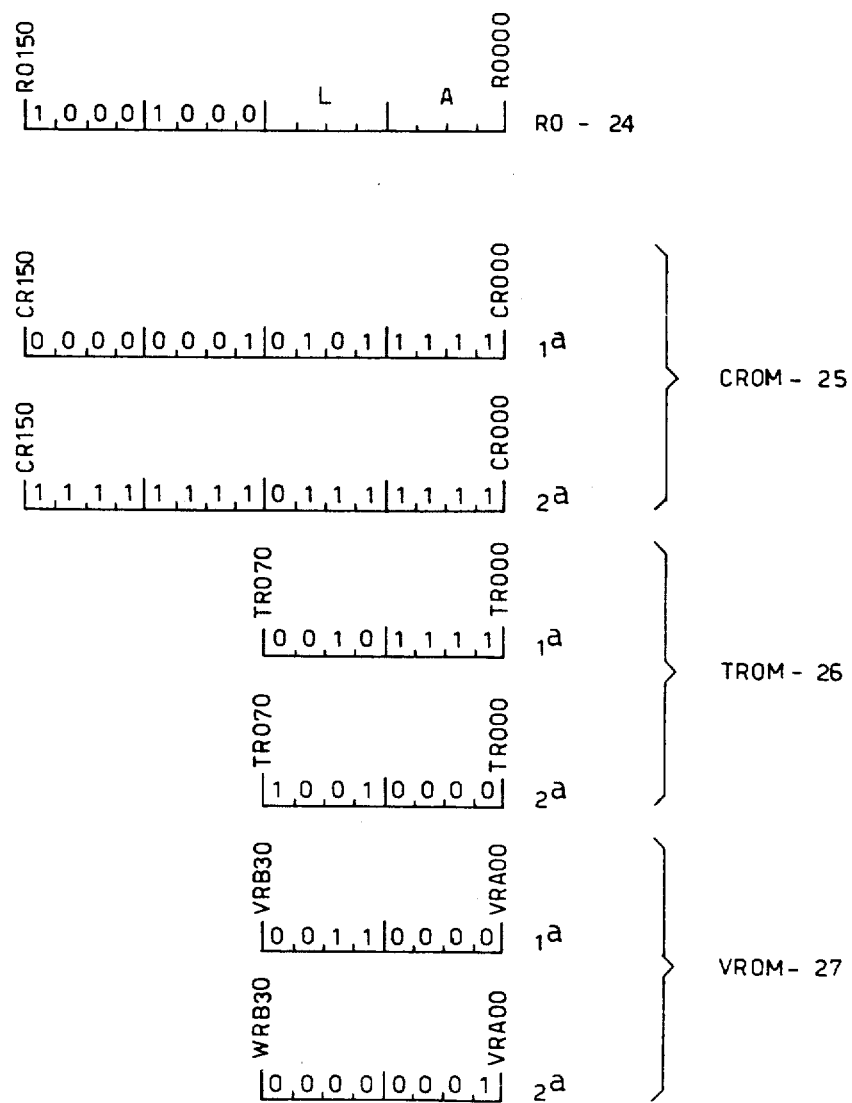
FIG. 28a shows the microinstruction AMIP.
Figure 28B:
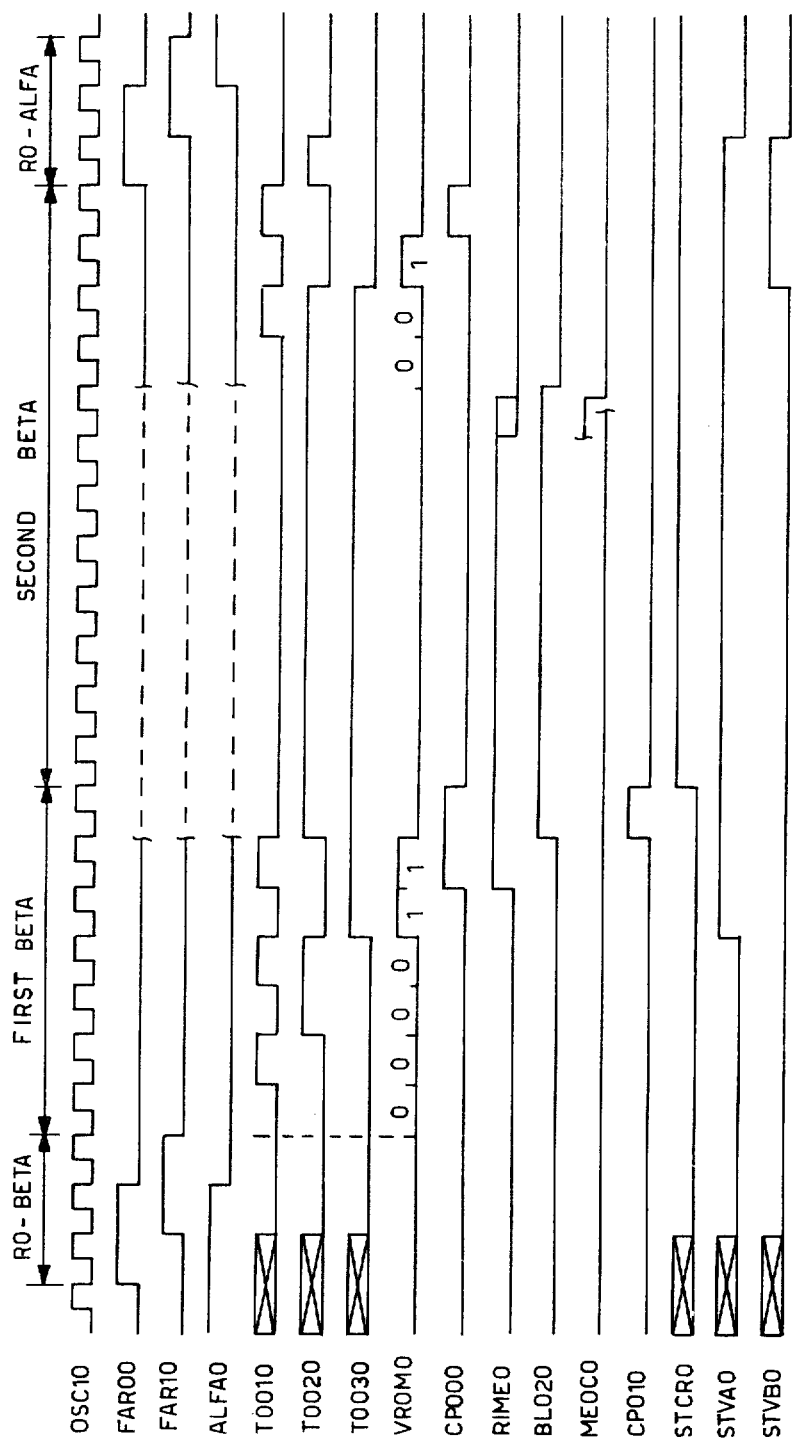
FIG. 28b shows the timing of the microinstruction AMIP.

As can easily be guessed, this microinstruction is very similar to the microinstruction AMIP, from which it is distinguished solely by the absence of the cycle given in FIG. 27a. This difference is manifested in a smaller total time of execution and therefore a smaller number of bits of the VROM-27 is used.

This reduction of the theoretical time of execution makes it possible to show plainly how the system according to the invention can adapt independently the bits of the words of the VROM-27 with the words of the TROM-26 and CROM-25.

In fact, while the microinstruction AMIP uses all the bits of the first word of the VROM and the first bit of the second word of the VROM (FIG. 28), the microinstruction AMI uses only the first five bits of the first word (FIG. 29).

On the other hand, there are two CROM and TROM words for both the microinstructions.

More particularly, these words are identical, except for the first four bits of the TROM, which are at zero level for inhibiting writing in the operative registers RA-6 and RB-16. This prevents the carrying out of the cycle shown in FIG. 27a and, consequently, the need for the delay of 200 nsec is eliminated (that is, VRA00-VRA30 all equal to zero).

Consequently, the first nanoinstruction ends 150 nsec after the fall of FAR10. The signal STUAO is therefore changed over to "1" on the reading of VRA30. In spite of this, the bits VRA00–VRA30 of the second word are not read, since the second nanoinstruction terminates with the reading of VRB00=1.

D. SUMMARY

From what has been said it is clear how it is possible to time the execution of each nanoinstruction or word in the electronic computer according to the invention.

This is done by dividing each word into two groups of signals; the first group (VROM and TROM) is transmitted directly to the logic circuits (arithmetic units UA-9 and UB-19, switching networks NA-8 and NB 18), while the second group (VROM) is serialized and transmitted to the registers (RA-6 and RB-16 BA-9 and BB-19, BC-22 and RO-34).

In this way, the entire flow of information, controlled by the sequence in which the registers are enabled for writing, is timed by the signals of the second group.

The signals of the first group are of a first type (CROM) and a second type (TROM).

The signals of the first type (CROM) select the operations which are to be performed by the operation controlled means UA-UB, NA-NB, the switching networks and the input multiplexers of the registers which require this. Consequently, they select from among all the elements of the machine those which are used by the corresponding word. In other words, the effect of the CROM signals is that of selecting a flow of data from among all those possible; each flow of data corresponds to a word (or nanoinstruction).

The signals of the second type are associated with corresponding registers to enable or not enable writing therein. In fact, enabling for writing takes place with the simultaneous presence of the signals of the TROM and VROM in the gates 63–68 of FIG. 6b. More precisely, the signals of the VROM are transmitted to all the registers and have effect only on those registers which are enabled by the corresponding signals of the TROM.

Finally, one signal of the TROM (TR040) is used to indicate whether the current word is the last relating to the microinstruction being executed.

The end signal (TR040) or equivalent FAR00 acts on the circuits 51, 52, 53 (FIG. 5) to load the register (RO-24) of the ROM-2 or second memory to load alternatively a fixed address or an address read from the second memory. The fixed address is loaded to start the execution of the first phase or phase ALFA, which terminates with the loading into the same register RO-24 of the code of the microinstruction to be executed. The loading of this code corresponds to the beginning of the second phase or phase BETA and is produced by the end signal (TR040) of the preceding phase ALFA.

The absence of the end signal TR040 causes the circuit 54 to increment the address of the NROM-3 or third memory by one unit, thus generating the reading of a new word or phase BETA relating to the microinstruction being executed.

The output register RO-24 of the second memory is moreover loaded with a second fixed configuration in the case where an initializing or RESET signal is generated by the operating console. This second fixed configuration corresponds to the address of a word which causes the reading in the second memory of the supervisory microprogram which initializes the computer.

The end signal TR040 moreover acts on a delay circuit (flip-flop 92) for generating after a fixed time interval a signal for the beginning of operations (fall of FAR10). The latter activates the means for transmitting in succession (multiplexer 79) to the nanomachine the bits read from the VROM. This delay enables the propagation of the signals of the first group to the logic circuits to have already been effected before the serialization of the timing signals.

Further delay means (flip-flops 80 and 81 and NAND elements 63-66) are moreover provided which generate a first enabling signal (WBA0N) for enabling writing in the buffer registers (BA-9 and BB-19). These delay means moreover generate, after a fixed time interval, the signals WR—N which enable writing in the operative registers or input registers of the logic unit (RA-6 and RB-16).

The further delay means moreover generate a third enabling signal WBCON which loads the address to be activated into the addressing register BC-22 of the first and second memories and starts a memory cycle. An interrupt circuit (90 and 91) is controlled by WBCON for interrupting the serialization of the bits of the VROM and for reactivating the serialization on the arrival of an activation signal MEOCO generated by the first or second memory. In this way, the serialization of the signals of the VROM is interrupted during the entire memory cycle.

The bits of the VROM are moreover divided into two parts (VRA00-30 and VRB00-30) the address of which is incremented independently by a circuit 73 and 74.

This enables the address of each part of the VROM to be incremented when the reading of the preceding part has been completed.

From what has been said the method for defining the configuration of the bits of the VROM will also be clear. This is effected by calculating the sum of the delays introduced by the input registera RA-6 and RB-16 and by the logic unit. This sum is approximated to the whole multiple of periods which is immediately higher. The number of initial zeros of the bits of the VROM is equal to the number of periods contained in this multiple. For this reason, enabling for writing in the transit registers BA-9 and BB-19 is effected by the first bit at one logical level which follows the zeros positioned in this way.

The number of bits of the VROM at one level is calculated by adding to the delay introduced by the transit register the duration of validity of the data in this register. Of course, this duration depends on the use it is desired to make of this data. In fact, the bits of the VROM at 1 level inhibit writing in the transit register for as many periods as there are bits at 1 level.

While preferred embodiments of the invention have been shown by way of example in the drawings, it will be understood that the invention is in no way limited to these embodiments.

What is claimed is:

1. In an electronic computer comprising:
a first memory for recording instructions and data to be processed;
a second memory having microinstructions recorded therein;
first addressing means receptive of an instruction from said first memory for addressing said second memory to provide a succession of microinstructions associated with the received instruction;
a third memory having a plurality of bit words stored therein, each word including a first and a second group of signals;
second addressing means receptive of a microinstruction from said second memory for addressing said third memory to provide at least one word associated with the received microinstruction;
processing means receptive of data from said first memory for processing same and including operation control means controlled by the signals of the first group for performing logic and arithmetic operations on said data according to the signals of said first group and a plurality of registers having means controlled by the signals of the second group for effecting the selective connection of each to the input and to the output of said operation control means and to said first memory for reading microinstructions stored therein and to said second memory for reading instructions and data and for storing the results of said operations; and
means controlled by the signals of the second group including timing means for transmitting in succession said second group of signals to said registers for timing the transfer of data and operation results between said operation control means, said registers and said memories.

2. In an electronic computer according to claim 1, wherein the control signals of said first group comprise a first type of signals and a second type of signals and further comprising first means responsive to said first type of signals for selecting the operation to be performed by said control means on said data and second means enabled by said second type of signals for transferring the signals of the second group to said registers.

3. In an electronic computer according to claim 2, wherein said means for effecting selective connection of said registers includes writing enable means responsive to said signals of the second type and the signals of the second group to enable writing of the data in said registers.

4. In an electronic computer according to claim 3, wherein at least one of the signals of the second type is associated with a corresponding register of said registers.

5. In an electronic computer according to claim 4, further comprising means controlled by said signals of said second group and by at least one signal of said second type to generate a signal indicating the end of the operations associated with each of the microinstructions and wherein said second addressing means comprises an output register having means controlled by the end-of-operation signal to store a predetermined address associated with a predetermined word of the third memory for controlling the operations associated with each of the microinstructions.

6. In an electronic computer according to claim 5, wherein each microinstruction comprises a code combination defining the operations to be carried out and wherein said processing means further comprises means receptive of a first phase of the microinstructions for transmitting the code combination into the output register and a second phase of the microinstructions for controlling the operations associated with the said code combination and further comprising means conditioned by the end-of-operation signal for generating an identifying signal identifying said first phase and said second phase and means controlled by said identifying signal for storing selectively in said output register a first constant address associated with the first phase for addressing a location of said third memory storing a word controlling the operations of said first phase and a variable address read from said second memory and associated with the microinstruction to be executed for addressing the location of said third memory storing a word controlling the operations associated with said microinstruction.

7. In an electronic computer according to claim 6, further comprising means operable for initializing said computer and for generating an initialization signal, controlling the conditioned means to command the controlled means to store in said output register a second constant address for addressing a location of said third memory, storing a word controlling the operations required for initializing said computer.

8. In an electronic computer according to claim 7, further comprising an incrementing circuit for incrementing the address of said third memory by one unit in the absence of the end-of-operation signal, whereby the absence of the end-of-operation signal effects the execution of a further second phase of said microinstruction.

9. In an electronic computer according to claim 8, further comprising a delay circuit controlled by the end-of-operation signal for generating a signal after a predetermined time interval for starting the operations associated with the words and for controlling the operation of said means for transmitting in succession, whereby the second phase of said microinstruction is carried out.

10. In an electronic computer according to claim 9, wherein said registers comprise a plurality of input registers for introducing data into said operation control means and a buffer register for temporarily storing the data supplied by said operation control means and further comprising further delay means connected to said means for transmitting in succession and controlled by at least one signal of said second type and by the signals of said second group which are associated with the plurality of input registers for generating in succession and separated by a predetermined time interval a first enabling signal for enabling the writing of the data in the buffer register or a second enabling signal for enabling writing in said input registers.

11. In an electronic computer according to claim 10, wherein said further delay means includes means controlled by at least one signal of said second type for generating a third enabling signal and for enabling writing in said first addressing means and for selectively activating said first and second memories and further comprising an interrupt circuit controlled by the third enabling signal for deactivating the means for transmitting in succession and wherein said first and second memories generate an activating signal for activating the transmitting means to effect the blocking of the serialization of the signals of said second group during the operation of said second and said third memories.

12. In an electronic computer according to claim 11, wherein the signals of said second group are divided into a first and a second part and further comprising a counting circuit synchronized with said means for transmitting in succession and generating a first and a second signal in correspondence with the transmission of the last command signal of said first part and of said second part respectively, and an incrementing circuit activated by said first and said second signal for incrementing the address of said first part and said second part, respectively, whereby the reading of one of said first or second group of signals is carried out during the transmission in succession of the previously read group of signals.

13. A method for timing the execution of the operations of an electronic computer comprisng a first memory for recording the instructions and the data to be processed, a second memory having microinstructions stored therein and addressable by the instructions for supplying a succession of microinstructions associated with each of the instructions, a third memory for recording a plurality of words and addressable by each microinstruction for supplying at least one word associated with each of the microinstructions, and processing means including operation control means and a plurality of registers each selectively connectable to said control means and to said memories for processing the data, the method comprising the following steps:

dividing the words of the third memory into two groups of signals;

transmitting the signals of the first of said groups directly to said control means and said registers for commanding the operations of processing said data by selectively connecting said registers to said control means; and transmitting the signals of the second of said groups in succession to said registers for timing the processing operations.

14. A method of timing the operations of a computer according to claim 13, further comprising a pulse generator having a constant period and in which the plurality of registers comprises a first group of input registers for introducing data into the control means of a second group of registers for storing the data, and a buffer register for temporarily storing the data supplied by the control means, the first and the second group of registers being enabled for writing by the simultaneous presence of a given logical level of an enabling signal and of a timing signal, the buffer register being normally enabled for writing in each of the said periods and being inhibited by the predetermined level of the timing signals, the method further comprising the steps of dividing the first group of signals into a first and second part, selecting the logic circuits of the control means which are activated by each of the words, recording the third memory corresponding to the first of the parts the control signals for commanding the operation of the selected logic circuits of said control means, selecting the register activated by each of the words, recording in the third memory corresponding to the second of said parts the enabling signals of said selected registers, calculating the sum of the times required by said input registers for supplying the data to said selected logic circuits and of the times required by each selected logic circuit for executing the operations activated by the signals of said first part, determining the minimum whole multiple of the period greater than, or equal to, said sum, recording in succession in the third memory corresponding to said second group a plurality of timing signals of a logical level opposite to said predetermined logical level and equal in number to the number of periods contained in said multiple, and recording successively in the third memory corresponding to said second group at least one signal having said predetermined logical level, whereby the registers selected by the signals of said second part are enabled for writing by the signals of said second group after said predetermined period of time.

15. A method as in claim 14, further comprising the steps of calculating the delay introduced by said buffer register, calculating the duration for which the data must be stable in said buffer register, adding said delay to said duration, calculating the minimum whole multiple of the period greater than, or equal to, the sum, recording in the third memory corresponding to said second group a plurality of signals wherein said predetermined level is equal in number to the number of periods contained in said multiple, recording the remaining timing signals in the third memory corresponding to said second group with a logical level opposite to the predetermined level, whereby the execution of the word terminates with the last timing signal having the predetermined level.

16. A method as in claim 15, further comprising the steps of calculating the number of words which are needed for implementing each of the microinstructions, recording in the third memory corresponding to the second part of the last of the words an end signal of a given logical level for addressing said second memory with the address of the following microinstruction, recording in the third memory corresponding to the remaining words associated with the microinstruction the end signal having a logical level opposite to the predetermined level for controlling incrementing of the address of the third memory.

17. A method of timing the execution of the operations of an electronic computer comprising a pulse generator having a constant period, a first memory for recording instructions and data to be processed, a second memory having microinstructions stored therein and addressable by the instructions for supplying a succession of microinstructions associated with each of the instructions, a third memory for recording a plurality of words and addressable by the microinstructions for supplying at least one word associated with the microinstructions, processing means including operator control means, a first group of input registers for introducing data into the control means, a second group of registers for storing the data, and a buffer register for temporarily storing the data supplied by the control means, the first and the second group of registers being each selectively enabled for writing by a predetermined logical level of a corresponding enabling signal and of a timing signal, the buffer register being normally enabled for writing in each of the periods and being inhibited by the predetermined level of the timing signals the method comprising for each operation the steps of:

dividing each word of the third memory into three groups;

providing the logic circuits of said control means with each of said words;

selecting the operations required by each of the logic circuits in correspondence with each microinstruction;

recording in the third memory corresponding to the first of the groups the control signals for commanding said selected operators of said control means;

selecting the registers used in correspondence with each microinstruction;

recording in the third memory corresponding to the second of the groups the enabling signals of the registers used;

calculating the sum of the times required by the input registers for supplying the data to the logic circuits and of the times required by each logic circuit for executing the operations selected by the signals of said first group;

determining the minimum whole multiple of the period greater than, or equal to, said sum;

recording in succession in the third memory corresponding to the third group a plurality of timing signals of logical level opposite to the given level and equal in number to the number of periods contained in said multiple;

recording successively in the third memory corresponding to third group at least one timing signal having the given level; and transmitting the signals of the third group in succession to said registers, whereby the registers selected by the signals of the second group are enabled for writing by the timing signals after a time interval at least equal to said sum.

18. A method according to claim 17, further comprising the steps of calculating the delay introduced by the buffer register, calculating the duration for which the data must be stable in the buffer register for each microinstruction, adding the delay to the duration, calculating the minimum whole multiple of the period greater than, or equal to, the sum, recording in the third memory corresponding to third group a plurality of timing signals having the given level and equal in number to the number of period contained in the multiple, and recording the remaining timing signals in the third memory corresponding to said third group with a logical level opposite to the given level, whereby the execution of the word terminates with the last timing signal having the given level.

19. A method according to claim 18, further comprising the steps of calculating the number of words needed for implementing each microinstruction, recording in the third memory corresponding to the second group of the last of the words an end signal of the given logical level for controlling means adapted to address the third memory with the address of the following microinstruction, recording in the third memory corresponding to the remaining words associated with the microinstruction the end signal having a logical level opposite to the given level for effecting the incrementing of the address of the third memory.

* * * * *